United States Patent
Rugeland et al.

(10) Patent No.: US 11,889,373 B2
(45) Date of Patent: Jan. 30, 2024

(54) RADIO NETWORK NODE, A WIRELESS DEVICE AND METHODS THEREIN FOR RE-ESTABLISHING A RADIO CONNECTION

(71) Applicant: TELEFONAKTIEBOLAGET LM ERICSSON (PUBL), Stockholm (SE)

(72) Inventors: Patrik Rugeland, Stockholm (SE); Gunnar Mildh, Sollentuna (SE); Icaro L. J. Da Silva, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 90 days.

(21) Appl. No.: 17/270,164

(22) PCT Filed: Sep. 17, 2019

(86) PCT No.: PCT/SE2019/050875
§ 371 (c)(1),
(2) Date: Feb. 22, 2021

(87) PCT Pub. No.: WO2020/067959
PCT Pub. Date: Apr. 2, 2020

(65) Prior Publication Data
US 2021/0176692 A1 Jun. 10, 2021

Related U.S. Application Data

(60) Provisional application No. 62/735,876, filed on Sep. 25, 2018.

(51) Int. Cl.
*H04W 36/30* (2009.01)
*H04W 76/19* (2018.01)
(Continued)

(52) U.S. Cl.
CPC ..... *H04W 36/305* (2018.08); *H04W 36/0038* (2013.01); *H04W 36/0072* (2013.01);
(Continued)

(58) Field of Classification Search
None
See application file for complete search history.

(56) References Cited

U.S. PATENT DOCUMENTS

| 9,860,800 B2 | 1/2018 | Lieshout et al. |
| 10,028,200 B2 | 7/2018 | Pelletier et al. |

(Continued)

FOREIGN PATENT DOCUMENTS

| CN | 105917726 A | 8/2016 |
| WO | 2015112073 A1 | 7/2015 |

(Continued)

OTHER PUBLICATIONS

Notice of Allowance in corresponding/related U.S. Appl. No. 17/270,174 dated Apr. 8, 2022.

(Continued)

*Primary Examiner* — Jutai Kao
(74) *Attorney, Agent, or Firm* — PATENT PORTFOLIO BUILDERS PLLC

(57) ABSTRACT

A wireless device and a method for re-establishing a connection in a wireless communications network comprising a first RAT and a different second RAT. The wireless device operates in a first cell of the first RAT. When a connection failure with the first cell is detected, the device performs a cell selection and selects a second cell of the second RAT. Further, the device determines a first set of parameters associated with the first cell and comprising at least one parameter identifying the wireless device or the first cell. Furthermore, the device receives a second set of parameters associated with the second cell and comprising at least one parameter identifying the wireless device or the second cell. The device determines a security token based on the first and second sets, and transmits a re-establishment request message comprising the security token to the second cell.

12 Claims, 22 Drawing Sheets

Method performed by wireless device 120,122

(51) Int. Cl.
  *H04W 76/11*   (2018.01)
  *H04W 76/27*   (2018.01)
  *H04W 36/00*   (2009.01)
  *H04W 48/20*   (2009.01)

(52) U.S. Cl.
  CPC ............ *H04W 48/20* (2013.01); *H04W 76/11* (2018.02); *H04W 76/19* (2018.02); *H04W 76/27* (2018.02)

(56) References Cited

U.S. PATENT DOCUMENTS

| | | | |
|---|---|---|---|
| 10,123,239 | B2 | 11/2018 | Yilmaz et al. |
| 10,841,302 | B2 | 11/2020 | Hahn et al. |
| 11,540,187 | B2* | 12/2022 | Wang ............... H04W 8/00 |
| 2013/0260745 | A1 | 10/2013 | Johansson et al. |
| 2015/0010154 | A1 | 1/2015 | Chen |
| 2018/0092085 | A1 | 3/2018 | Shaheen et al. |
| 2018/0123784 | A1 | 5/2018 | Gehrmann |
| 2018/0132293 | A1 | 5/2018 | Escott et al. |
| 2019/0150022 | A1 | 5/2019 | Na et al. |
| 2019/0320483 | A1* | 10/2019 | Palat ............... H04W 76/19 |
| 2019/0342804 | A1 | 11/2019 | Futaki et al. |
| 2019/0356536 | A1* | 11/2019 | Lee ............... H04W 76/15 |
| 2020/0068379 | A1* | 2/2020 | Martin ............... H04W 8/00 |
| 2021/0176692 | A1 | 6/2021 | Rugeland et al. |
| 2021/0211945 | A1 | 7/2021 | Rugeland et al. |
| 2021/0329723 | A1 | 10/2021 | Teyeb et al. |

FOREIGN PATENT DOCUMENTS

| | | |
|---|---|---|
| WO | 2016172492 A1 | 10/2016 |
| WO | 2018029621 A1 | 2/2018 |
| WO | 2020067961 A1 | 4/2020 |
| WO | 2020067965 A1 | 4/2020 |

OTHER PUBLICATIONS

"3rd Generation Partnership Project; Technical Specification Group Radio Access Network; Evolved Universal Terrestrial Radio Access (E-UTRA);" Radio Resource Control (RRC); Protocol specification Release 15, 3GPP TS 36.331 V15.2.0, Jun. 2018, pp. 1-791.

"3rd Generation Partnership Project; Technical Specification Group Radio Access Network; Evolved Universal Terrestrial Radio Access (E-UTRA); Radio Resource Control (RRC);" Protocol specification (Release 15), 3GPP TS 36.331 V15.2.2, Jun. 2018, pp. 1-791.

"3rd Generation Partnership Project; Technical Specification Group Radio Access Network; Evolved Universal Terrestrial Radio Access (E-UTRA) and Evolved Universal Terrestrial Radio Access Network (E-UTRAN);" Overall description; Stage 2, (Release 15), 3GPP TS 36.300 V15.2.0, Jun. 2018, pp. 1-357.

"3rd Generation Partnership Project; Technical Specification Group Radio Access Network; Evolved Universal Terrestrial Radio Access (E-UTRA);" Physical channels and modulation, (Release 14), 3GPP TS 36.211 V14.7.0, Jun. 2018, pp. 1-197.

"3rd Generation Partnership Project; Technical Specification Group Radio Access Network; NR; NR and NG-RAN Overall Description;" Stage 2, (Release 15), 3GPP TS 38.300 V15.2.0, Jun. 2018, pp. 1-87.

"3rd Generation Partnership Project; Technical Specification Group Radio Access Network;" NG-RAN; Xn application protocol (XnAP) (Release 15), 3GPP TS 38.423 V15.0.0, Jun. 2018, pp. 1-195.

"3rd Generation Partnership Project; Technical Specification Group Radio Access Network," NR; Radio Resource Control (RRC) protocol specification, Release 15, 3GPP TS 38.331 V15.2.1, Jun. 2018, pp. 1-303.

"3rd Generation Partnership Project; Technical Specification Group Services and System Aspects; 3GPP System Architecture Evolution (SAE)," Security architecture (Release 15), 3GPP Standard ; Technical Specification ; 3GPP TS 33.401 V15.1.0, Sep. 21, 2017, pp. 1-161.

"3rd Generation Partnership Project; Technical Specification Group Services and System Aspects; 3GPP System Architecture Evolution (SAE)," Security architecture (Release 15), 3GPP Standard ; Techincal Specification ; 3GPP TS 33.401 V15.4.0, Jun. 2018, pp. 1-162.

"3rd Generation Partnership Project; Technical Specification Group Services and System Aspects;" Security architecture and procedures for 5G system, Release 15, 3GPP TS 33.501-15.1.0, Jun. 2018, pp. 1-152.

3GPP TSG-RAN WG2 #103, Tdoc R2-1812449, Gothenburg, Sweden, Aug. 20-24, 2018, pp. 1-3.

3GPP TSG-WG2 Meeting #102AH R2-1810388, Montreal, Canada, Jul. 2-6, 2018, pp. 1-388.

3GPP TSG-WG2 Meeting #103, R2-1813492, Gothenburg, Sweden, Aug. 20-24, 2018, pp. 1-472.

International Preliminary Report on Patentability dated Dec. 17, 2020 in related/corresponding PCT Application No. PCTSE2019050875.

International Preliminary Report on Patentability dated Dec. 18, 2020 in related/corresponding PCT Application No. PCT/SE2019/050888.

International Preliminary Report on Patentability dated Dec. 21, 2020 in related/corresponding PCT Application No. PCT/SE2019/050878.

International Search Report / Written Opinion dated Dec. 10, 2019 in related/corresponding PCT Application No. PCT/SE2019/050888.

International Search Report / Written Opinion dated Nov. 8, 2019 in related/corresponding PCT Application No. PCT/SE2019/050875.

International Search Report / Written Opinion dated Nov. 19, 2019 in related/corresponding PCT Application No. PCT/SE2019/050878.

Office Action in corresponding/related U.S. Appl. No. 17/270,155 dated Sep. 11, 2023.

3GPP TSG-CT WG1 Meeting #105, C1-173248, "Supporting cross-carrier operation for V2X communication over PC5," Krakow, Poland, Aug. 21-25, 2017, 7 pages.

Office Action in corresponding/related Chinese Patent Application No. 201980062230.1 dated Nov. 29, 2023.

\* cited by examiner

Fig. 6 Method performed by wireless device 120,122

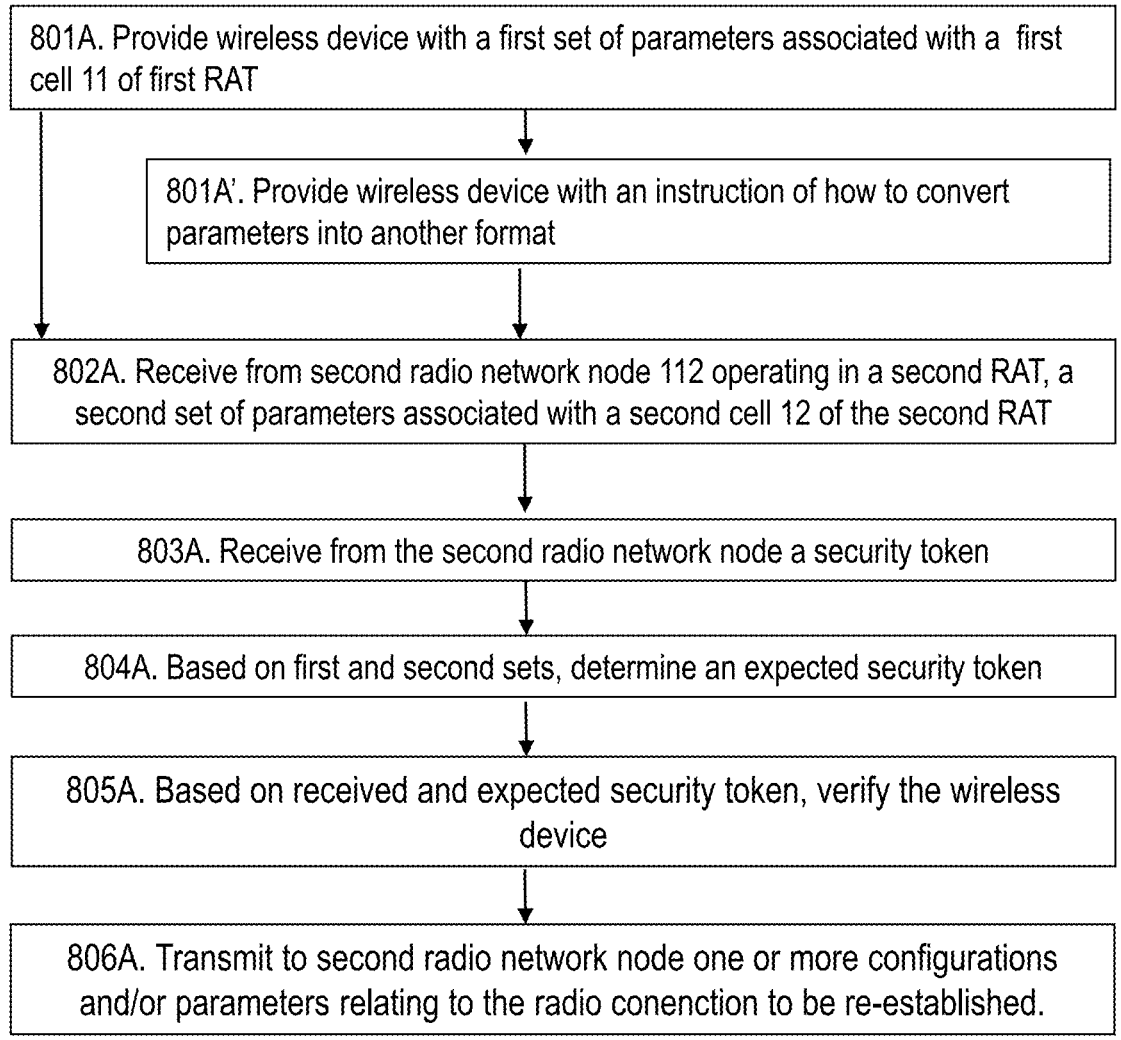

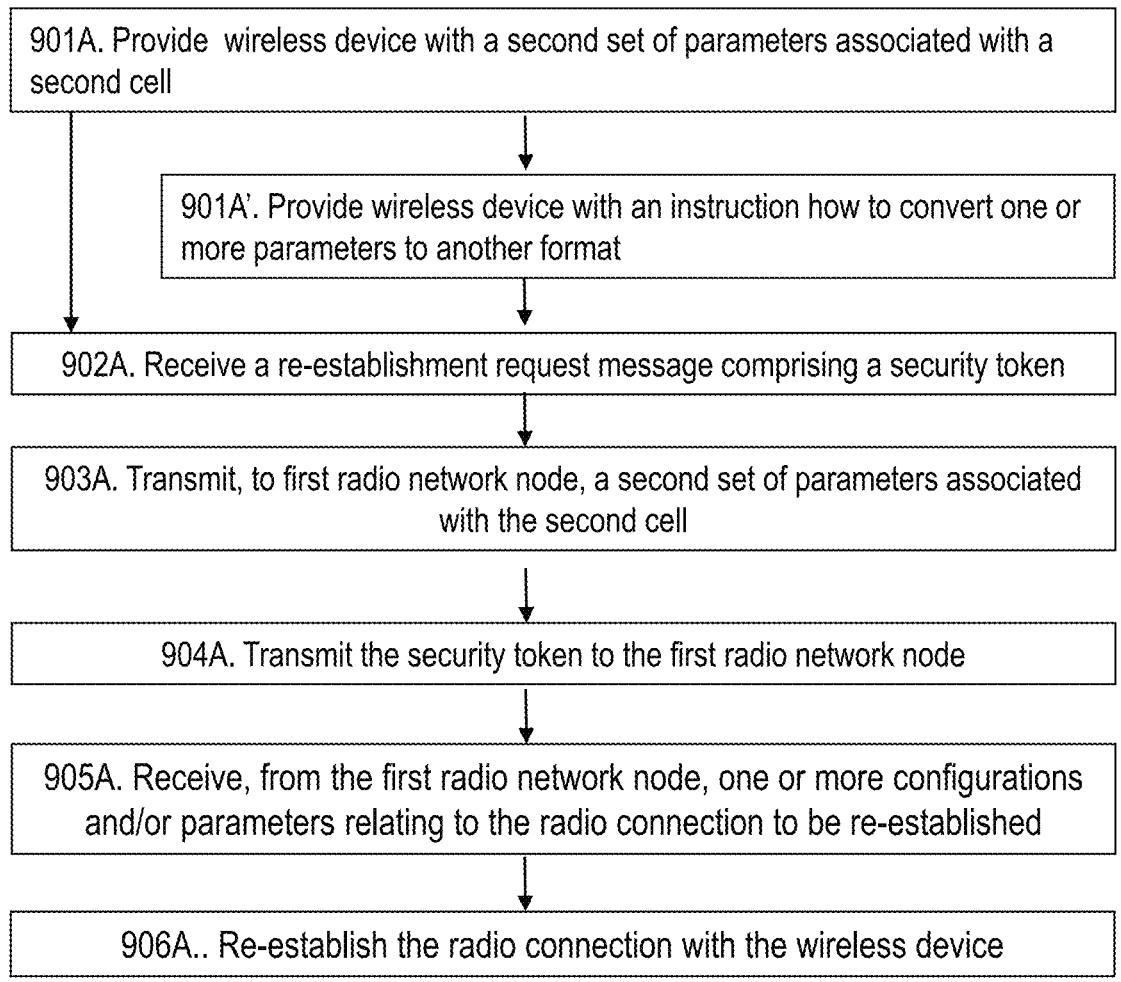
Fig. 9A Method performed by second radio network node 112

UE is connected to LTE and detects failure and Reestablishes in LTE or NR.
Calculate the inter-RAT integrity checksum using NR format and procedures UE is connected to an NR cell when detecting failure and initiates RRC Reestablishment towards NR or LTE. Calculate the inter-RAT integrity checksum using LTE format and procedures UE is connected to an LTE cell when detecting failure and initiates RRC Reestablishment towards NR or LTE. Calculate the inter-RAT integrity checksum using LTE format and NR procedures UE is connected to an NR cell when detecting failure and initiates RRC Reestablishment towards LTE or NR. Calculate the inter-RAT integrity checksum using NR format and LTE procedures UE is connected to an LTE cell when detecting failure and initiates RRC Reestablishment towards LTE or NR.
Calculate the inter-RAT integrity checksum using a new IE defined in NR format and use NR procedures UE is connected to an NR cell when detecting failure and initiates RRC Reestablishment towards LTE or NR. Calculate the inter-RAT integrity checksum using a new IE defined in LTE format and use LTE procedures UE is connected to an LTE cell when detecting failure and initiates RRC Reestablishment towards LTE or NR. Calculate the inter-RAT integrity checksum using a new IE defined in LTE format and use NR procedures UE is connected to an NR cell when detecting failure and initiates RRC Reestablishment towards LTE or NR. Calculate the inter-RAT integrity checksum using a new IE defined in NR format and use LTE procedures

RADIO NETWORK NODE, A WIRELESS DEVICE AND METHODS THEREIN FOR RE-ESTABLISHING A RADIO CONNECTION

BACKGROUND

In a typical wireless communication network, wireless devices, also known as wireless communication devices, mobile stations, stations (STAs) and/or User Equipments (UEs), communicate via a Local Area Network (LAN) such as a WiFi network or a Radio Access Network (RAN) to one or more Core Networks (CN). The RAN covers a geographical area which is divided into service areas or cell areas, which may also be referred to as a beam or a beam group, with each service area or cell area being served by a radio network node such as a radio access node e.g., a Wi-Fi access point or a Radio Base Station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

1.1 Inter-RAT and Inter 5GC Working in LTE and NR

The 5G network in the 3GPP introduces both a new core network (5GC) and a new Radio Access Network (NR). The core network, 5GC, will however, also support other RATs than NR. It has been agreed that the LTE (or E-UTRA) RAT should also be connected to the 5GC. LTE base stations (eNBs) that are connected to the 5GC is called ng-eNB and is part of the NG-RAN which also consists of NR base stations called gNBs. FIG. 1 schematically shows how the base stations are connected to each other and to the nodes in the 5GC.

Currently in an LTE (EUTRA) RAT connected to the 5GC (5G Core network) and in the NR RAT the state transitions schematically illustrated in FIG. 2 are supported. FIG. 2 schematically illustrates UE state machine and state transitions between NR/5GC, E-UTRA/EPC and E-UTRA/5GC.

As shown it is possible to move ongoing UE connection i.a. a UE is in an RRC_CONNECTED state between the two RATs using a handover procedure. Additionally (not shown) it is possible for the network to move the UE to the other RAT by sending a Release message with re-direct information. When the UE is in an IDLE state or an INACTIVE state the cell reselection procedure will be used when transiting between the RATs. Within the RATs there is also an RRC Re-establishment procedure which may be triggered if the UE loses the radio connection, e.g. due to a Radio Link Failure (RLF) or at intra- or inter-RAT handover failure. The RRC re-establishment procedure is not supported between the RATs, instead the UE which e.g. experiences an RLF in one RAT will if it find a suitable cell in a different RAT performing a transition to the RRC_IDLE state and perform a new RRC connection setup (further elaborated in next section).

In NR and E-UTRA, i.e. LTE connected to 5GC, it has been introduced a new RRC state called an RRC_INACTIVE state. In this disclosure, the term NG-RAN refers to either NR or LTE connected to 5G Core network.

1.2 RRC Reestablishment in Both NR Rel-15 and LTE

In a NR RAT, if a UE in an RRC_CONNECTED state detects a radio link failure (RLF) on the Master Cell Group (MCG) in the NR and the LTE, or if the UE fails a handover, the UE selects a suitable cell and initiates an RRC reestablishment. The definition of a suitable cell in TS 38.300 is:

A suitable cell is one for which the measured cell attributes satisfy the cell selection criteria; the cell Public Land Mobile Network (PLMN) is the selected PLMN, registered or an equivalent PLMN; the cell is not barred or reserved and the cell is not part of a tracking area which is in the list of "forbidden tracking areas for roaming";

If the UE selects an NR cell, the UE stops a timer T311 and initiates the re-establishment procedure by starting the timer T301 and transmitting the re-establishment request. However, if the UE selects an inter-RAT cell, e.g. an LTE cell connected to EPC or an LTE cell connected to 5GC, the UE will transition to an IDLE state and perform NAS signalling which is less optimized than re-establishment. So, if the UE is in an RRC_CONNECTED state in the NR RAT it will enter the RRC_IDLE state and upper layers may trigger a new connection. For NR, that is specified in TS 38.331 in 5.3.7.3 as follows:

TS 38.331 section 5.3.7.3 Actions following cell selection while T311 is running Upon selecting a suitable NR cell, the UE shall:
1> stop timer T311;
1> start timer T301;
1> initiate transmission of the RRCReestablishmentRequest message in accordance with 5.3.7.4

NOTE: This procedure applies also if the UE returns to the source PCell.

Upon selecting an inter-RAT cell, the UE shall:
1> perform the actions upon going to RRC_IDLE as specified in 5.3.11, with release cause 'RRC connection failure';

The behaviour described above for NR, according to TS 38.300 and TS 38.331 is similar the one in LTE, given in TS 36.300 and TS 36.331, with few differences e.g. in the structure of the messages. During the reestablishment procedure in any of the RATs in the intra-RAT case, the UE prepares and transmits the RRCConnectionReestablishmentRequest in E-UTRA if failure happens declared in E-UTRA, or the RRCReestablishmentRequest in NR if failure happens in NR.

| RRCConnectionReestablishmentRequest message |
|---|
| -- ASN1START<br>RRCConnectionReestablishmentRequest ::=    SEQUENCE {<br>   criticalExtensions                              CHOICE {<br>      rrcConnectionReestablishmentRequest-r8<br>                                        RRCConnectionReestablishmentRequest-r8-IEs,<br>      criticalExtensionsFuture                    SEQUENCE { }<br>   }<br>}<br>RRCConnectionReestablishmentRequest-r8-IEs ::= SEQUENCE {<br>   ue-Identity                                 ReestabUE-Identity,<br>   reestablishmentCause                        ReestablishmentCause,<br>   spare                                       BIT STRING (SIZE (2))<br>}<br>ReestabUE-Identity ::=                          SEQUENCE {<br>   c-RNTI                                      C-RNTI,<br>   physCellId                                  PhysCellId,<br>   shortMAC-I                                  ShortMAC-I<br>}<br>ReestablishmentCause ::=                        ENUMERATED {<br>      reconfigurationFailure, handoverFailure,<br>      otherFailure, spare1}<br>-- ASN1STOP |

| RRCConnectionReestablishmentRequest field descriptions |
|---|
| physCellId<br>The Physical Cell Identity of the PCell the UE was connected to prior to the failure.<br>reestablishmentCause<br>Indicates the failure cause that triggered the re-establishment procedure. eNB is not expected to reject a RRCConnectionReestablishmentRequest due to unknown cause value being used by the UE.<br>ue-Identity<br>UE identity included to retrieve UE context and to facilitate contention resolution by lower layers. |

| RRCReestablishmentRequest message |
|---|
| -- ASN1START<br>-- TAG-RRCREESTABLISHMENTREQUEST-START<br>RRCReestablishmentRequest ::=     SEQUENCE {<br>   rrcReestablishmentRequest          RRCReestablishmentRequest-IEs<br>} |

| RRCReestablishmentRequest message |
|---|
| RRCReestablishmentRequest-IEs ::=   SEQUENCE {<br>   ue-Identity                         ReestabUE-Identity,<br>   reestablishmentCause                ReestablishmentCause,<br>   spare                               BIT STRING (SIZE (1))<br>}<br>ReestabUE-Identity ::=                 SEQUENCE {<br>   c-RNTI                              RNTI-Value,<br>   physCellId                          PhysCellId,<br>   shortMAC-I                          ShortMAC-I<br>}<br>ReestablishmentCause ::=               ENUMERATED {<br>      reconfigurationFailure,<br>handoverFailure, otherFailure, spare1}<br>-- TAG-RRCREESTABLISHMENTREQUEST-STOP<br>-- ASN1STOP |

| RRCReestablishmentRequest field descriptions |
|---|
| physCellId<br>The Physical Cell Identity of the PCell the UE was connected to prior to the failure.<br>reestablishmentCause<br>Indicates the failure cause that triggered the re-establishment procedure. gNB is not expected to reject a RRCReestablishmentRequest due to unknown cause value being used by the UE.<br>ue-Identity<br>UE identity included to retrieve UE context and to facilitate contention resolution by lower layers. |

In both LTE and NR, the different RRC Reestablishment messages contain a ue-Identity, which contain a security token, e.g. shortMAC-I, used to authenticate the UE in the serving node hosting the UE AS context, when the UE tries to re-establish the connection after the failure.

1.3 Message Authentication Code-Integrity

In LTE and NR, integrity protection of messages is performed in the Packet Data Convergence Protocol (PDCP)

in both the network and the UE by computing a Message Authentication Code-Integrity (MAC-I) which is included in the PDCP header. When the receiver receives the PDCP packet it computes and verifies the MAC-I using the same inputs and algorithms as the transmitter so that each side may be authenticated. The derivations are specified in TS 33.401 and TS 33.501 for EPS and 5GS respectively, although the only difference is which algorithms are applied. For E-UTRA connected to either EPC or 5GC, the algorithms used are defined in TS 33.401, while for NR, the algorithms used are defined in TS 33.501:

Below is an excerpt from TS 33.501 v 15.1.0 (2018-06) for the derivation of the MAC-I:

The input parameters to the integrity algorithm are a 128-bit integrity key named KEY, a 32-bit COUNT, a 5-bit bearer identity called BEARER, the 1-bit direction of the transmission i.e. DIRECTION, and the message itself i.e. MESSAGE. The DIRECTION bit shall be 0 for uplink and 1 for downlink. The bit length of the MESSAGE is LENGTH.

FIG. 3 schematically illustrates the use of the NR Integrity Algorithm (NIA) to authenticate the integrity of messages.

Based on these input parameters the sender computes a 32-bit message authentication code (MAC-I/NAS-MAC) using the integrity algorithm NIA. The message authentication code is then appended to the message when sent. For integrity protection algorithms, the receiver computes the expected message authentication code (XMAC-I/XNAS-MAC) on the message received in the same way as the sender computed its message authentication code on the message sent and verifies the data integrity of the message by comparing it to the received message authentication code, i.e. MAC-I/NAS-MAC.

The integrity protection is always applied for control signaling, e.g. for RRC messages, and is configurable for user plane messages in NR.

SUMMARY

Embodiments disclosed herein relate to inter-RAT connection reestablishment i.e. when the UE being connected in one RAT, e.g. a first RAT, detects a failure and needs to reestablish in another RAT, e.g. a second RAT. The first and second RATs are different RAT. In prior art, it is not clear how the UE should calculate the security token, e.g. a MAC-I, of a target RAT, e.g. the second RAT, and how the UE should handle the input parameters when it has been connected in a cell from a different source RAT, e.g. the first RAT, since the input parameters used are different in the two RATs e.g. in terms of the number of bits, their exact meaning, etc.

An object of embodiments disclosed herein is therefore to overcome or at least ameliorate the drawbacks with the prior art.

According to an aspect of embodiments herein, the object is achieved by a method performed by a wireless device for re-establishing a radio connection in a wireless communications network comprising a first Radio Access Technology (RAT) and a second RAT being different from the first RAT. The wireless device is operating in a first cell served by a first radio network node operating in the first RAT.

When a connection failure with the first cell served by the first radio network node is detected, the wireless device performs a cell selection and selects a second cell served by a second radio network node operating in the second RAT. The second cell is known by the wireless device to be a candidate for reestablishment.

The wireless device determines a first set of parameters associated with the first cell. The first set of parameters comprises at least one parameter identifying the wireless device or the first cell.

The wireless device receives a second set of parameters associated with the second cell. The second set of parameters comprises at least one parameter identifying the wireless device or the second cell.

Further, the wireless device determines a security token based on the first and second sets of parameters, and transmits, to the second cell, a re-establishment request message comprising the security token.

According to another aspect of embodiments herein, the object is achieved by a wireless device for re-establishing a radio connection in a wireless communications network comprising a first Radio Access Technology (RAT) and a second RAT being different from the first RAT. The wireless device is configured to operate in a first cell served by a first radio network node operating in the first RAT.

The wireless device is configured to perform a cell selection and selects a second cell served by a second radio network node operating in the second RAT, when a connection failure with the first cell served by the first radio network node is detected. The second cell is known by the wireless device to be a candidate for reestablishment.

The wireless device is configured to determine a first set of parameters associated with the first cell. The first set of parameters comprises at least one parameter identifying the wireless device or the first cell.

The wireless device is configured to receive a second set of parameters associated with the second cell. The second set of parameters comprises at least one parameter identifying the wireless device or the second cell.

Further, the wireless device is configured to determine a security token based on the first and second sets of parameters, and to transmit, to the second cell, a re-establishment request message comprising the security token.

According to another aspect of embodiments herein, the object is achieved by a method performed by a first radio network node for assisting a wireless device in re-establishing a radio connection in a wireless communications network comprising a first RAT and a second RAT being different from the first RAT. The wireless device is operating in a first cell served by the first radio network node operating in the first RAT.

The first radio network node provides the wireless device with a first set of parameters associated with the first cell. The first set of parameters comprises at least one parameter identifying the wireless device or the first cell.

The first radio network node receives, from a second radio network node operating in the second RAT, a second set of parameters associated with a second cell served by the second radio network node.

Further, the first radio network node receives, from the second radio network node, a security token received by the second radio network node in a re-establishment request message from the wireless device when a failure of a radio connection with the first radio network node has been detected.

The first radio network node determines an expected security token based on the first and second sets of parameters and verifies the wireless device's identity by means of the received security token and the determined expected security token.

The first radio network node transmits, to the second radio network node, one or more configurations and/or parameters relating to the radio connection to be re-established, when the wireless device is verified as valid.

According to another aspect of embodiments herein, the object is achieved by a first radio network node for assisting a wireless device in re-establishing a radio connection in a wireless communications network comprising a first RAT and a second RAT being different from the first RAT. The wireless device is configured to operate in a first cell served by the first radio network node operating in the first RAT.

The first radio network node is configured to provide the wireless device with a first set of parameters associated with the first cell. The first set of parameters comprises at least one parameter identifying the wireless device or the first cell.

The first radio network node is configured to receive, from a second radio network node operating in the second RAT, a second set of parameters associated with a second cell served by the second radio network node.

Further, the first radio network node is configured to receive, from the second radio network node, a security token received by the second radio network node in a re-establishment request message from the wireless device when a failure of a radio connection with the first radio network node has been detected.

The first radio network node is configured to determine an expected security token based on the first and second sets of parameters and to verify the wireless device's identity by means of the received security token and the determined expected security token.

According to another aspect of embodiments herein, the object is achieved computer program comprises instructions, which when executed by at least one processor of the wireless device, cause the at least one processor of the wireless device to perform one or more of the actions described herein.

According to another aspect of embodiments herein, the object is achieved computer program comprises instructions, which when executed by at least one processor of the first radio network node, cause the at least one processor of the first radio network node to perform one or more of the actions described herein.

According to another aspect of embodiments herein, the object is achieved by a carrier comprising the respective computer program, wherein the carrier is one of an electronic signal, an optical signal, an electromagnetic signal, a magnetic signal, an electric signal, a radio signal, a microwave signal, or a computer-readable storage medium.

Since the wireless device determines the security token based on the first set of parameters associated with the first cell of the first RAT from which first cell a link failure is detected and based on the second set of parameters associated with the second cell of the second RAT being different from the first RAT, a connection may be re-established after a link failure based on the old configurations instead of being released and re-established from scratch. Thereby, the signaling needed to re-establish the connection after the link failure is reduced as is the time needed for resuming the connection. This results in an improved performance of the wireless communications network.

An advantage of some embodiments disclosed herein is that they enable the wireless device to be connected in one RAT, e.g. in LTE or NR, and then attempt to reestablish in the other RAT if the wireless device experiences a failure in the first RAT triggering re-establishment. Thanks to that, faster recovery is possible as the RRC reestablishment procedure is expected to be faster to execute than transition via the RRC_IDLE state which is the existing solution for the inter-RAT scenarios in Rel-15 specifications. For example, this is particularly likely since NR maybe deployed in quite high frequencies and relies on beamforming, where radio related failures may be more common than in current systems. Then, the wireless device could efficiently re-connect to LTE.

Another advantage of some embodiments disclosed herein is that it they provide for a secured solution for inter-RAT reestablishment. Without embodiments disclosed herein, the wireless device and the radio network node would not be able to calculate the security token required to authenticate the wireless device during an inter-RAT reestablishment procedure or during any procedure where the first RAT and re-establishment second RAT have different formatting for the security token calculation.

BRIEF DESCRIPTION OF THE DRAWINGS

Examples of embodiments herein are described in more detail with reference to attached drawings in which:

FIG. 8A is a flowchart depicting embodiments of methods in a first radio network node;

FIG. 9A is a flowchart depicting embodiments of methods in a second radio network node;

DETAILED DESCRIPTION

As a part of developing embodiments herein a problem will first be identified and discussed.

2.1 Inter-RAT Re-Establishment Between NR and eLTE

In both LTE and NR, when the UE detects a radio link failure it needs to select a suitable cell and, if that cell is in the same RAT, the UE initiates an RRC reestablishment procedure. However, if the cell the UE re-selects to is an inter-RAT cell, the UE will release the AS context and go to an RRC_IDLE state, possibly triggering NAS recovery with a new connection establishment.

The performance of the RRC re-establishment procedure is much better than the performance of a procedure going via the IDLE state. In LTE connected to the EPC, upon transmitting a re-establishment request like message, the network, e.g. the serving node hosting the UE AS Context, is able to verify the UE thanks to the security token short MAC-I. Then the UE receives a re-establishment message for the SRB1 setup and sends a complete message. Afterwards, the UE receives an RRC Reconfiguration. This may either occur upon the triggering of the RLF or upon the expiry of the timer T304 during handover, i.e. during handover failure. In the re-establishment case the core network connection does not need to be teared down and both the UE and the network may be prepared in terms of security.

Despite these benefits in re-establishment, inter-RAT re-establishment in LTE towards other RATs, like UTRA or GSM, was not supported. That seemed quite complex and perhaps not feasible since other RATs, e.g. the UTRAN and the GSM; would always have different core networks. And, it would not be possible to identify the UE AS context and maintain the CN connection.

In NR, for release 15, inter-RAT re-establishment at least between NR and eLTE, i.e. when LTE is connected to 5GC, was considered and has quite some likelihood to be standardized in further NR releases. In NR and eLTE, inter-RAT re-establishment is feasible thanks to the fact that the same CN is used for both eLTE and NR. In other words both RATs are connected to the same core network. Also, many aspects are to certain extent harmonized across RATs such as security algorithms and overall framework, higher layers protocols (like PDCP), etc. Such a solution also becomes attractive as it is likely that a UE connected to an NR cell may experience sudden drop in radio conditions which may lead to RLF and/or handover (reconfiguration with sync) failures due to the higher frequencies of NR. Notice that LTE or eLTE here refers to the EUTRA radio interface.

Figure 1:
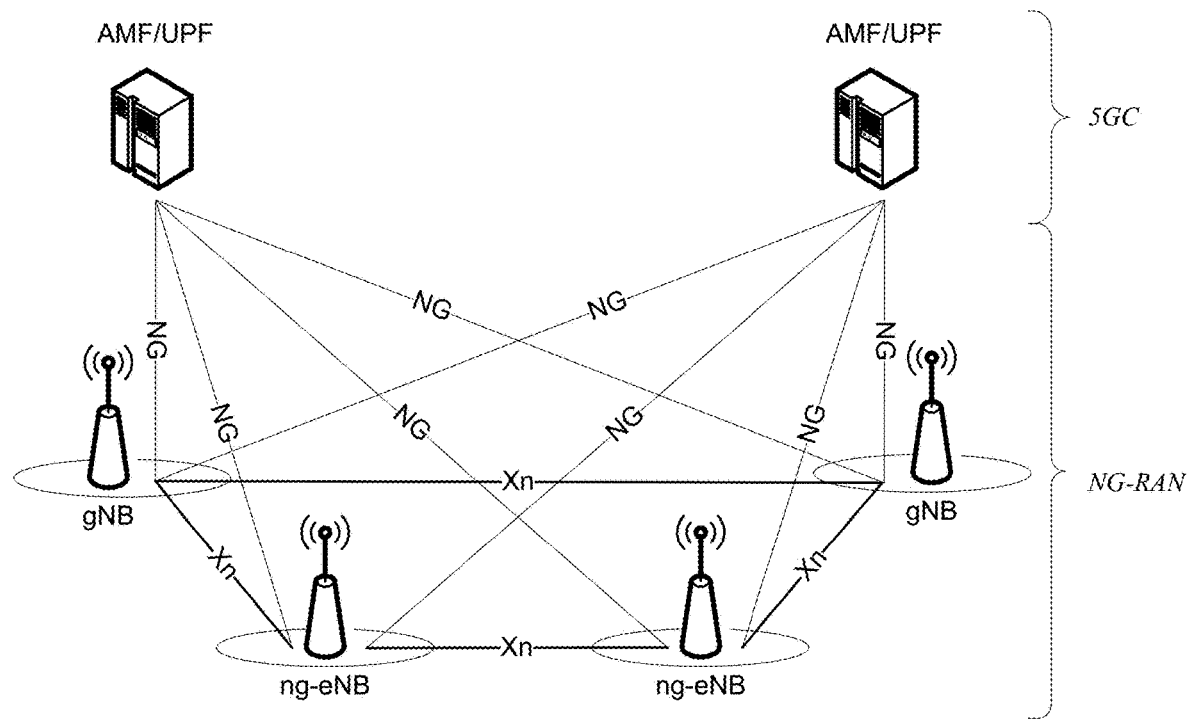
FIG. 1 is a schematic block diagram illustrating a 5G wireless communications network according to prior art.
Figure 2:
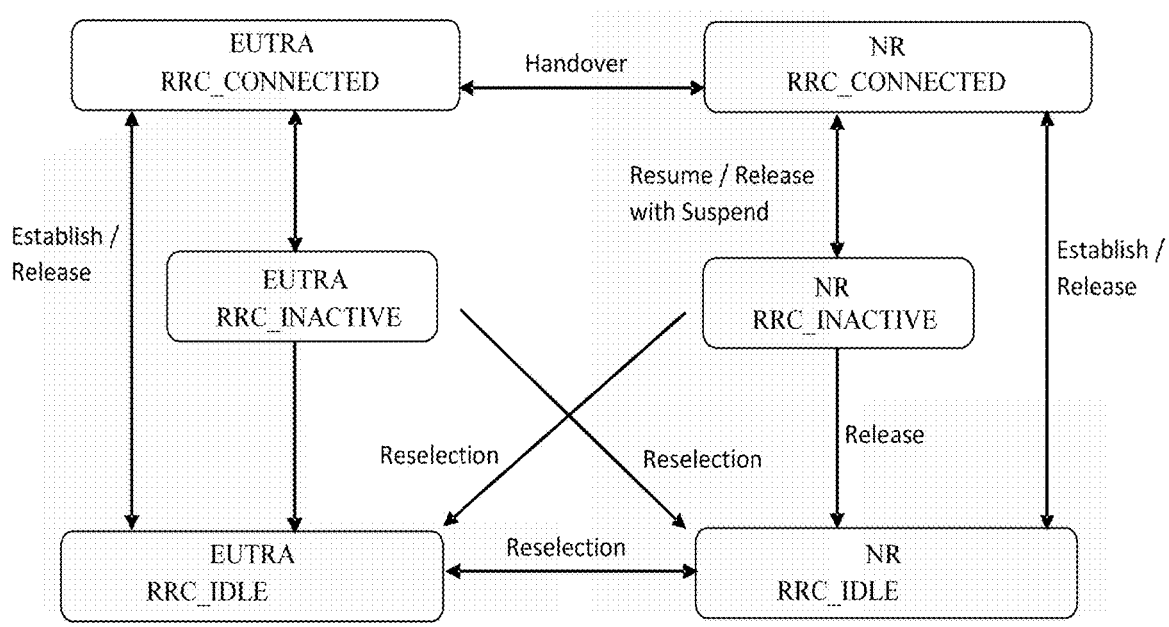
FIG. 2 is a schematic block diagram illustrating a UE state machine and state transitions between an EUTRA access network and a NR access network according to prior art.
Figure 3:
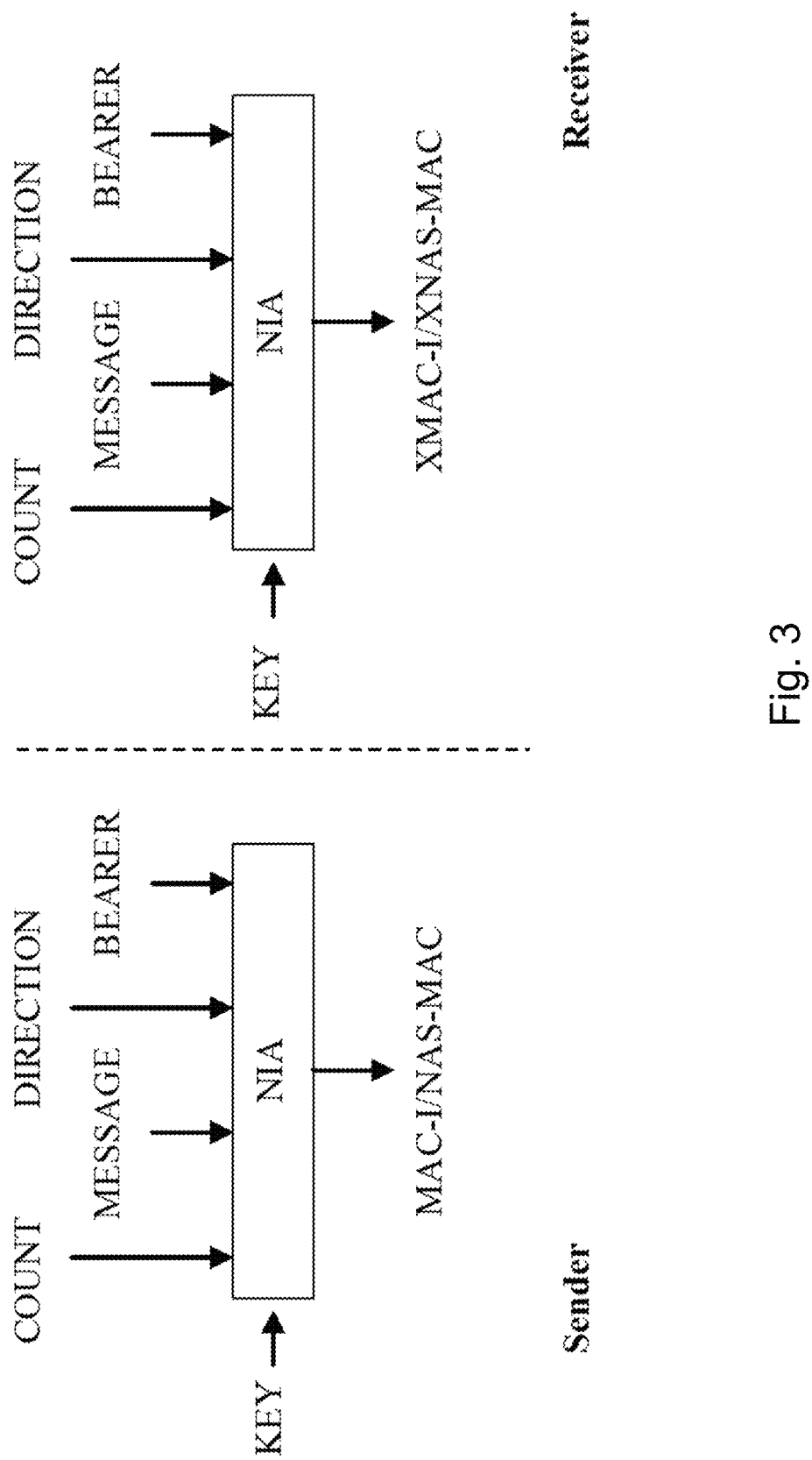
FIG. 3 is a schematic block diagram illustrating input parameters to and output parameter from an NR integrity algorithm NIA at a sender and a receiver, respectively, according to prior art.
Figure 4A:
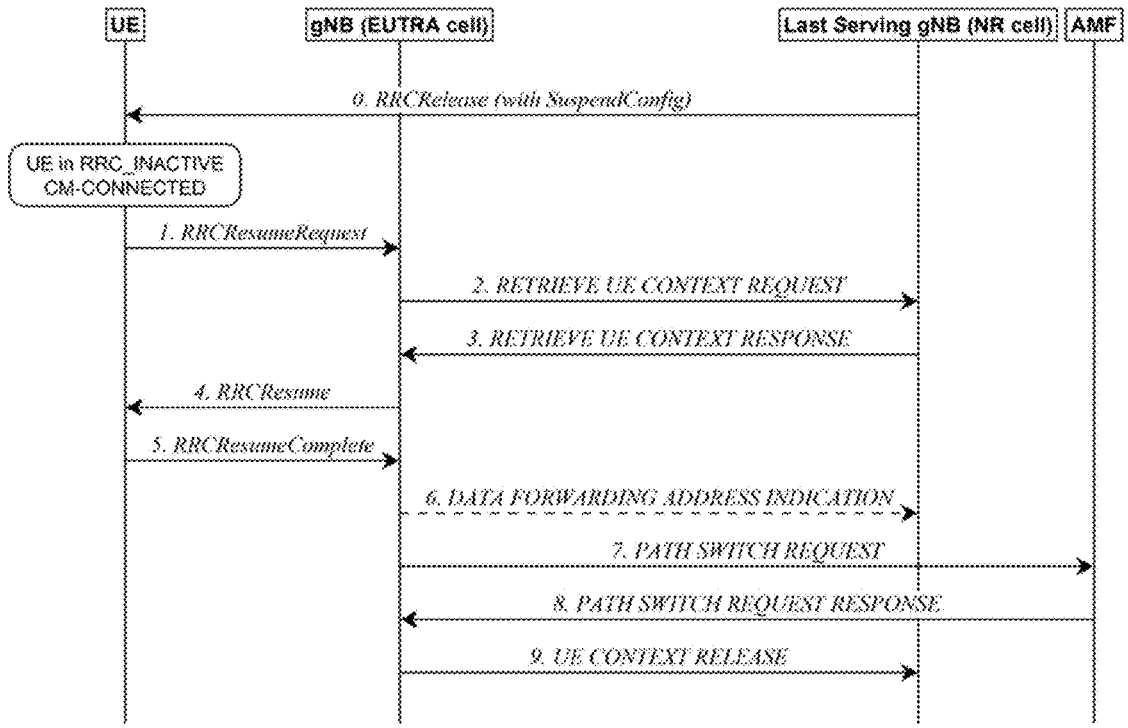
FIG. 4A is a combined signaling scheme and flowchart illustrating signaling for inter-RAT re-establishment when a UE detects a failure in NR while in an RRC_CONNECTED state and upon selecting a cell in LTE triggers an re-establishment.
Figure 4B:
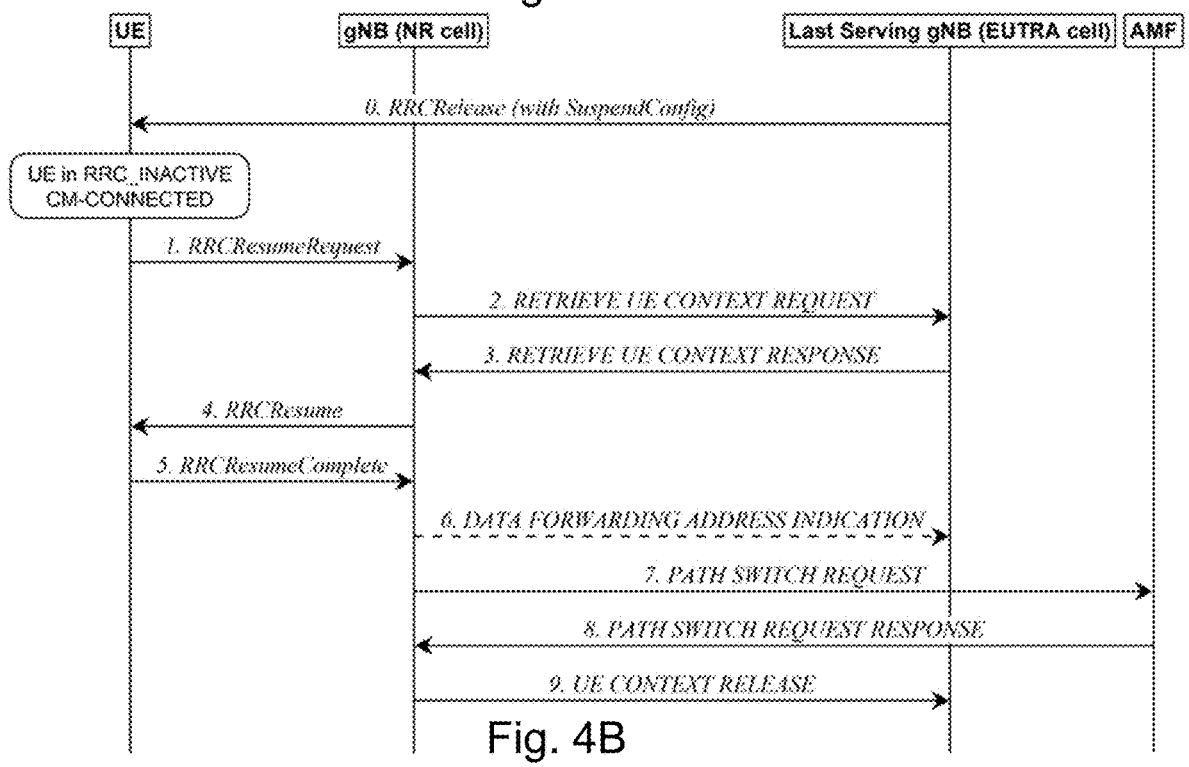
FIG. 4B is a combined signaling scheme and flowchart illustrating signaling for inter-RAT re-establishment when a UE detects a failure in LTE while in an RRC_CONNECTED state and upon selecting a cell in NR triggers an re-establishment.

In the context of some embodiments, the term inter-RAT re-establishment is mostly used when the UE detects a failure in a first RAT, e.g. in NR, while being in an RRC_CONNECTED state and, upon selecting a cell in a second RAT, e.g. in eLTE, triggers a re-establishment instead of going via an RRC_IDLE state, as shown in the FIGS. 4A and 4B below for the successful case.

By the term security token when used herein is meant a message authentication token or some secure signature which may only be generated by an UE that has access to the correct session keys. The generation of the security token may be done using a secure algorithm, e.g. secure hash, checksum, integrity protection algorithm or other. The security token may be a Message Authentication Code (MAC) or a part thereof. In this disclosure the terms security token and message authentication token may be used interchangeably.

Sometimes in this disclosure reference to the expiry of a timer is made. It should be understood that such a reference refers to the expiry of a time period.

An existing solution is the intra-RAT re-establishment procedure/messages in NR and eLTE. When the UE attempts the RRC Reestablishment, it transmits an RRC Reestablishment Request message, which contains a security token, e.g. a shortMAC-I, used to authenticate the UE.

Some embodiments disclosed herein relate to inter-RAT connection reestablishment i.e. when the UE being connected in one RAT, e.g. a first RAT, detects a failure and needs to reestablish in another RAT, e.g. a second RAT. The first and second RATs are different RAT. In prior art, it is not clear how the UE calculates the security token, e.g. a MAC-I, of a target RAT, e.g. the second RAT, and how it handles input parameters when it has been connected in a cell from a different source RAT, e.g. the first RAT, since the input parameters used are different in the two RATs e.g. in terms of the number of bits, their exact meaning, etc.

For a NR re-establishment, the calculation of the security token according to TS 38.331 section 5.3.7.4 is shown below.

TS 38.331 5.3.7.4 Actions related to transmission of RRCReestablishmentRequest message The UE shall set the contents of RRCReestablishmentRequest message as follows:

1> set the ue-Identity as follows:
  2> set the c-RNTI to the C-RNTI used in the source PCell (reconfiguration with sync or mobility from NR failure) or used in the PCell in which the trigger for the re-establishment occurred (other cases);
  2> set the physCellId to the physical cell identity of the source PCell (reconfiguration with sync or mobility from NR failure) or of the PCell in which the trigger for the re-establishment occurred (other cases);
  2> set the shortMAC-I to the 16 least significant bits of the MAC-I calculated:
    3> over the ASN.1 encoded as per section 8 (i.e., a multiple of 8 bits) VarShortMAC-Input;
    3> with the $K_{RRCint}$ key and integrity protection algorithm that was used in the source PCell (reconfiguration with sync or mobility from NR failure) or of the PCell in which the trigger for the re-establishment occurred (other cases); and
    3> with all input bits for COUNT, BEARER and DIRECTION set to binary ones;
  2> if the re-establishment procedure was initiated due to reconfiguration failure as specified in 5.3.5.8:
    3> set the reestablishmentCause to the value reconfigurationFailure;
  2> else if the re-establishment procedure was initiated due to reconfiguration with sync failure as specified in 5.3.5.8.3 (intra-NR handover failure) or 5.4.3.5 (inter-RAT mobility from NR failure):
    3> set the reestablishmentCause to the value handoverFailure;
  2> else:
    3> set the reestablishmentCause to the value otherFailure;
1> restore the RRC configuration and security context from the stored UE AS context;
1> restore the PDCP state and re-establish PDCP for SRB1;
1> re-establish RLC for SRB1;
1> resume SRB1;
1> The UE shall submit the RRCReestablishmentRequest message to lower layers for transmission.

The UE variable in NR with the parameters to compute the security token for the re-establishment (e.g. short MAC-I) is shown below:

VarShortMAC-Input

The UE variable VarShortMAC-Input specifies the input used to generate the shortMAC-I during RRC Connection Reestablishment procedure.

| VarShortMAC-Input variable |
| --- |
| -- ASN1START |
| -- TAG-VAR-SHORTMACINPUT-START |
| VarShortMAC-Input ::=           SEQUENCE { |
|   sourcePhysCellId                PhysCellId, |
|   targetCellIdentity              CellIdentity, |
|   source-c-RNTI                   RNTI-Value |
| } |
| -- TAG-VAR- SHORTMACINPUT-STOP |
| -- ASN1STOP |

| VarShortMAC-Input field descriptions |
| --- |
| targetCellIdentity |
| Set to CellIdentity of the target cell i.e. the cell the UE is trying to reestablish the connection. |
| source-c-RNTI |
| Set to C-RNTI that the UE had in the PCell it was connected to prior to the reestablishment. |
| sourcePhysCellId |
| Set to the physical cell identity of the PCell the UE was connected to prior to the RRC connection. |

For the LTE re-establishment, the calculation of the security token according to TS 36.331 also in section 5.3.7.4 is shown below:

TS 36.331 5.3.7.4 Actions related to transmission of RRCConnectionReestablishmentRequest message Except for NB-IoT, if the procedure was initiated due to radio link failure or handover failure, the UE shall:

1> set the reestablishmentCellId in the VarRLF-Report to the global cell identity of the selected cell;

The UE shall set the contents of RRCConnectionReestablishmentRequest message as follows:

1> except for a NB-IoT UE for which AS security has not been activated, set the ue-Identity as follows:
  2> set the c-RNTI to the C-RNTI used in the source PCell (handover and mobility from E-UTRA failure) or used in the PCell in which the trigger for the re-establishment occurred (other cases);
  2> set the physCellId to the physical cell identity of the source PCell (handover and mobility from E-UTRA failure) or of the PCell in which the trigger for the re-establishment occurred (other cases);
  2> set the shortMAC-I to the 16 least significant bits of the MAC-I calculated:
    3> over the ASN.1 encoded as per section 8 (i.e., a multiple of 8 bits) VarShortMAC-Input (or VarShortMAC-Input-NB in NB-IoT);
    3> with the $KRR_{Cint}$ key and integrity protection algorithm that was used in the source PCell (handover and mobility from E-UTRA failure) or of the PCell in which the trigger for the re-establishment occurred (other cases); and
    3> with all input bits for COUNT, BEARER and DIRECTION set to binary ones;
1> for a NB-IoT UE for which AS security has not been activated, set the ue-Identity as follows:
  2> request upper layers for calculated ul-NAS-MAC and ul-NAS-Count using the cellIdentity of the PCell in which the trigger for the re-establishment occurred;
  2> set the s-TMSI to the S-TMSI provided by upper layers;
  2> set the ul-NAS-MAC to the ul-NAS-MAC value provided by upper layers;
  2> set the ul-NAS-Count to the ul-NAS-Count value provided by upper layers;
1> set the reestablishmentCause as follows:
  2> if the re-establishment procedure was initiated due to reconfiguration failure as specified in 5.3.5.5 (the UE is unable to comply with the reconfiguration):
    3> set the reestablishmentCause to the value reconfigurationFailure;
  2> else if the re-establishment procedure was initiated due to handover failure as specified in 5.3.5.6 (intra-LTE handover failure) or 5.4.3.5 (inter-RAT mobility from EUTRA failure):

3> set the reestablishmentCause to the value handoverFailure;
2> else:
3> set the reestablishmentCause to the value otherFailure;
1> if the UE is a NB-IoT UE:
2> if the UE supports DL channel quality reporting and cqi-Reporting is present in SystemInformationBlockType2-NB:
3> set the cqi-NPDCCH to include the latest results of the downlink channel quality measurements of the serving cell as specified in TS 36.133 [16];
NOTE: The downlink channel quality measurements may use measurement period T1 or T2, as defined in TS 36.133 [16]. In case period T2 is used the RRC-MAC interactions are left to UE implementation.
2> set earlyContentionResolution to TRUE;

The UE shall submit the RRCConnectionReestablishmentRequest message to lower layers for transmission.

The UE variable in NR with the parameters to compute the security token for the re-establishment (e.g. short MAC-I) is shown below
VarShortMAC-Input
The UE variable VarShortMAC-Input specifies the input used to generate the shortMAC-I.

| VarShortMAC-Input UE variable | |
|---|---|
| -- ASN1START | |
| VarShortMAC-Input ::= | SEQUENCE { |
| cellIdentity | CellIdentity, |
| physCellId | PhysCellId, |
| c-RNTI | C-RNTI |
| } | |
| -- ASN1STOP | |

| VarShortMAC-Input field descriptions |
|---|
| cellIdentity |
| Set to CellIdentity included in cellIdentity (without suffix) in SIB1 of the current cell. |
| c-RNTI |
| Set to C-RNTI that the UE had in the PCell it was connected to prior to the failure. |
| physCellId |
| Set to the physical cell identity of the PCell the UE was connected to prior to the failure. |

As shown above, in the case of LTE and NR, the input parameters used to calculate the MAC-I, e.g. exemplified in the UE variables VarShortMAC-Input in LTE TS 36.331, or in NR TS 38.331, are different and have different lengths and contains parameters related to both the source and the target cell.

Furthermore, it is not possible to simply use the parameters of one of the RATs, e.g. of the source RAT or of the target RAT, since the parameters are related to both the source cell and the target cell. For example, the CellIdentity in VarShortMAC-Input is associated with the current or target cell while the physCellId and the C-RNTI in VarShortMAC-Input are associated with the source cell.

For example, the following differences exist:
targetCellIdentity: This is the CellIdentity of the target cell i.e. the cell the UE is trying to reestablish. In NR, that is defined as a bit string of 36 bits. In LTE, that is defined as a bit string of 28 bits.

source-C-RNTI: This is the C-RNTI that the UE had in the PCell it was connected to prior to the failure. In NR, that is defined as an integer between 0 and 65535, equivalent to a bit string of 16 bits. The same number of bits was defined in LTE.

sourcePhysCellId: Set to the physical cell identity of the PCell the UE was connected to prior to the failure. In NR, that is defined as an integer between 0 and 1007, coded as a bit string of 10 bits. In NR, that is defined as an integer between 0 and 503, coded as a bit string of 9 bits.

When a UE, e.g. a wireless device, reestablishes an RRC connection it must include a security token, e.g. a Short-MAC-I, in the RRC Reestablishment Request message and the network, e.g. a radio network node, calculates the same token to authenticate the UE. To calculate this security token, the UE and the network use input variables from the source cell and from the target cell.

If a UE is connected in one RAT, e.g. LTE or NR, and experiences an RLF or a handover failure and attempts to reestablish to another RAT, e.g. NR or LTE, the required input variables will be defined in the different RATs. The parameters will have different sizes and characteristics in the different RATs.

Some embodiments disclosed herein relate to how to convert parameters used to calculate the reestablishment security token from one RAT to another RAT, e.g. how to convert the source RAT parameter to the target RAT format or vice versa, or how to adapt the procedures to allow input parameters from different source and target RATs.

This may be achieved either by modifying the content of an existing message or introducing a new message and modifying the procedures.

Some embodiments herein focus on the handling of the security token used for authentication during RRC re-establishment, computed based on the MAC-I, in the case the source cell, e.g. the source radio network node serving the source cell, and the target cell, e.g. the target radio network node serving the target cell, have differences in the input parameters for the token calculation, such as in the case of inter-RAT re-establishment or any kind of inter-RAT radio link failure/re-establishment procedure. The method is then used when the UE detects a failure in one RAT and initiates re-establishment in another RAT.

Some embodiments herein provide multiple mechanisms at a UE and a network node for generating the short MAC-I, i.e. the security token used in re-establishment procedure, and similar cryptographic checksums in case of inter-RAT re-establishment procedures or more generally, in case both the source cell where UE is connected and detects radio link failure and the target cell where the UE tries to re-establish differs in the calculation of short MAC-I or its input parameters. Some embodiments herein comprise a UE that has detected radio link failure in one first source RAT and performs a re-establishment procedure in a second RAT, the method comprises one or more out of:

Determining a first set of parameters associated to a first RAT, e.g. a source physical cell identity in first RAT, a source C-RNTI in first RAT. This may be triggered e.g. upon detecting a radio link failure, a handover failure, a beam failure, a reconfiguration with sync failure or any other failure or ordinary triggering leading to a re-establishment and/or initiating re-establishment;

Determining a second set of parameters associated to a second cell in a first RAT, e.g. to a target cell identity in first RAT. This may be done e.g. upon detection of radio link failure or before trying to re-establish in the first RAT;

Determining an updated version of one or multiple parameters from the first set of parameters associated to a first RAT, e.g. a source physical cell identity in first RAT, a source C-RNTI in first RAT. This may be done e.g. upon inter-RAT cell reselection, cell selection or before trying to re-establish in a second RAT. How these are determined is explained later in different embodiments.

Determining an updated version of one or multiple parameters in this second set of parameters associated to a second cell in a second RAT, e.g. to a target cell identity in the second RAT or any other parameters for replay attack avoidance or protocol discriminator. That may be done e.g. upon inter-RAT cell reselection or before trying to re-establish in the second RAT.

Upon re-establishing in a second RAT, after being connected and detecting a failure in a first RAT (or any other triggering to re-establishment procedure), using the first and/or second set of parameters, and/or updated version of the parameters to compute a security token to be included in the Re-establishment Request message in the second RAT.

Five exemplifying embodiments will be described in more detail below. These five exemplifying embodiments relate to:

Some first exemplifying embodiments. Convert source RAT parameter, e.g. C-RNTI and PCI, to a target RAT format by mapping, recalculating, truncating, or padding and use variables defined in the target RAT format to compute the security token.

Some second exemplifying embodiments. Convert target RAT parameters, e.g. Cell ID, to source RAT format by mapping, recalculating, truncating or padding and use variables defined in the source RAT format to compute the security token.

Some third exemplifying embodiments. Create new variable, e.g. a new Information Element (IE), allowing source parameters, e.g. C-RNTI and PCI, in source RAT format and target RAT parameters, e.g. Cell ID, in target RAT format. The new IE is defined in either the source RAT or in the target RAT.

Some fourth exemplifying embodiments. Create new variable or extend an existing variable to allow both RAT formats for all parameters, e.g. C-RNTI, PCI, and Cell ID, using e.g. a CHOICE structure. This variable may be used for both intra-RAT and inter-RAT calculation of the security token, e.g. the short MAC-I, during a failure and re-establishment procedure. The variable may be defined in only the LTE specification, only the NR specification, or in both LTE and NR specifications.

Some fifth exemplifying embodiments. Extend definition of existing variables to use dummy values in the target RAT format for the source parameters, e.g. for the C-RNTI and/or the PCI.

In addition, during handover, called re-configuration with sync in RRC specifications, the target gNB may be prepared with re-establishment information of the target cell and other neighboring cells in the HandoverPreparationInfo message. Since this message also comprises the security token, e.g. the short MAC-I, if the UE is provided with re-establishment information to inter RAT cells the short MAC-I would have to be calculated using any of the solutions described below.

It should be understood that one or more features from one or more exemplifying embodiments may be combined.

An object of embodiments herein is therefore to improve the performance of a wireless communications network for re-establishing a radio connection.

Embodiments herein may refer to Inter-RAT Checksum (MAC-I) calculation at RRC re-establishment, connection re-establishment, inactive state, RRC, security procedures.

An advantage of embodiments disclosed herein is that it enables a UE to be connected in one RAT, e.g. in LTE or NR, and then attempt to reestablish in the other RAT if it experiences a failure in the first RAT triggering re-establishment. Thanks to that, faster recovery is possible as the RRC reestablishment procedure is expected to be faster to execute than transition via the RRC_IDLE state which is the existing solution for the inter-RAT scenarios in Rel-15 specifications. That is particularly likely since NR maybe deployed in quite high frequencies and rely on beamforming, where radio related failures may be more common than in current systems. Then, the UE could efficiently re-connect to LTE.

Without embodiments disclosed herein, the UE and the network would not be able to calculate the security token required to authenticate the UE during an inter-RAT reestablishment procedure or during any procedure where source RAT and re-establishment target RAT have different formatting for the MAC-I calculation. Or, a secured solution for inter-RAT reestablishment would not be possible to use.

Embodiments herein are mostly exemplified with NR, LTE wireless devices but it may be applicable to other wireless devices which are served by other Radio Access Technologies such as CAT-M, NB-IoT, WiFi, or NR Carriers.

Embodiments herein relate to wireless communication networks in general. FIG. is a schematic overview depicting a wireless communications network 100. The wireless communications network 100 may be referred to as a radio communications network. The wireless communications network 100 comprises one or more Radio Access Networks (RANs) and one or more Core Networks (CNs). The radio communications network 100 may use a number of different Radio Access Technologies (RATs), such as NB-IoT, CAT-M, Wi-Fi, eMTC, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Sometimes in this disclosure the wireless communications network 100 is referred to as just a network.

Figure 5:
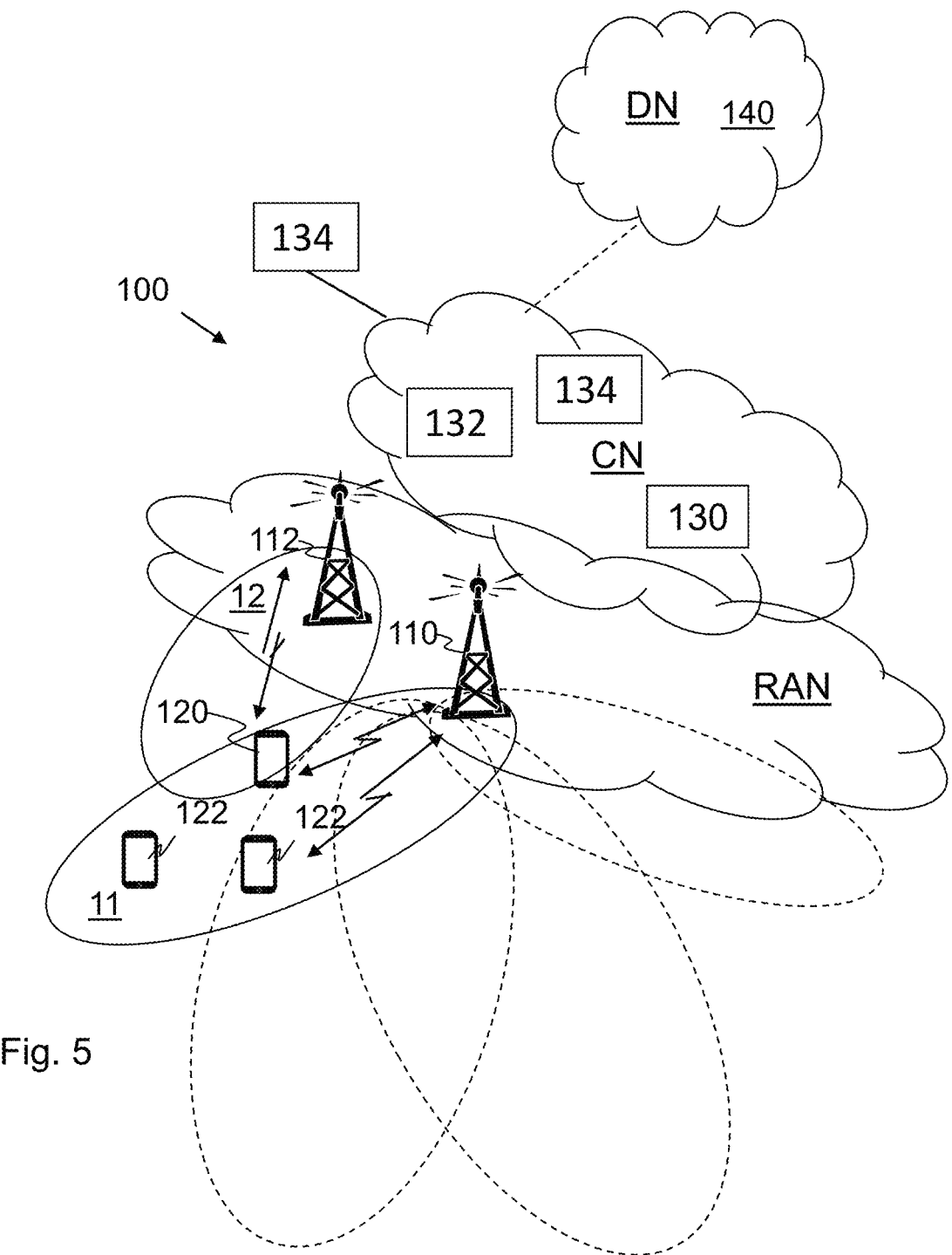
FIG. 5 is a schematic block diagram illustrating embodiments of a wireless communications network.

In the wireless communication network 100, wireless devices e.g. a wireless device 120 also referred to as the first UE 120, is operating in the wireless communications network 100. One or more further wireless devices 122 also referred to as one or more second UEs 122 may operate in the wireless communications network 100. As schematically illustrated in FIG. 5, the wireless device 120,122 may communicate with a network node, e.g. a network node 110, 112 which will be described below.

The wireless devices 120, 122 may each e.g. be a mobile station, a non-Access Point (non-AP) STA, a STA, a user equipment (UE) and/or a wireless terminals, an NB-IoT device, an eMTC device, Integrated Access Backhaul (IAB) node and a CAT-M device, a WiFi device, an LTE device and an NR device communicate via one or more Access Networks (AN), e.g. RAN, to one or more Core Networks (CN). It should be understood by the skilled in the art that "wireless device" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell.

In this disclosure, the terms wireless device, terminal and UE are used interchangeably.

Network nodes operate in the radio communications network 100, such as a Radio Network Node (RNN) 110,112 also referred to as the first network node 110 and the second network node 112, respectively, providing radio coverage over a respective geographical area, e.g. a service area 11 and a service area 12, which may also be referred to as cells, beams or beam groups of a first Radio Access Technology (RAT), or a second RAT. The first and second RATs may be different RATs such as one of the RATs is a NR, 5G, LTE, Wi-Fi, NB-IoT, CAT-M, Wi-Fi, eMTC or similar, and the other RAT is another one of the NR, 5G, LTE, Wi-Fi, NB-IoT, CAT-M, Wi-Fi, eMTC or similar. The network node 110,112 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a Next Generation Radio Access Network eNB (NG-RAN eNB, ng-eNB), a gNB, a base transceiver station, a radio remote unit, an Access Point Base Station, a base station router, a transmission arrangement of a radio base station, a stand-alone access point or any other network unit capable of communicating with a wireless device within the service area served by the network node 110,112 depending e.g. on the radio access technology and terminology used. The network node 110 may be referred to as a serving radio network node and communicates with the wireless device 120, 122 with Downlink (DL) transmissions to the wireless device 120, 122 and Uplink (UL) transmissions from the wireless device 120, 122.

Further network nodes operate in the radio communications network 100, such as a Mobility Network Node (MNN) 130 also referred to as a third network node 130. The network node 130 may be a Mobility Management Entity (MME) which is a control node for an EPS access network, a Serving Gateway (SGW), and a Packet Data Network Gateway (PGW). An MME is amongst other responsible for tracking and paging procedure including retransmissions. Further the network node 130 may be an Access and Mobility Management Function (AMF) which is a control node for a 5GS access network, and a User Plane Function (UPF). Further, the network node 130 may be an Operation And Maintenance (OAM) node such as an Operation and Support System Radio and Core (OSS-RC) node or an Ericsson Network Management (ENM) node.

Further network nodes such as a location server 132 and a positioning server 134 operate in the radio communications network 100. For example, the location server 30,132 may be an E-SMLC and the positioning server 134 may be an RTK server. The location server 132 and the positioning server 134 may communication with each other over a communications interface.

It should be understood that the positioning server 134 may be arranged external of the radio communications network 100 and in such a scenario the positioning server 134 may be referred to as an external positioning server 132 and the location server 132 and the positioning server 134 may communicate over an IP interface.

The positioning server 134 may sometimes herein be referred to as an RTK server or an RTK network provider.

Methods according to embodiments herein may be performed by any of the network node 110 such as e.g. an eNB, the wireless device 120, e.g. the UE, the mobility network node 130, the location server 132 and/or by the positioning server 134. As an alternative, a Distributed Node (DN) and functionality, e.g. comprised in a cloud 140 as shown in FIG. 5 may be used for performing or partly performing the methods.

In this disclosure, the first RAT is the RAT of the first radio network node 110 serving the wireless device 120 when operating in a first service area 11, e.g. a first cell 11, and the second RAT is the RAT of a second radio network node 112 serving a second cell 12. Further, the wireless device 120 is suspended from a connection with the first radio network node 110 which connection is to be re-established by the second radio network node 112. Sometimes in this disclosure, the term "source node/cell" is used instead of the term "first RAT/node/cell", and the term "target RAT/node/cell" is used instead of the term "second RAT/node/cell". Thus, it may for example be said that the wireless device 120 is suspended from a connection with the source radio network node 110 and that the target radio network node 112 is to re-establish the connection.

Actions of Some Embodiments Herein

Figure 6:
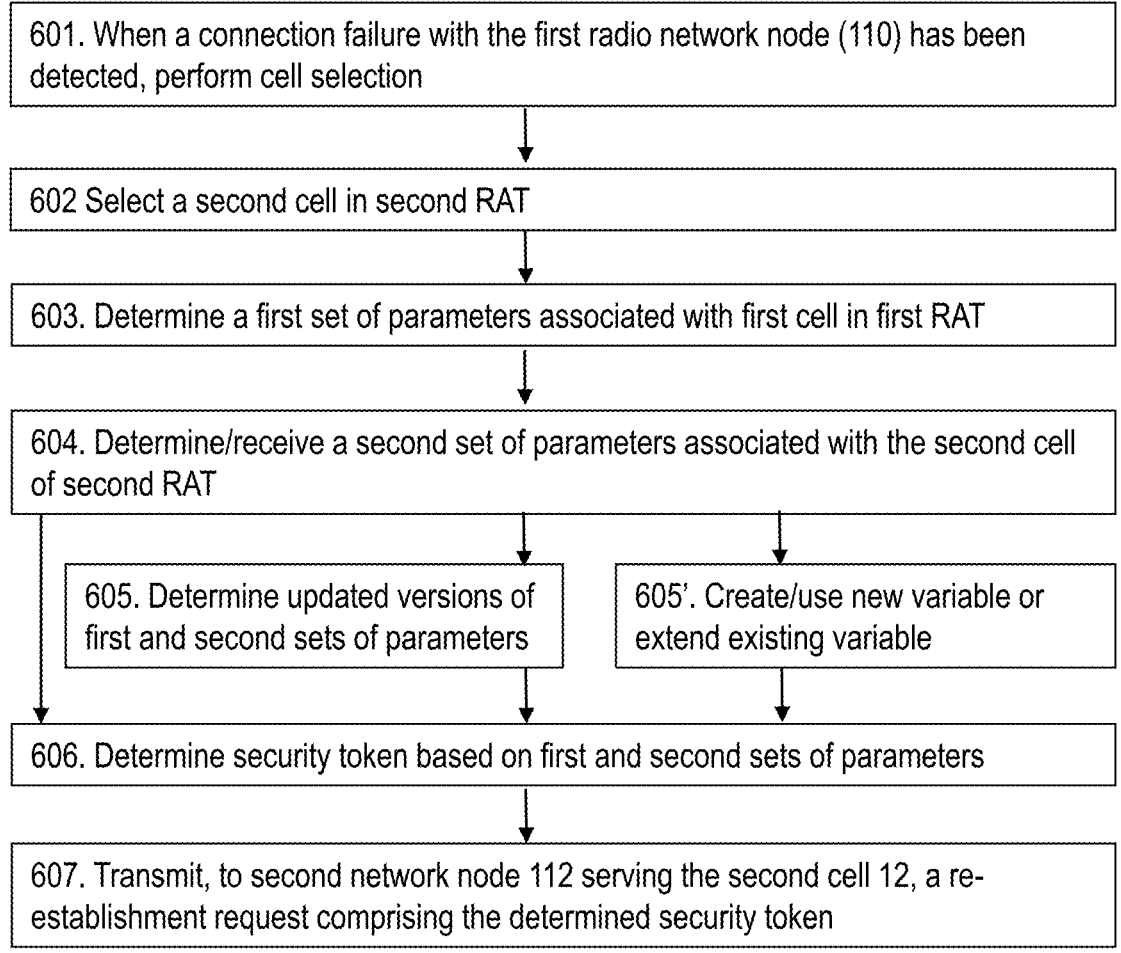
FIG. 6 is a flowchart depicting embodiments of methods in a wireless device.

Example embodiments of a flowchart depicting embodiments of a method performed by the wireless device 120, 122, e.g. to re-establish a connection, is depicted in FIG. 6 and will be described more in detail in the following. Especially, embodiments herein relates to a method performed by a wireless device 120 for re-establishing a radio connection in a wireless communications network 100 comprising a first Radio Access Technology (RAT) and a second RAT, wherein the wireless device 120 operates in a first cell 11 served by a first radio network node 110 operating in the first RAT. The first and second RATs are different RATs. The method may comprise one or more of the following actions which actions may be taken in any suitable order. Further, it should be understood that one or more actions may be optional and that actions may be combined.

In Action 601, when a connection failure with a first cell, e.g. with the first radio network node 110, has been or is detected, the wireless device 120,122 performs a cell selection.

In Action 602, the wireless device 120,122 selects a second cell 12 in the second RAT. The second cell 12 is known by the wireless device 120 to be a candidate for reestablishment.

In Action 603, the wireless device 120,122 determines and/or receives a first set of parameters associated with the first cell 11 of the first RAT. As mentioned above, the first cell 11 is served by the first radio network node 110 operating in the first RAT. The first set of parameters comprises at least one parameter identifying the wireless device 120 or the first cell 11. The first set of parameters may comprise a C-RNTI, an I-RNTI and a PCI. The C-RNTI and the I-RNTI identify the wireless device 120 and the PCI identifies the first cell 11.

In Action 604, the wireless device 120,122 determines and/or receives a second set of parameters associated with the second cell 12 of the second RAT. The second cell 12 is served by the second radio network node 112 operating in the second RAT. The second set of parameters comprises at least one parameter identifying the wireless device 120 or the second cell 12. The second set of parameters may comprise a Cell ID or a PCI. The cell ID and the PCI identify the second cell 12.

In Action 605, the wireless device 120,122 may determine updated versions of first and second sets of parameters. Additionally or alternatively, in Action 605A', the wireless device 120 creates or uses a new variable or extends an existing variable. When a reference is made to a new variable in this disclosure it should be understood to refer to a variable that is new in relation to the variables defined in the current standard, and which variable for example may comprise parameters having a format of two or more different RATs.

The wireless device 120 may determine an updated version of one or more parameters of the first set of parameters or an updated version of one or more parameters of the second set of parameters.

In some embodiments, e.g. in some first exemplifying embodiments, the wireless device 120 determines the updated version of the one or more parameters of the first set of parameters by converting the one or more parameters of the first set of parameters to a format corresponding to the format of the one or more parameters of the second RAT. The wireless device 120 may perform this conversion by performing one or more out of:

mapping, recalculating, or truncating the one or more parameters of the first set of parameters to a shortened bit string when the first RAT is NR technology and the second RAT is LTE, and mapping, recalculating or padding the one or more parameters of the first set of parameters to an extended bit string when the first RAT is LTE technology and the second RAT is NR. Further, the wireless device 120 may use the converted one or more parameters of the first set of parameters in one or more variables defined in the second RAT as input in calculating the security token for the second RAT.

In some embodiments, e.g. in some second exemplifying embodiments, the wireless device 120 determines the updated version of the one or more parameters of the second set of parameters comprises by converting the one or more parameters of the second set of parameters to a format corresponding to the format of the one or more parameters of the first set of parameters. The wireless device 120 may perform this conversion by performing one or more out of:

mapping, recalculating, or truncating the one or more parameters of the second set of parameters to a shortened bit string when the first RAT is LTE technology and the second RAT is NR, and mapping, recalculating or padding the one or more parameters of the second set of parameters to an extended bit string when the first RAT is NR technology and the second RAT is LTE. Further, the wireless device 120 may use the converted one or more parameters of the second set of parameters in one or more variables defined in the first RAT as input in calculating the security token for the first RAT.

Thus, the wireless device 120 may convert the one or more parameters of the first set of parameters having a format of the first RAT into a format of the second RAT, and may convert the one or more parameters of the second set of parameters having a format of the second RAT into a format of the first RAT. For example, the C-RNTI has the formats: In LTE: 16 bit string and In NR: 16 bit integer, the PCI has the format: In LTE: 9 bit integer and In NR: 10 bit integer, and the Cell ID has the format: In LTE: 28 bit string and in NR: 36 bit string.

In some embodiments, e.g. in some third exemplifying embodiments, the wireless device 120 creates and/or uses a new variable comprising the one or more parameters of the first set of parameters in the format of the first RAT and comprising the one or more parameters of the second set of parameters in the format of the second RAT. The new variable may comprise parameters having formats of more than one RAT.

In some embodiments, e.g. in some fourth exemplifying embodiments, the wireless device 120 creates and/or uses a new variable or extending an existing variable to comprise the one or more parameters of the first set of parameters and the one or more parameters of the second set of parameters in both the format of the first RAT and in the format of the second RAT. The new variable may comprise parameters of only one format as in the legacy scenario or parameters of two or more formats according to embodiments disclosed herein. The new variable may be an extension of an existing variable.

In some embodiments, e.g. in some fifth exemplifying embodiments, the wireless device 120 extends and/or uses definition of existing variables to use one or more values, e.g. predefined values, in the second RAT format for the one or more parameters of the first set of parameters. In other words, the wireless device 120 may determine the updated version of the one or more parameters of the first set of parameters or the updated version of the one or more parameters of the second set of parameters, by extending definition of existing variables to use one or more values in the second RAT format in place of the one or more parameters of the first set of parameters. However, it should be understood that the value does not have to be predefined. It could also be values which are not associated with the first set of parameters. For instance, the network may signal that for inter-RAT re-establish, the first set of parameters should be 0, and in another cell, it should be 42 (or something else).

In some embodiments, e.g. in some sixth exemplifying embodiments, the wireless device 120 receives an instruction how to update the first and second sets of parameters. Thus, the wireless device 120 may receive an instruction how to convert the one or more parameters of the first set of parameters into a format corresponding to the format of the one or more parameters of the second set of parameters or how to convert the one or more parameters of the second set of parameters into a format corresponding to the format of the one or more parameters of the first set of parameters. For example, the instruction may be received from the first radio network node 110 during link failure and from the second radio network node during re-establishment. In the latter case, the instruction may be broadcasted from the second radio network node. In such embodiments, the wireless device updates the first and second sets of parameters in accordance with the instruction received.

In Action 606, the wireless device 120,122 determines a security token based on first and second sets of parameters.

As mentioned above, the wireless device 120 may determine an updated version of one or more parameters of the first set of parameters or an updated version of one or more parameters of the second set of parameters. In such embodiments, the wireless device 120 may determine the security token by determining the security token based on at least one out of the first set of parameters and the updated version of the one or more parameters of the first set of parameters, and based on at least one out of the second set of parameters and the updated version of the one or more parameters of the second set of parameters. Thus, the security token may be determined based on at least the C-RNTI, and the PCI identifying the wireless device 120 and the first cell 11, respectively, and the Cell ID identifying the second cell 12. Further, one or more of the C-RNTI, PCI and Cell ID may be updated before the determination of the security token. Additionally or alternatively, the I-RNTI identifying the wireless device 120 and/or the PCI identifying the second cell 12 may also be used in the determination of the security token.

In some first exemplifying embodiments, the wireless device 120 uses the converted one or more parameters of the first set of parameters in one or more variables defined in the second RAT as input in calculation of the security token for the second RAT.

In some second exemplifying embodiments, the wireless device 120 uses the converted one or more parameters of the second set of parameters in one or more variables defined in the first RAT as input in calculation of the security token for the first RAT.

In some third and fourth exemplifying embodiments, the wireless device 120 uses the new variable as input in calculation of the security token for the second RAT.

In Action 607, the wireless device 120,122, transmits, to the second cell 12 served by the second radio network node 112, a re-establishment request, e.g. a re-establishment request message, comprising the determined security token.

Figure 7:
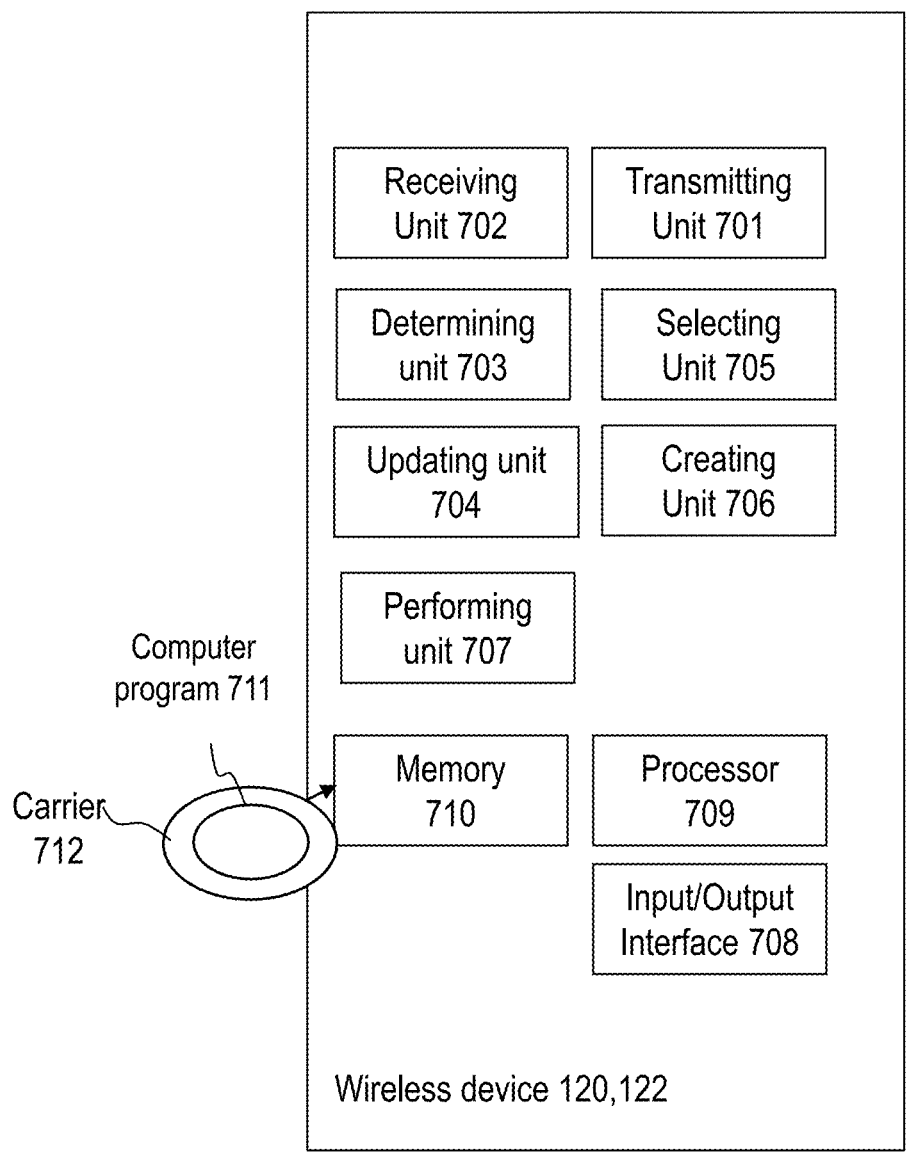
FIG. 7 is schematic block diagram illustrating embodiments of a wireless device.

To perform the method actions e.g. for re-establishing a connection, the wireless device 120 may comprise the arrangement depicted in FIG. 7. The wireless device 120, 122 may e.g. comprise a transmitting unit 701, a receiving unit 702, a determining unit 703, an updating unit 704, a selecting unit 705, a creating unit 706, and a performing unit 707 As previously mentioned, the wireless device 120 and the first radio network node 110 are configured to operate in the wireless communications network 100. The wireless device 120 is configured to perform, e.g. by means of the one or more units, one or more of the actions performed by the wireless device 120 and described herein.

The wireless device 120 is configured to transmit, e.g. by means of the transmitting unit 701, a signal, message or information to one or more nodes operating in the communications network 100. The transmitting unit 701 may be implemented by or arranged in communication with a processor 709 of the wireless device 120. The processor 708 will be described in more detail below.

The wireless device 120,122, is configured to transmit, to the second cell 12 served by the second radio network node 112, a re-establishment request, e.g. a re-establishment request message, comprising a determined security token.

The wireless device 120 is configured to receive, e.g. by means of the receiving unit 702, a signal, message or information from one or more nodes operating in the communications network 100. The receiving unit 702 may be implemented by or arranged in communication with the processor 709 of the wireless device 120.

The wireless device 120,122 is configured to receive a first set of parameters associated with the first cell 11. The first set of parameters comprises at least one parameter identifying the wireless device 120 or the first cell 11.

Further, the wireless device 12 is configured to receive a second set of parameters associated with the second cell 12. The second set of parameters comprises at least one parameter identifying the wireless device 120 or the second cell 12.

In some embodiments, the wireless device 120 is configured to receive, from the first radio network node 110 or the second radio network node 112, an instruction how to convert the one or more parameters of the first set of parameters into a format corresponding to the format of the one or more parameters of the second RAT or how to convert the one or more parameters of the second set of parameters into a format corresponding to the format of the one or more parameters of the first RAT.

The wireless device 120 is configured to determine, e.g. by means of the determining unit 703, security token. The determining unit 703 may be implemented by or arranged in communication with the processor 709 of the wireless device 120.

The wireless device 120,122 is configured to determine the first set of parameters associated with the first cell 11. The first set of parameters associated with the first cell 11 has been received by the wireless device 120 when connected to the first cell 11. The received first set of parameters may be stored in a memory. Upon a failure, e.g. a failure of the connection with the first cell 11, the wireless device 120 determines the first set of parameters. For example, the wireless device 120 may retrieve the first set of parameters from the memory.

Further, the wireless device 120 is configured to determine the security token based on the first and second sets of parameters.

The first set of parameters may comprise one or more out of: a C-RNTI or an I-RNTI identifying the wireless device 120 and a PCI identifying the first cell 11. The second set of parameters may comprise a Cell ID or a PCI identifying the second cell 12.

In some embodiments, the wireless device 120 is configured to determine an updated version of one or more parameters of the first set of parameters or an updated version of one or more parameters of the second set of parameters. In such embodiments, the wireless device 120 is configured to determine the security token based on at least one out of the first set of parameters and the updated version of the one or more parameters of the first set of parameters, and based on at least one out of the second set of parameters and the updated version of the one or more parameters of the second set of parameters.

In some embodiments, e.g. in some first exemplifying embodiments, the wireless device 120 is configured to determine the updated version of the one or more parameters of the first set of parameters by converting the one or more parameters of the first set of parameters to a format corresponding to the format of the one or more parameters of the second RAT by performing one or more out of:

mapping, recalculating or truncating the one or more parameters of the first set of parameters to a shortened bit string when the first RAT is 5G New Radio, NR, technology and the second RAT is Long Term Evolution, LTE, technology, and mapping, recalculating or padding the one or more parameters of the first set of parameters to an extended bit string when the first RAT is LTE and the second RAT is NR.

Further, in some first exemplifying embodiments, the wireless device 120 is configured to determine the security token by using the converted one or more parameters of the first set of parameters in one or more variables defined in the second RAT as input in calculation of the security token for the second RAT.

In some embodiments, e.g. in some second exemplifying embodiments, the wireless device 120 is configured to determine the updated version of the one or more parameters of the second set of parameters by converting the one or more parameters of the second set of parameters to a format corresponding to the format of the one or more parameters of the first set of parameters by performing one or more out of:

mapping, recalculating or truncating the one or more parameters of the second set of parameters to a shortened bit string when the first RAT is LTE technology and the second RAT is NR technology, and mapping, recalculating or padding the one or more parameters of the second set of parameters to an extended bit string when the first RAT NR technology and the second RAT is LTE.

Further, in some second exemplifying embodiments, the wireless device 120 is configured to determine the security token by using the converted one or more parameters of the second set of parameters in one or more variables defined in the first RAT as input in calculation of the security token for the first RAT.

In some embodiments, e.g. in some third and fourth exemplifying embodiments, the wireless device 120 is configured to determine the security token by using the new variable as input in calculation of the security token for the second RAT.

In some embodiments, e.g. in some fifth exemplifying embodiments, the wireless device 120 is configured to determine the updated version of the one or more parameters of the first set of parameters or the updated version of the one or more parameters of the second set of parameters by extending definition of existing variables to use one or more values in the second RAT format in place of the one or more parameters of the first set of parameters.

The first wireless device 120 may be configured to update, e.g. by means of the updating unit 704, one or more parameters of the first set of parameters and/or one or more parameters of the second set of parameters. The updating unit 704 may be implemented by or arranged in communication with the processor 709 of the first wireless device 120.

Thus, the wireless device 120,122 may be configured to update the one or more parameters of the first set of parameters and/or the one or more parameters of the second set of parameters as described herein.

The wireless device 120 is configured to select, e.g. by means of the selecting unit 705, a cell. The selecting unit 705 may be implemented by or arranged in communication with the processor 709 of the wireless device 120.

The wireless device 120,122 is configured to select a second cell 12 served by the second radio network node 112 operating in the second RAT. The second cell 12 is known by the wireless device 120 to be a candidate for reestablishment.

The wireless device 120 is configured to create, e.g. by means of the creating unit 706, a new variable or a new IE. The creating unit 706 may be implemented by or arranged in communication with the processor 709 of the wireless device 120.

In some embodiments, e.g. in some third exemplifying embodiments, the wireless device 120,122 is configured to creating a new variable comprising the one or more parameters of the first set of parameters in the format of the first RAT and comprising the one or more parameters of the second set of parameters in the format of the second RAT.

In some embodiments, e.g. in some fourth exemplifying embodiments, the new variable is an extension of an existing variable.

The wireless device 120 is configured to perform, e.g. by means of the performing unit 707, a cell selection. The performing unit 707 may be implemented by or arranged in communication with the processor 709 of the wireless device 120.

The wireless device 120,122 is configured to perform a cell selection when a connection failure with the first cell 11 served by the first radio network node 110 is or has been detected.

Those skilled in the art will also appreciate that the units in the wireless device 120,122 described above may refer to a combination of analog and digital circuits, and/or one or more processors configured with software and/or firmware, e.g. stored in the wireless device 120, 122, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The wireless device 120,122 may comprise an input and output interface 708 configured to communicate with one or more network nodes, e.g. with the first and second radio network nodes 110,112 and the location server 132. The input and output interface may comprise a wireless receiver (not shown) and a wireless transmitter (not shown).

The embodiments herein may be implemented through a respective processor or one or more processors, such as the processor 709 of a processing circuitry in wireless device 120,122 depicted in FIG. 7, together with respective computer program code for performing the functions and actions of the embodiments herein. The program code mentioned above may also be provided as a computer program product, for instance in the form of a data carrier carrying computer program code for performing the embodiments herein when being loaded into the wireless device 120,122. One such carrier may be in the form of a CD ROM disc. It is however feasible with other data carriers such as a memory stick. The computer program code may furthermore be provided as pure program code on a server and downloaded to the wireless device 120,122.

The wireless device 120,122 may further comprise a memory 710 comprising one or more memory units. The memory comprises instructions executable by the processor in the wireless device 120.

The memory is arranged to be used to store e.g. data, configurations, and applications to perform the methods herein when being executed in the wireless device 120,122.

Some embodiments of the wireless device 120,122 may comprise:
  a radio circuitry configured to determine/receive first and second sets of parameters according to the determined by a processing unit, and to transmit a re-establishment request;
  a storage, configured to store first and second sets of parameters;
  the processing unit configured to determine a security token based on first and second sets of parameters.

Example embodiments of a flowchart depicting embodiments of a method performed by the first radio network node 110 for assisting a wireless device 120,122 in re-establishing a radio connection in a wireless communications network 100 is depicted in FIG. 8A and will be described more in detail in the following. As previously mentioned the wireless communications network 100 comprises a first RAT and a second RAT being different from the first RAT. The wireless device 120 operates in a first cell 11 served by the first radio network node 110 operating in the first RAT. The method may comprise one or more of the following actions which actions may be taken in any suitable order. Further, it should be understood that one or more actions may be optional and that actions may be combined.

In Action 801A, the first radio network node 110 provides the wireless device 120,122 with a first set of parameters associated with the first cell 11 of the first RAT. For example, the first radio network node 110 may transmit the first set of parameters to the wireless device 120. The first set of parameters may comprise C-RNTI or the I-RNTI identifying the wireless device 120 and the PCI identifying the first cell 11.

In Action 801A', the first radio network node 110 may provide the wireless device with an instruction how to convert parameters into another format. For example, the first radio network node 110 may transmit the instruction to the wireless device 120.

Thus, the first radio network node 110 may provide the wireless device 120 with an instruction how to convert one or more parameters of a first set of parameters associated with the first cell 11 into a format corresponding to the format of the one or more parameters of the second set of parameters or how to convert the one or more parameters of the second set of parameters into a format corresponding to the format of the one or more parameters of the first set of parameters.

In Action 802A, the first radio network node 110 receives from the second radio network node 112 operating in the second RAT, a second set of parameters associated with a second cell 12 of the second RAT. As previously mentioned, the second cell 12 is served by the second radio network node 112. The second set of parameters may comprise the Cell ID or the PCI identifying the second cell 12.

In Action 803A, the first radio network node 110 receives from the second radio network node 112 a security token. The security token is received by the second radio network node 112 in a re-establishment request message transmitted from the wireless device 120 when a connection failure with the first radio network node 110 is or has been detected.

In Action 804A, the first radio network node 110 determines an expected security token based on the first and second sets of parameters.

In some embodiments, the first radio network node 110 determines an updated version of one or more parameters of the first set of parameters or an updated version of one or more parameters of the second set of parameters. In such embodiments the first radio network node 110 determines the security token based on at least one out of: the first set of parameters and the updated version of the one or more parameters of the first set of parameters, and based on at least one out of: the second set of parameters and the updated version of the one or more parameters of the second set of parameters.

In some embodiments, e.g. in some first exemplifying embodiments, the first radio network node 110 determines the updated version of the one or more parameters of the first set of parameters by converting the one or more parameters of the first set of parameters to a format corresponding to the format of the one or more parameters of the second RAT. The first radio network node 110 may perform the conversion by performing one or more out of:

mapping, recalculating or truncating the one or more parameters of the first set of parameters to a shortened bit string when the first RAT is 5G NR technology and the second RAT LTE technology, and mapping, recalculating or padding the one or more parameters of the first set of parameters to an extended bit string when the first RAT is LTE and the second RAT is NR.

Further, in some first exemplifying embodiments, the first radio network node 110 determines the security token by using the converted one or more parameters of the first set of parameters in one or more variables defined in the second RAT as input in calculation of the security token for the second RAT.

In some embodiments, e.g. in some second exemplifying embodiments, the first radio network node 110 determines the updated version of the one or more parameters of the second set of parameters by converting the one or more parameters of the second set of parameters to a format corresponding to the format of the one or more parameters of the first set of parameters. The first radio network node 110 may perform the conversion by performing one or more out of:

mapping, recalculating or truncating the one or more parameters of the second set of parameters to a shortened bit string when the first RAT is LTE technology and the second RAT is NR technology, and mapping, recalculating or padding the one or more parameters of the second set of parameters to an extended bit string when the first RAT NR technology and the second RAT is LTE.

Further, in some second exemplifying embodiments, the first radio network node 110 determines the security token by using the converted one or more parameters of the second set of parameters in one or more variables defined in the first RAT as input in calculation of the security token for the first RAT.

In some embodiments, e.g. in some third exemplifying embodiments, the first radio network node 110 creates a new variable comprising the one or more parameters of the first set of parameters in the format of the first RAT and comprising the one or more parameters of the second set of parameters in the format of the second RAT.

In some embodiments, e.g. in some fourth embodiments, the new variable is an extension of an existing variable.

In some third and fourth exemplifying embodiments, the first radio network node 110 determines the security token by using the new variable as input in calculation of the security token for the second RAT.

In some embodiments, e.g. in some fifth embodiments, the first radio network node 110 determines the updated version of the one or more parameters of the first set of parameters or the updated version of the one or more parameters of the second set of parameters by extending definition of existing variables to use one or more values in the second RAT format in place of the one or more parameters of the first set of parameters.

In Action 805A, the first radio network node 110 verifies the wireless device 120,122 based on the received security token and the determined expected security tokens. For example, based on the received and the determined expected security tokens the first radio network node 110 verifies an identity of the wireless device and whether or not the wireless device is valid.

In Action 806A, e.g. when the wireless device 120 is verified as valid, the first radio network node 110 transmits, to the second radio network node 112, one or more configurations and/or parameters relating to the radio connection to be re-established. The one or more configurations and/or parameters relating to the radio connection to be re-established may sometimes herein be referred to as UE context.

Figure 8B:
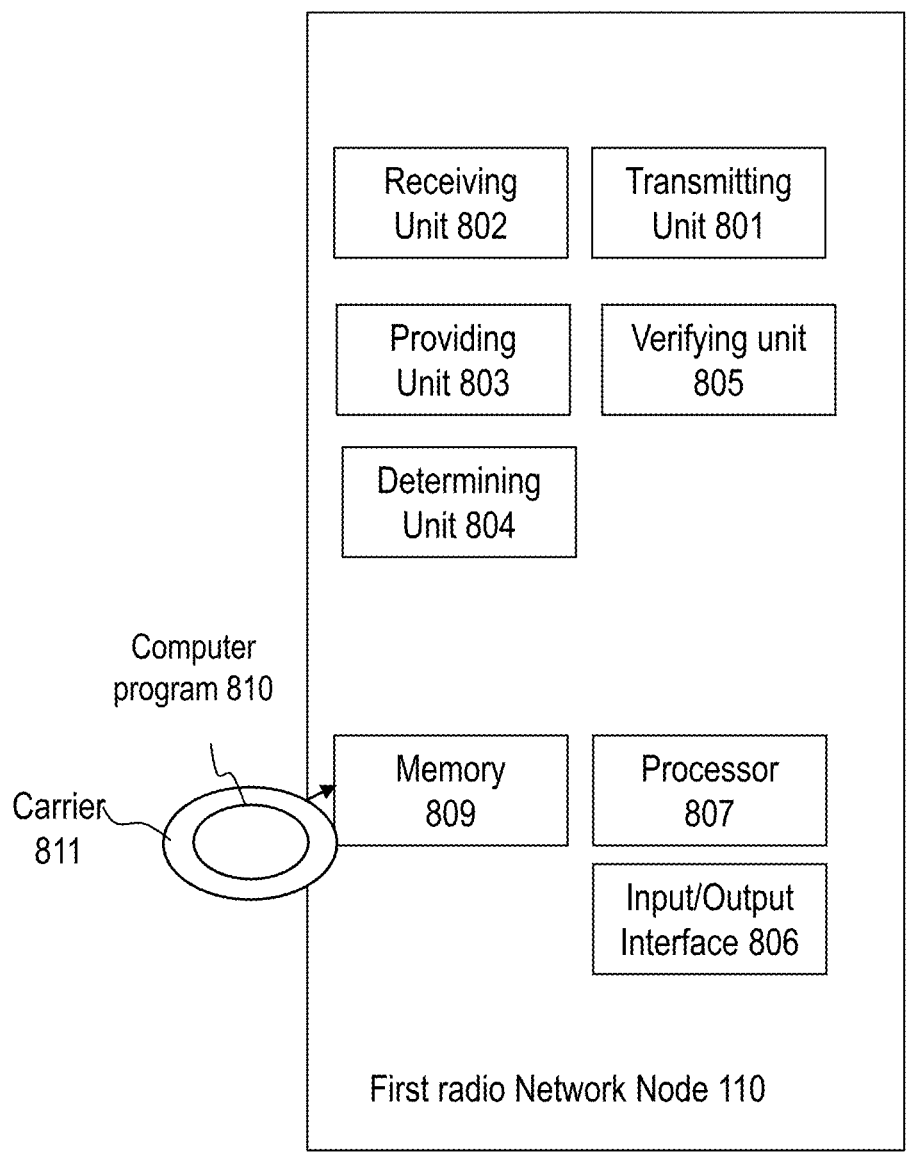
FIG. 8B is schematic block diagram illustrating embodiments of a first radio network node.

To perform the method actions e.g. for assisting a wireless device 120,122 in resuming a radio connection in a wireless communications network 100, the first radio network node 110 may comprise the arrangement depicted in FIG. 8B. The first radio network node 110 may e.g. comprise a transmitting unit 801, a receiving unit 802, a providing unit 803, a determining unit 804, and a verifying unit 805. As previously mentioned, the wireless device 120 and the first radio network node 110 are configured to operate in the wireless communications network 100. The first radio network node 110 is configured to perform, e.g. by means of the one or more units, one or more of the actions performed by the first radio network node 110 and described herein.

The first radio network node 110 is configured to transmit, e.g. by means of the transmitting unit 801, a signal, message or information to one or more nodes operating in the communications network 100. The transmitting unit 801 may be implemented by or arranged in communication with a processor 807 of the first radio network node 110. The processor 807 will be described in more detail below.

The first radio network node 110 is configured to transmit, to the second radio network node 112, one or more configurations and/or parameters relating to the radio connection to be re-established when the wireless device 120 is verified as valid.

The first radio network node 110 is configured to receive, e.g. by means of the receiving unit 802, a signal, message or information from one or more nodes operating in the communications network 100. The receiving unit 802 may be implemented by or arranged in communication with the processor 807 of the first radio network node 110.

The first radio network node 110 is configured to receive, from the second radio network node 112 operating in the second RAT, a second set of parameters associated with the second cell 12 of the second RAT. As previously mentioned, the second cell 12 is served by the second radio network node 112. The second set of parameters may comprise the Cell ID or the PCI identifying the second cell 12.

Further, the first radio network node 110 is configured to receive from the second radio network node 112 a security token. As previously mentioned, the security token is received by the second radio network node 112 in a re-establishment request message transmitted from the wireless device 120 when a connection failure with the first radio network node 110 is or has been detected.

The first radio network node 110 is configured to provide, e.g. by means of the providing unit 803, a signal, message or information to one or more nodes operating in the communications network 100. The providing unit 803 may be implemented by or arranged in communication with the processor 807 of the first radio network node 110.

In some embodiments, the first radio network node 110 is configured to provide the wireless device 120 with an instruction how to convert parameters into another format. For example, the first radio network node 110 may transmit the instruction to the wireless device 120. Thus, the first radio network node 110 may be configured to provide the wireless device 120 with an instruction how to convert one or more parameters of a first set of parameters associated with the first cell 11 into a format corresponding to the format of the one or more parameters of the second set of parameters or how to convert the one or more parameters of the second set of parameters into a format corresponding to the format of the one or more parameters of the first set of parameters.

The first radio network node 110 is configured to determine, e.g. by means of the determining unit 804, a security token. The determining unit 804 may be implemented by or arranged in communication with the processor 807 of the first radio network node 110.

The first radio network node 110 is configured to determine an expected security token based on the first and second sets of parameters.

In some embodiments, the first radio network node 110 is configured to determine an updated version of one or more parameters of the first set of parameters or an updated version of one or more parameters of the second set of parameters. In such embodiments, the first radio network node 110 is configured to determine the security token based on at least one out of: the first set of parameters and the updated version of the one or more parameters of the first set of parameters, and based on at least one out of: the second set of parameters and the updated version of the one or more parameters of the second set of parameters.

In some embodiments, e.g. in some first exemplifying embodiments, the first radio network node 110 is configured to determine the updated version of the one or more parameters of the first set of parameters by converting the one or more parameters of the first set of parameters to a format corresponding to the format of the one or more parameters of the second RAT. The first radio network node 110 may be configured to perform the conversion by performing one or more out of:

mapping, recalculating or truncating the one or more parameters of the first set of parameters to a shortened bit string when the first RAT is 5G NR technology and the second RAT LTE technology, and mapping, recalculating or padding the one or more parameters of the first set of parameters to an extended bit string when the first RAT is LTE and the second RAT is NR.

Further, in some first exemplifying embodiments, the first radio network node 110 is configured to determine the security token by using the converted one or more parameters of the first set of parameters in one or more variables defined in the second RAT as input in calculation of the security token for the second RAT.

In some embodiments, e.g. in some second exemplifying embodiments, the first radio network node 110 is configured to determine the updated version of the one or more parameters of the second set of parameters by converting the one or more parameters of the second set of parameters to a format corresponding to the format of the one or more parameters of the first set of parameters. The first radio network node 110 may be configured to perform the conversion by performing one or more out of:

mapping, recalculating or truncating the one or more parameters of the second set of parameters to a shortened bit string when the first RAT is LTE technology and the second RAT is NR technology, and mapping, recalculating or padding the one or more parameters of the second set of parameters to an extended bit string when the first RAT NR technology and the second RAT is LTE.

Further, in some second exemplifying embodiments, the first radio network node 110 is configured to determine the security token by using the converted one or more parameters of the second set of parameters in one or more variables defined in the first RAT as input in calculation of the security token for the first RAT.

In some embodiments, e.g. in some third exemplifying embodiments, the first radio network node 110 is configured to create a new variable comprising the one or more parameters of the first set of parameters in the format of the first RAT and comprising the one or more parameters of the second set of parameters in the format of the second RAT.

In some embodiments, e.g. in some fourth embodiments, the new variable is an extension of an existing variable.

In some third and fourth exemplifying embodiments, the first radio network node 110 is configured to determine the security token by using the new variable as input in calculation of the security token for the second RAT.

In some embodiments, e.g. in some fifth embodiments, the first radio network node 110 is configured to determine the updated version of the one or more parameters of the first set of parameters or the updated version of the one or more parameters of the second set of parameters by extending definition of existing variables to use one or more values in the second RAT format in place of the one or more parameters of the first set of parameters.

The first radio network node 110 is configured to verify, e.g. by means of the verifying unit 805, a wireless device 120. The verifying unit 805 may be implemented by or arranged in communication with the processor 807 of the first radio network node 110.

The first radio network node 110 is configured to verify the wireless device 120,122 based on the received security token and the determined expected security tokens. For example, the first radio network node 110 is configured to verify an identity of the wireless device and whether or not the wireless device is valid based on the received and the determined expected security tokens.

Those skilled in the art will also appreciate that the units in the first radio network node 110 described above may refer to a combination of analog and digital circuits, and/or one or more processors configured with software and/or firmware, e.g. stored in the network node 110 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The radio network node 110 may comprise an input and output interface 806 configured to communicate with one or more out of the wireless device 120, 122, the second radio network node 112, the network node 130, and the location server 132. The input and output interface may comprise a wireless receiver (not shown) and a wireless transmitter (not shown).

The embodiments herein may be implemented through a respective processor or one or more processors, such as the processor 807 of a processing circuitry in network node 110 depicted in FIG. 8B, together with respective computer program code for performing functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 808 comprising one or more memory units. The memory comprises instructions executable by the processor in the network node 110.

The memory is arranged to be used to store e.g. data, configurations, and applications to perform the methods herein when being executed in the network node 110. For example, the memory may comprise the buffer having the buffer size referred to herein.

Some embodiments of the first radio network node 110 may comprise:
a communication circuitry configured to provide wireless device with first set of parameters, possibly also with an instruction how to update parameters, receive a security token from second radio network node, and to transmit configurations
a storage configured to store set of parameters and security tokens,
a processing unit configured to determine an expected security token and
a radio circuitry configured to transmit configurations to second radio network node.

Example embodiments of a flowchart depicting embodiments of a method performed by the second radio network node 112 for assisting a wireless device 120,122 in re-establishing a radio connection in a wireless communications network 100 is depicted in FIG. 9A and will be described more in detail in the following. As previously mentioned the wireless communications network 100 comprises a first RAT and a second RAT. The wireless device 120 operates in a first cell 11 served by the first radio network node 110 operating in the first RAT The method may comprise one or more of the following actions which actions may be taken in any suitable order. Further, it should be understood that one or more actions may be optional and that actions may be combined.

In Action 901A, the second radio network node 112 provides the wireless device with a second set of parameters associated with a second cell 12 of second RAT.

In Action 901A', the second radio network node 112 may provide the wireless device with an instruction how to convert parameters into another format.

In Action 902A, the second radio network node 112 receives a re-establishing request from the wireless device, which re-establishing request comprises a security token.

In Action 903A, the second radio network node 112 transmits to the first radio network node 110, the second set of parameters associated with a second cell 12 of second RAT.

In Action 904A, the second radio network node 112 transmits the received security token to the first radio network node 110. This may be performed by the second network node 112 when transmitting, to the first radio network node 110, a message requesting the parameters and/or configurations in Action 806A above, which parameters and/or configurations are to be used when re-establishing the connection with the wireless device 120.

In Action 905A, the second radio network node 112 receives, from the first radio network node 110, one or more configurations and/or parameters relating to the radio connection to be re-established.

In Action 906A, the second radio network node 112 re-establishes the connection with the wireless device 120.

Figure 9B:
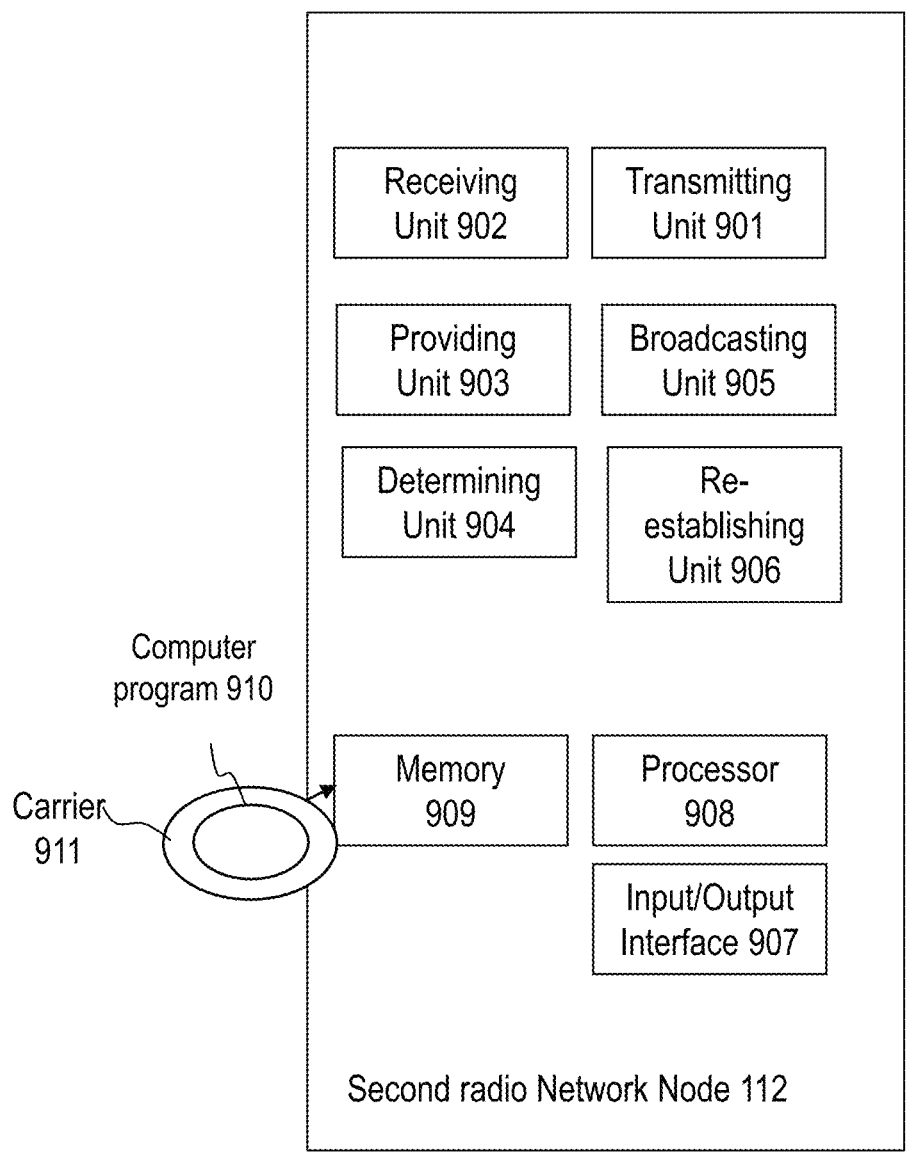
FIG. 9B is schematic block diagram illustrating embodiments of a second radio network node.

To perform the method actions e.g. for assisting a wireless device 120,122 in resuming a radio connection in a wireless communications network 100, the second radio network node 112 may comprise the arrangement depicted in FIG. 9B. The second radio network node 112 may e.g. comprise a transmitting unit 901, a receiving unit 902, a providing unit 903, a determining unit 904, broadcasting unit 905 and a re-establishing unit 906.

Those skilled in the art will also appreciate that the units in the second radio network node 112 described above may refer to a combination of analog and digital circuits, and/or one or more processors configured with software and/or firmware, e.g. stored in the network node 112 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The second radio network node 112 may comprise an input and output interface 907 configured to communicate with one or more out of the wireless device 120, 122, the first radio network node 110, the network node 130, and the location server 132. The input and output interface may comprise a wireless receiver (not shown) and a wireless transmitter (not shown).

The embodiments herein may be implemented through a respective processor or one or more processors, such as the processor 908 of a processing circuitry in network node 112 depicted in FIG. 9B, together with respective computer program code for performing functions and actions of the embodiments herein. The program code mentioned above may also be provided as a computer program product, for instance in the form of a data carrier carrying computer program code for performing the embodiments herein when being loaded into the network node 112. One such carrier may be in the form of a CD ROM disc. It is however feasible with other data carriers such as a memory stick. The computer program code may furthermore be provided as pure program code on a server and downloaded to the network node 112.

The network node 112 may further comprise a memory 909 comprising one or more memory units. The memory comprises instructions executable by the processor in the network node 112.

The memory is arranged to be used to store e.g. data, configurations, and applications to perform the methods herein when being executed in the network node 112. For example, the memory may comprise the buffer having the buffer size referred to herein.

Some embodiments of the second radio network node 112 may comprise:
- a communication circuitry configured to provide the wireless device with second set of parameters, possibly also with an instruction how to update parameters, receive a security token from wireless device and to transmit the security token to the first radio network node, and to receive one or more configurations and/or parameters to re-establish a connection with the wireless device.
- a storage configured to store set of parameters and security tokens,
- a processing unit and
- a radio circuitry configured to receive configurations from the first radio network node and to re-establish radio connection with the wireless device.

In some embodiments, a respective computer program 810, 910 comprises instructions, which when executed by the respective at least one processor, cause the at least one processor of the network node 110,112 to perform one or more of the actions described herein.

In some embodiments, a respective computer program 712 comprises instructions, which when executed by the respective at least one processor, cause the at least one processor of the wireless device 120,122 to perform the actions described herein.

In some embodiments, a respective carrier 713, 811, 911 comprises the respective computer program, wherein the carrier is one of an electronic signal, an optical signal, an electromagnetic signal, a magnetic signal, an electric signal, a radio signal, a microwave signal, or a computer-readable storage medium.

Below a more detailed description will follow.

Embodiments disclosed herein may be separated into different parts which will be described in more detail below.

Some example Embodiments numbered 1-12 are described below.

The following embodiments refer among other things to FIG. 5, FIG. 6, and FIG. 7.

Embodiment 1. A method performed by a wireless device (120) for re-establishing a radio connection in a wireless communications network (100) comprising a first Radio Access Technology, RAT, and a second RAT, wherein the wireless device (120) operates in a first cell (11) served by a first radio network node (110) operating in the first RAT, and wherein the method comprises:

when a connection failure with the first radio network node (110) has been detected,
performing (601), e.g. by means of a performing unit, cell selection and selecting, e.g. by means of a selecting unit, (602) a second cell in second RAT, known by the wireless device (120) to be a candidate for reestablishment;
determining (603), e.g. by means of a determining unit, a first set of parameters associated with the first cell (11) served by the first radio network node (110) operating in the first RAT, wherein the first set of parameters comprises at least one parameter identifying the wireless device (120) or the first cell (11);
determining (604), e.g. by means of the determining unit, a second set of parameters associated with the second cell (12) served by a second radio network node (112) operating in the second RAT, wherein the second set of parameters comprises at least one parameter identifying the wireless device (120) or the second cell (12);
based on first and second sets of parameters; determining (606), e.g. by means of the determining unit, a security token; and
transmitting (607), e.g. by means of a transmitting unit, to the second radio network node (112), a re-establishment request message comprising the security token.

The first set of parameters may comprise C-RNTI and/or PCI, and the second set of parameters may comprise Cell ID.

Embodiment 2. The method of embodiment 1, further comprising:
determining (605) an updated version of one or more parameters of the first set of parameters or an updated version of one or more parameters of the second set of parameters; and wherein the determining (606) of the security token comprises:
determining the security token based on at least one out of the first set of parameters and the updated version of the one or more parameters of the first set of parameters, and based on at least one out of the second set of parameters and the updated version of the one or more parameters of the second set of parameters.

Embodiment 3. The method of embodiment 2, wherein the determining (605) of the updated version of the one or more parameters of the first set of parameters comprises:

converting the one or more parameters of the first set of parameters to a format corresponding to the format of the one or more parameters of the second RAT, e.g. by mapping, recalculating, truncating or padding, and by using one or more variables defined in the second RAT.

This may for example relate to some first exemplifying embodiments.

Embodiment 4. The method of embodiment 2 or 3, wherein the determining (605) of the updated version of the one or more parameters of the second set of parameters comprises:

converting the one or more parameters of the second set of parameters to a format corresponding to the format of the one or more parameters of the first set of parameters, e.g. by mapping, recalculating, truncating or padding, and by using one or more variables defined in the first RAT.

This may for example relate to some second exemplifying embodiments.

Embodiment 5. The method of embodiment 1, further comprising:

creating/using (605) a new variable comprising the one or more parameters of the first set of parameters in the format of the first RAT and comprising the one or more parameters of the second set of parameters in the format of the second RAT.

This may for example relate to some third exemplifying embodiments.

Embodiment 6. The method of embodiment 1, further comprising:

creating/using (605) a new variable or extending an existing variable to comprise the one or more parameters of the first set of parameters and the one or more parameters of the second set of parameters in both the format of the first RAT and in the format of the second RAT.

This may for example relate to some fourth exemplifying embodiments.

Embodiment 7. The method of embodiment 2, wherein the determining (605) of the updated version of the one or more parameters of the first set of parameters or the updated version of the one or more parameters of the second set of parameters comprises:

extending definition of existing variables to use one or more values, e.g. predefined values, in the second RAT format for the one or more parameters of the first set of parameters.

It should be understood that the value does not have to be predefined. It could also be values which are not associated with the first set of parameters. For instance, the network may signal that for inter-RAT re-establishment, the first set of parameters should be 0, and in another cell, it should be 42 (or something else).

This may for example relate to some fifth exemplifying embodiments.

Embodiment 8. The method of embodiment 2, wherein the determining (605) of the updated version of the one or more parameters of the first set of parameters or the updated version of the one or more parameters of the second set of parameters comprises:

receiving, from the first radio network node (110) or the second radio network node (112), an instruction how to convert the one or more parameters of the first set of parameters into a format corresponding to the format of the one or more parameters of the second RAT or how to convert the one or more parameters of the second set of parameters into a format corresponding to the format of the one or more parameters of the first RAT.

The wireless device may receive the instruction from the first radio network node during suspension and from the second radio network node during re-establishment. In the latter case, the instruction may be broadcasted from the second radio network node.

This may for example relate to some sixth exemplifying embodiments.

The following embodiments refer among other things to FIG. 5, FIGS. 8A,8B and FIGS. 9A,9B.

Embodiment 9. A method performed by a first radio network node (110) for assisting a wireless device (120) in re-establishing a radio connection in a wireless communications network (100) comprising a first Radio Access Technology, RAT, and a second RAT, wherein the wireless device (120) operates in a first cell (11) served by the first radio network node (110) operating in the first RAT, and wherein the method comprises:

providing (801A), e.g. by means of a providing unit, the wireless device (120) with a first set of parameters associated with the first cell (11) served by the first radio network node (120) operating in the first RAT, wherein the first set of parameters comprises at least one parameter identifying the wireless device (120) or the first cell (11), receiving (802A), e.g. by means of a receiving unit, from a second radio network node (112) operating in the second RAT, a second set of parameters associated with a second cell (12) served by the second radio network node (112);

receiving (803A), e.g. by means of the receiving unit, from the second radio network node (112), a security token received in a re-establishment request message from the wireless device (120) when a failure of a radio connection with the first radio network node (110) has been detected;

based on first and second sets of parameters; determining (804A), e.g. by means of a determining unit, an expected security token; and by means of the received security token and the determined expected security token, verifying (805A), e.g. by means of a verifying unit, the wireless device's (120) identity;

transmitting (806A), e.g. by means of the transmitting unit, to second radio network node (112), one or more configurations and/or parameters relating to the radio connection to be re-established.

The first radio network node 110 may also receive the UE identity in the re-establishment request message.

Embodiment 10. The method of embodiment 9, further comprising:

providing (801A) the wireless device (120) with an instruction how to convert one or more parameters of a first set of parameters associated with the first cell (11) into a format corresponding to the format of the one or more parameters of the second set of parameters or how to convert the one or more parameters of the second set of parameters into a format corresponding to the format of the one or more parameters of the first set of parameters.

Embodiment 11. A method performed by a second radio network node (112) for assisting a wireless device (120) in re-establishing a radio connection in a wireless communications network (100) comprising a first Radio Access Technology, RAT, and a second RAT, wherein the wireless device (120) operates in a first cell (11) served by a first radio network node (110) operating in the first RAT, wherein the second radio network node (112) operates in the second RAT, and wherein the method comprises:

provides (901A), e.g. by means of a providing unit, the wireless device (120) with a second set of parameters associated with a second cell (12) served by the second radio network node (122) operating in the second RAT, wherein the second set of parameters comprises at least one parameter identifying the wireless device (120) or the second cell (12);

receiving (902A), e.g. by means of a receiving unit, a re-establishment request message comprising a security token, which re-establishment request message is transmitted by the wireless device (120) when a failure of a radio connection with the first radio network node (110) has been detected;

transmitting (903A), e.g. by means of a transmitting unit, to the first radio network node (110), a second set of parameters associated with a second cell (12) served by the second radio network node (112);

transmitting (904A), e.g. by means of a transmitting unit, the security token to the first radio network node (110);

receiving (905A), e.g. by means of a receiving unit, from the first radio network node (110), one or more configurations and/or parameters relating to the radio connection to be re-established; and re-establishing (906A) e.g. by means of a re-establishing unit, the connection with the wireless device (120).

Embodiment 12. The method of embodiment 11, further comprising:

providing (901A) the wireless device (120) with an instruction how to convert one or more parameters of a first set of parameters associated with the first cell (11) into a format corresponding to the format of the one or more parameters of the second set of parameters or how to convert the one or more parameters of the second set of parameters into a format corresponding to the format of the one or more parameters of the first RAT.

2.1 Introduction

The following alternative sub-mechanism are proposed, mainly concerning the way the input parameters are determined. Thus, the following sections relate to the determination of the input parameters used in calculating the security token.

It should be understood that a reference to the UE in this disclosure is a reference to a wireless device 120,122, a reference to a first/source cell is a reference to the first cell 11 served by the first radio network node 110, and a reference to a second/target cell is a reference to the second cell 12 served by the second radio network node 112. Thus, the first radio network node 110 may also be referred to as a source radio network node or just a source network node, and the second radio network node as a target radio network node or just a target network node. Furthermore, a reference to a source eNB or source gNB is be a reference to the first radio network node 110 and a reference to a target eNB or target gNB is be a reference to the second radio network node 112.

Some First Exemplifying Embodiments

In this case the UE, e.g. the wireless device 120,122, converts source related parameters associated to a first RAT, e.g. the first set of parameters described above, to equivalent or mapped input parameters for the token calculation on the second RAT, before reestablishing the RRC connection after failure. In other words, the wireless device converts the one or more parameters of the first set of parameters to a format corresponding to the format of the one or more parameters of the second set of parameters. As previously described, the conversion may be performed by performing one or more out of mapping, re-calculating, truncating, or padding of the one or more parameters of the first set of parameters as described above. This may be implemented in the specifications by describing, e.g. in field descriptions, the adaptation in terms of a UE variable in the second RAT for the case when the UE has been connected in another RAT, e.g. by updating the description of parameters in the UE variable VarShortMAC-Input or similar UE variable of the second RAT. In this case, the parameters like the C-RNTI and Physical Cell ID (PCI) are taken from the source RAT and stored along with the Cell identity of the target RAT into the UE variable to calculate the security token, i.e., Short MAC-I. To use the source PCI in the target RAT variable, the method proposes some embodiments wherein the UE uses either padded (if target RAT is NR) or truncated (if target RAT is LTE) input parameters with different number of bits in different RATs so that the same equation and/or function per RAT for the security token calculation may be used. Padding may be performed with a predefined sequence of 0's and/or 1's in order to extend the bit string of parameters of the first set of parameters, while truncation could involve removing some bits, e.g. one or more Most Significant Bits (MSB) or one or more Least Significant Bits (LSB), from the information element in order to shorten in order to extend the bit string of parameters of the first set of parameters. However, it should be understood that other mapping or re-calculation of the one or more parameters of the first set of parameters may be performed in order to obtain a bit string of the first set of parameters that matches the bit string of corresponding parameters of the other RAT. Thereby, the same equation and/or function per RAT for the security token calculation may be used. The calculated security token, e.g. the short MAC-I, is then transmitted in the RRC Reestablishment Request message to the second radio network node 112. Corresponding procedures are performed in the network node, e.g. in the first radio network node 110, to calculate the Reestablishment XMAC-I, i.e. the expected security token, used to verify the received Reestablishment Short MAC-I and thereby also to verify the wireless device 120.

Advantage with some first exemplifying embodiments is that there is no need to truncate input parameters like the Cell ID parameter which makes the Cell ID unique, thereby avoiding the risk that different target cells would generate the same Short MAC-I.

Another advantage is that one would not need to design an additional MAC-I calculation having source inputs with different number of bits and consequently having to implement this additional function in the UE and in the network for the case the UE reestablishes in a different RAT than the source RAT.

Some Second Exemplifying Embodiments

In some second exemplifying embodiments, the source coding for the input parameter is used for calculating, the security token, e.g. the Reestablishment Short MAC-I. In this case the UE converts target related parameters associated to a second RAT to equivalent or mapped input parameters for the token calculation of the second RAT i.e. to be used in the VarShortMAC-Input (or similar parameter) of the first RAT. In other words, the wireless device converts the one or more parameters of the second set of parameters to a format corresponding to the format of the one or more parameters of the first set of parameters. As previously described, the conversion may be performed by performing one or more out of mapping, re-calculating, truncating, or padding of the one or more parameters of the second set of parameters as described above.

More concretely the parameter Cell Identity which is the target cell ID is used along with the C-RNTI and Physical Cell ID (PCI) of the source RAT into the parameter VarShortMAC-Input, or similar parameter to calculate the Reestablishment Short MAC-I (ShortMAC-I or similar, e.g. the security token. To use the Cell ID in the source RAT parameters, padding (LTE to NR) or truncation (NR to LTE) may be used. Padding may be performed with a predefined sequence of 0's and/or 1's in order to extend the bit string of parameters of the second set of parameters, or calculating a sequence of 0's and 1's based on information known to both the UE and the network e.g. the rest of the Cell ID, the Reestablishment causes, the I-RNTI, a constant value, etc. Truncation may involve removing some bits, e.g. MSB or LSB, from the information element and thereby to shorten the bit sting of parameters of the second set of parameters. However, it should be understood that other mapping or re-calculation of the one or more parameters of the first set of parameters may be performed in order to obtain a bit string of the first set of parameters that matches the bit string of corresponding parameters of the other RAT. Thereby, the same equation and/or function per RAT for the security token calculation may be used. For example, the truncation could also be performed by calculating a bit string with the shorter length using at least the full length of the parameter (e.g. Cell ID of the target cell) as input. Other parameters used as input to calculate the shorter value may be e.g. a constant, Reestablishment cause, the I-RNTI. The short MAC-I, i.e. the security token, is then transmitted in the RRC Reestablishment Request message, e.g. to the second radio network node 112. Part of that solution could comprise the introduction of an additional input parameter, sort of an inter-RAT discriminator so that the Reestablishment short MAC-I computed based on padded or truncated parameters will not be the same as another intra-RAT version of that Reestablishment short MAC-I with same values, just as coincidence. Corresponding procedures are performed in the network node calculating the Reestablishment MAC-I used to verify the received Reestablishment short MAC-I.

Advantage with some second exemplifying embodiments is that the calculation of the security token, e.g. the Short MAC-I or similar checksum, is done using the source format, which most likely limits the impact on the source node, i.e. the first radio network node 110 being the node in the network which verifies the Short MAC-I provided by the UE, i.e. the wireless device 120.

Some Third Exemplifying Embodiments

In some embodiments, one or more new input variables are created in both RATs, e.g. in both LTE and NR, which may take the parameters C-RNTI and PCI from the source RAT and Cell ID of the target RAT and use this to calculate a security token, e.g. a MAC-I, in the target RAT. This variable could either be defined in the specifications of the source RAT (solution 3.1) or in the specifications of the target RAT (solution 3.2).

As previously described, the wireless device 120 may create a new variable comprising one or more parameters of the first set of parameters in the format of the first RAT and comprising one or more parameters of the second set of parameters in the format of the second RAT. Further, the wireless device 120 may use the new variable as input in calculation of the security token for the second RAT.

Advantage with some third exemplifying embodiments is that no information is lost (truncated) in the security token calculation, e.g. the Reestablishment Short MAC-I calculation, which reduces the (already small) risk of the same Short MAC-I being generated for a UE attempting to Reestablish in more than one cell.

Some Fourth Exemplifying Embodiments

In some embodiments, one or more new input variables are created in only one of the RATs (i.e. only in LTE or only in NR) or in both RATs. This new IE may be an extension of an existing IE, using a CHOICE structure to be used for both inter-RAT failure/Reestablishment as well as intra-RAT reestablishment. In solution 4.1 both the VarShortMAC-Input or similar in LTE and in NR are updated or introduced. These variables are used whenever the target RAT matches the specification, i.e. the LTE VarShortMAC-Input is used if target RAT is LTE regardless of whether the source RAT is LTE or NR and the NR VarShortMAC-Input is used if the target RAT is NR regardless of whether the source RAT is LTE or NR. In solution 4.2, only the variable VarShortMAC-Input or similar in LTE is updated and is used for reestablishment from LTE to LTE, from LTE to NR, or from NR to LTE. In case of failure/reestablishment from NR to NR, the variables defined in NR specification is used, e.g. the unmodified VarShortMAC-Input, or similar. In solution 4.3, only the variable VarShortMAC-Input or similar in NR is updated and is used for failure/Reestablishment from NR to NR, from LTE to NR, or from NR to LTE. In case of failure/Reestablishment from LTE to LTE, the unmodified variable VarShortMAC-Input or similar is used.

Advantage with some fourth embodiments is that no information is lost, e.g. truncated in the security token calculation, e.g. the Reestablishment Short MAC-I calculation, which reduces the (already small) risk of the same Short MAC-I being generate for a UE attempting to reestablish in more than one cell.

Some Fifth Exemplifying Embodiments

In some embodiments, the existing variables are updated to use dummy variables in place of the source parameters, e.g. in place of one or more parameters of the first set of parameters. For instance, the PCI may use a value outside the range of the defined identities compared to normal intra-RAT reestablishment, e.g. if the UE connected and detects failure in LTE and reestablishes in NR, the PCI may be set to e.g. 1023 (maximum PCI is 1007, but 10 bit coding allows values up to 1023) and if UE is connected and detects failure in NR and reestablishes in LTE, the PCI may be set to e.g. 511 (maximum PCI is 503 but 8 bit coding allows value up to 512). As described above, the wireless device 120 may extend definition of existing variables to use one or more values in the second RAT format in place of the one or more parameters of the first set of parameters.

Advantage with some fifth exemplifying embodiments is that no new variables need to be introduced.

In the previous description, the term Cell Identity refers to any type of cell identifier associated to the target cell, typically broadcasted by system information, e.g., PCI, cell global identity, etc.

In this description, the first RAT may either be LTE or NR. Also, the second RAT may either be LTE or NR. However, this does not preclude the application of some embodiments disclosed herein between other RATs employing similar procedures to authenticate the UEs.

The method also comprises mechanisms in a source network node, e.g. the first radio network node 110, associated to the first RAT and in a target network node, e.g. the second radio network node 112 associated to the second RAT, the method comprising:

The target network node of the second RAT, e.g. the second radio network node 112, upon receiving a reestablishment request from the UE, e.g. the wireless device 120, and identifying that request as an inter-RAT reestablishment procedure (e.g. by the identifier that contains network related information), triggering an inter-RAT fetching of the UE AS context by sending some kind of context request message to a source network node of the first RAT, e.g. to the first radio network node 110, and including in that request message target cell parameters such as a target identity of that second RAT, and possibly other parameters e.g. for replay attack avoidance and/or protocol discriminator, in which second RAT the UE is trying to reestablish and in which second RAT the parameter(s) in target (e.g. a cell identity) has possibly a different number of bits compared to the parameter in the first RAT.

The source network node of the first RAT, e.g. the first radio network node 110, receiving the context fetching request message including one or multiple inter-RAT target cell parameter(s) as described above and, using these parameters and other source parameters from the AS UE context associated to that UE, such as the source C-RNTI and the source PCI, computing the security token, e.g. the Reestablishment Short MAC-I, so the UE may be verified as a valid UE. The way the Reestablishment Short MAC-I is computed, using source parameters of a first RAT and also target parameters of the second RAT follows the same rule the UE follows i.e. according to any of the described sub-methods of the embodiments described herein. Then, if the UE is verified, the source network node provides the UE AS context to the target network node of the second RAT;

The target network node of the second RAT, upon receiving a message with the AS context for that UE, may decide to Reestablish or, Setup a new RRC Connection or Release the connection;

2.2. Disclaimers

A scenario described is the one where the UE in an RRC_CONNECTED state in one RAT, i.e. the source RAT, detects radio link failure and upon performing cell reselection/selection to another RAT, i.e. the target RAT, remains in the RRC_CONNECTED state. When the UE tries to reestablish, it needs to handle the fact that the security token, e.g. the Short MAC-I, in the target RAT has different inputs in order to compute the token as compared to the inputs used to compute the security token as used in the source RAT.

However, the methods described herein are applicable to any other scenario where there are differences between the input parameters and overall procedure handling between the source RAT, wherein the UE is connected and is detecting a radio link failure, and the target RAT, i.e. where the UE tries to reestablish. For example, this may be the case when the source and target RATs have different software version, e.g. in case one has been upgraded but not the other, when the source and target RATs are from different releases, etc. Some embodiments also cover the scenario where the UE performs resume due to a RAN area update, i.e. the UE enters an inter-RAT cell that does not belong to its configured RAN area.

Also, in most cases the inter-RAT mobility between LTE and NR is described. However, it should be understood that the source and target RATs may be any RATs where the handling of security token calculation and/or input parameters for the calculation differ.

Also, herein the cases where two RATs, i.e. the source RAT and target RAT, are connected to the same core network are described. In particular, embodiments herein relate to NR and LTE connected to 5GC.

However, the embodiments described herein may work in any other context even if the RATs are not connected to the same core network CN, as long as context fetching and security algorithm harmonization are supported across different CNs.

It is also important to note that some embodiments described the adaptation method using as examples the existing input parameters for the token calculation as described in TS 36.331 and TS 38.331. However, the embodiments disclosed are applicable to any parameters possibly introduced in the future in either of the RATs or even both e.g. new parameters like protocol discriminator and/or parameters for replay attack avoidance like radio specific parameters, or even parameters computed as a function of any of these existing parameters.

Embodiments herein are described in scenarios involving inter-RAT failure and reestablishment between E-UTRA and NR. However, if any other RAT would interwork (e.g. IEEE 801.11, Bluetooth, or any future RAT) with either E-UTRA or NR, and require the calculation of a security token, it should be understood that the embodiments described herein may be used to adapt the input parameters of different RATs.

Whenever in this document the terms NR messages, parameters, security token, procedures or similar are mentioned, they referred to those specified in the NR specifications, specifically the 3GPP NR RRC specification TS 38.331.

Likewise, whenever the terms LTE messages, parameters, security tokens, procedures or similar are mentioned, they refer to those specified in the E-UTRA (LTE) specifications, specifically the 3GPP E-UTRA RRC specification TS 36.331.

In this disclosure it is shown how to calculate the security token, e.g. the ShortMAC-I, when reestablishing in another RAT. The ShortMAC-I is used as example of the E-UTRA or NR Short MAC-I, or more generally the security token used in the other RAT.

When a UE attempts to reestablish its connection in either LTE or NR, the UE must include a 16 bit security token, e.g. the ShortMAC-I, in the message.

Note that in some embodiments disclosed herein it is assumed that as in LTE and NR, the output number of the bits of the MAC-I is the same. However, the function may be applied to the case the number of bits in the source RAT and the target RAT are different too.

To derive the security token, the UE, e.g. the wireless device 120, and network, e.g. the first radio network node 110, use the parameters in the VarShortMAC-Input or similar, defined in both LTE and NR separately.

2.3 Short MAC-I for RRC Reestablishment in LTE and NR

In LTE and NR, a secure checksum or hash or authentication token is used to verify the UE context in case of RRC Reestablishment. This checksum is called ShortMAC-I, or similarly. In this disclosure the ReestablishmentMAC-I, the shortMAC-I and the ShortReestablishmentMAC-I re also referred to as the security token and the terms may be used interchangeably. Below is a description how it is calculated using the integrity protection algorithm and key that the UE has been configured for RRC integrity protection.

TS 38.331 5.3.1 ShortMAC-I in NR

In TS 38.331 section 5.3.7.4, the ShortMAC-I, i.e. the security token, is calculated as:

The UE shall set the contents of RRCReestablishmentRequest message as follows:

1> set the ue-Identity as follows:
  2> set the c-RNTI to the C-RNTI used in the source PCell (reconfiguration with sync or mobility from NR failure) or used in the PCell in which the trigger for the re-establishment occurred (other cases);
  2> set the physCellId to the physical cell identity of the source PCell (reconfiguration with sync or mobility from NR failure) or of the PCell in which the trigger for the re-establishment occurred (other cases);
  2> set the shortMAC-I to the 16 least significant bits of the MAC-I calculated:
    3> over the ASN.1 encoded as per section 8 (i.e., a multiple of 8 bits) VarShortMAC-Input;
    3> with the $KRR_{Cint}$ key and integrity protection algorithm that was used in the source PCell (reconfiguration with sync or mobility from NR failure) or of the PCell in which the trigger for the re-establishment occurred (other cases); and
    3> with all input bits for COUNT, BEARER and DIRECTION set to binary ones;

Although VarShortMAC-Input hasn't been defined yet, it is proposed to design it as (R2-1812169):

| VarShortMAC-Input variable |
| --- |
| -- ASN1START |
| -- TAG-VAR-SHORTMACINPUT-START |
| VarShortMAC-Input ::=   SEQUENCE { |
|   sourcePhysCellId   PhysCellId, |
|   targetCellIdentity   CellIdentity, |
|   source-C-RNTI   RNTI-Value |
| } |
| -- TAG-VAR- SHORTMACINPUT-STOP |
| -- ASN1STOP |

| VarShortMAC-Input field descriptions |
| --- |
| targetCellIdentity |
| Set to CellIdentity of the target cell i.e. the cell the UE is trying to reestablish the connection. |
| source-C-RNTI |
| Set to C-RNTI that the UE had in the PCell it was connected to prior to the reestablishment. |
| sourcePhysCellId |
| Set to the physical cell identity of the PCell the UE was connected to prior to the RRC connection. |

2.3.2. ShortMAC-I in LTE

In LTE/EPC (TS 36.331 section 5.3.3.3a), the ShortMAC-I, i.e. the security token, is calculated as:

The UE shall set the contents of RRCConnectionReestablishmentRequest message as follows:

1> except for a NB-IoT UE for which AS security has not been activated, set the ue-Identity as follows:
  2> set the c-RNTI to the C-RNTI used in the source PCell (handover and mobility from E-UTRA failure) or used in the PCell in which the trigger for the re-establishment occurred (other cases);
  2> set the physCellId to the physical cell identity of the source PCell (handover and mobility from E-UTRA failure) or of the PCell in which the trigger for the re-establishment occurred (other cases);
  2> set the shortMAC-I to the 16 least significant bits of the MAC-I calculated:
    3> over the ASN.1 encoded as per section 8 (i.e., a multiple of 8 bits) VarShortMAC-Input (or VarShortMAC-Input-NB in NB-IoT);
    3> with the $KRR_{Cint}$ key and integrity protection algorithm that was used in the source PCell (handover and mobility from E-UTRA failure) or of the PCell in which the trigger for the re-establishment occurred (other cases); and
    3> with all input bits for COUNT, BEARER and DIRECTION set to binary ones;

Where VarShortMAC-Input is defined as:

| VarShortMAC-Input UE variable | |
| --- | --- |
| -- ASN1START | |
| VarShortMAC-Input ::=   | SEQUENCE { |
|   cellIdentity | CellIdentity, |
|   physCellId | PhysCellId, |
|   c-RNTI | C-RNTI |
| } | |
| -- ASN1STOP | |

| VarShorMAC-Input field descriptions |
| --- |
| cellIdentity |
| Set to CellIdentity included in cellIdentity (without suffix) in SIB1 of the current cell. |
| c-RNTI |
| Set to C-RNTI that the UE had in the PCell it was connected to prior to the failure. |
| physCellId |
| Set to the physical cell identity of the PCell the UE was connected to prior to the failure. |

2.4 Input Parameters for Calculation of Security Token in RRC Reestablishment

The calculations of the security token to be included in the RRC Reestablishment Request message use three different parameters: Physical cell ID (PCI) of the source cell, C-RNTI (Cell-Random Network Temporary Identity) of the source cell, and the Cell identity (CID) of the target cell. The following sections describe how these parameters are specified in LTE and NR.

In addition, the calculations of the security token rely on an integrity protection algorithm, which uses the parameters described as input. Since the LTE and the NR have separate configurations of the algorithms, the usage of the algorithms need to be coordinated. In LTE the UE may be configured with the E-UTRA Integrity Algorithms (EIA) EIA0-EIA3, while in the NR the UE may be configured with the NR Integrity Algorithms (NIA) NIA0-NIA3. Currently, in Rel-15, the NR algorithms NIA0-NIA3 are identical to the corresponding E-UTRA algorithms EIA0-EIA3, however, the specifications allow introduction of separate algorithms in NR and/or LTE which may differ in future releases. If the UE was configured with an integrity protection algorithm in LTE which has an equivalent, e.g. identical, algorithm supported in NR, i.e. currently EIA0-EIA3, the UE could e.g. select the corresponding NR algorithm to calculate the MAC-I and vice versa in the other direction.

If the UE is configured with an integrity protection algorithm in the first RAT, which is not supported in the second RAT the UE could
- In one embodiment, abort the inter-RAT RRC Reestablishment procedure, delete its AS context, transition to the RRC_IDLE state and perform a NAS recovery.
- In another embodiment, the UE selects a predefined integrity protection algorithm which both the first and the second RATs support (e.g. eia0/nia0, or eia3/nia3, or any of the other algorithms which are identical in LTE and NR).

2.4.1.1. PhysCellId

To calculate the short MAC-I during RRC reestablishment, the physical cell identity of the source cell is required. Both the LTE specification (TS 36.331) and the NR specification (TS 38.331), define the LTE and NR PC's as below.

The LTE PCI in LTE is defined as (TS 36.331 v15.2.0, 2018-06):

PhysCellId (LTE)

The IE PhysCellId is used to indicate the physical layer identity of the cell, as defined in TS 36.211 [21].

| PhysCellId information element |
| --- |
| -- ASN1START <br> PhysCellId ::=    INTEGER (0..503) <br> -- ASN1STOP |

While the PCI in NR is defined as:
PhysCellId (NR)
The PhysCellId identifies the physical cell identity (PCI).

| PhysCellId information element |
| --- |
| -- ASN1START <br> -- TAG-PHYS-CELL-ID-START <br> PhysCellId ::=    INTEGER (0..1007) <br> -- TAG-PHYS-CELL-ID-STOP <br> -- ASN1STOP |

Notably, the size of the PCI differs in LTE and NR, where the LTE PCI is coded as 9 bits and the NR PCI is coded as 10 bits.

In addition, LTE also defines the NR PCI as:
PhysCellIdNR
The IE PhysCellIdNR indicates the physical layer identity (PCI) of an NR cell.

| PhysCellIdNR information element |
| --- |
| -- ASN1START <br> PhysCellIdNR-r15 ::=    INTEGER (0.. 1007) <br> -- ASN1STOP |

And NR defines the LTE PCI as:
EUTRA-PhysCellId
The IE EUTRA-PhysCellId is used to indicate the physical layer identity of the cell, as defined in TS 36.211 [21].

| EUTRA-PhysCellId information element |
| --- |
| -- ASN1START <br> -- TAG-EUTRA-PHYS-CELL-ID-START <br> EUTRA-PhysCellId ::=    INTEGER (0..503) <br> -- TAG-EUTRA-PHYS-CELL-ID-STOP <br> -- ASN1STOP |

2.4.1.2. C-RNTI

Both the LTE and NR VarShortMAC-Input contain the source C-RNTI, to tie the calculations of the Reestablishment Short MAC-I to the source cell.

The C-RNTI in LTE is defined as (TS 36.331 v15.2.0, 2018-06):

| C-RNTI information element |
| --- |
| -- ASN1START <br> C-RNTI ::=    BIT STRING (SIZE (16) ) <br> -- ASN1STOP |

While the C-RNTI in NR is defined as RNTI-Value:

| RNTI-Value information element |
| --- |
| -- ASN1START <br> -- TAG-RNTI-VALUE-START <br> RNTI-Value ::=    INTEGER (0..65535) <br> -- TAG-RNTI-VALUE-STOP <br> -- ASN1STOP |

As may be noted, both the LTE and NR C-RNTI are equal in length (16 bit, the integers 0 to 65535 are coded as 16 bits as 65536 is written with 16 digits in binary form, i.e. log 2(65536)=16).

Even though the LTE C-RNTI and the NR C-RNTI have the same length, they are specified in separate specifications and cannot be used interchangeably.

2.4.1.3 Cell Identity

To calculate the short MAC-I during RRC reestablishment, the cell identity of the target cell is needed. However, only the cell identity belonging to the same RAT is defined in LTE and NR.

The Cell Identity is defined in LTE as:
CellIdentity
The IE CellIdentity is used to unambiguously identify a cell within a PLMN.

| CellIdentity information element |
| --- |
| -- ASN1START <br> CellIdentity ::=    BIT STRING (SIZE (28)) <br> -- ASN1STOP |

While the Cell Identity is defined in NR as:
CellIdentity (NR)
The IE CellIdentity is used to unambiguously identify a cell within a PLMN.

| CellIdentity information element |
| --- |
| -- ASN1START <br> CellIdentity ::=    BIT STRING (SIZE (36)) <br> -- ASN1STOP |

As may be noted, both the LTE and NR cell identity are defined as bit strings, however with different lengths. In LTE the Cell identity is 28 bits, and in NR the cell identity is 36 bits.

2.5 Some First Exemplifying Embodiments: Use Input Parameter Format of the Target System and Convert Source System Parameters In some embodiments, the definitions of the LTE VarShortMAC-Input, or similar parameter used when the target RAT is LTE and the NR VarShortMAC-Input or similar parameter used when the target RAT is NR are extended or modified to allow parameters from another RAT.

In either direction of the inter-RAT RRC Reestablishment procedure, the problem lies in using parameters from the source RAT in procedures of the target RAT, namely the PCI and the C-RNTI.

2.5.1. Failure in LTE and Reestablishment in NR: Calculate and Use NR ShortMAC-I Using LTE PCI and C-RNTI and NR Cell Identity as Input If the UE, e.g. the wireless device 120, is connected to an LTE cell, e.g. the first cell 11, and detects and attempts to reestablish the connection in an NR cell, the UE and network would need to calculate the NR Reestablishment ShortMAC-I, e.g. the security token, using the NR VarShortMAC-Input. The NR VarShortMAC-Input contain the source PCI, the source RNTI and the target Cell identity. The target Cell identity is obtained from the SystemInformationBlockType1 (SIB1) which is broadcast by the target cell, e.g. the second cell 12.

However, the source PCI and the source RNTI were obtained in another RAT (i.e. in the first RAT being LTE in this example) and have different characteristics compared to corresponding parameters in NR.

For the parameter C-RNTI, the VarShortMAC-Input may directly convert the source LTE C-RNTI as it consists of the same number of bits as the NR C-RNTI.

To employ the LTE PCI in the calculations of the NR ShortMAC-I, e.g. the security token for NR, the length of the parameter must be adjusted. The simplest way to do this is to add a dummy value (e.g. a single leading '0') to the LTE PCI and use this modified value in the NR VarShortMAC-Input, e.g. to be used as input in the calculation of the security token. Naturally any other method to increase the length of the LTE PCI with one bit is equally applicable, e.g. a single trailing '0' or '1' or adding a bit at any other place in the bit string. In other words, the bit string may be extended in any other suitable way, e.g. by mapping, recalculating, or padding as previously described. This added bit could also be calculated based on e.g. the content of the bits in the LTE PCI.

If the UE was configured with an integrity protection algorithm in LTE which is not supported in NR, e.g. by a hypothetical future EIA4, different from any algorithm in NR, the UE could either:

Abort the reestablishment procedure and fallback to RRC Setup, or

Use a predefined fallback algorithm which is supported in both LTE and NR (e.g. any of the algorithms NIA0-NIA3)

The calculation of the NR ShortMAC-I, i.e. the security token, is performed by both the UE, i.e. the wireless device 120, and the network, i.e. the first and/or second radio network node 110,112. The network node performing the calculation of the ShortMAC-I could either be the target node, e.g. the second radio network node 112, which receives the RRCReestablishmentRequest message or the source node, e.g. the first radio network node 110, to which the UE was connected to prior to the failure, or another network entity.

Since the calculation of the ShortMAC-I utilizes the security keys and the integrity protection algorithms stored in the UE context, one solution would be that the source node, i.e. the first radio network node 110, calculates the ShortMAC-I, i.e. the security token, when it receives a context relocation request message (e.g. the RETRIEVE UE CONTEXT REQUEST message as defined in XNAP TS 38.423 v.15.0.0). This message would contain both the ShortMAC-I calculated by the UE, as well as the NR Cell Identity.

Retrieve UE Context Request

A retrieve UE context request message is sent by the new NG-RAN node, e.g. the second radio network node 112, to request the old NG-RAN node, e.g. the first radio network node 110, to transfer the UE Context to the new NG-RAN.

Direction: new NG-RAN node→old NG-RAN node.

| IE/Group Name | Presence | IE type and Range reference | Semantics description | Criticality | Assigned Criticality |
|---|---|---|---|---|---|
| Message Type | M | 9.2.3.1 | | YES | ignore |
| New NG-RAN node UE XnAP ID reference | M | NG-RAN node UE XnAP ID 9.2.3.16 | Allocated at the new NG-RAN node | YES | reject |
| UE Context ID | M | 9.2.3.40 | | YES | reject |
| Integrity protection | M | BIT STRING (SIZE (16)) | ShortMAC-I either contained in the RRCConnection ResumeRequest message as defined in TS 38.331 [10]) or in the RRCConnection ResumeRequest message as defined in TS 36.331 [14]) | YES | reject |
| New Cell Identifier | M | NG-RAN Cell Identity 9.2.2.9 | The Cell Identifier of the cell where the RRC connection has | YES | reject |

| IE/Group Name | Presence | IE type and Range reference | Semantics description | Criticality | Assigned Criticality |
|---|---|---|---|---|---|
| | | | been requested to be resumed or to be re-established. | | |

The source eNB, e.g. the first radio network node 110, already knows the source PCI and C-RNTI from the UE context. However, since the source PCI is shorter than the parameter required in the VarShortMAC-Input, the source PCI must be padded with e.g. one binary '0'. When the source eNB has calculated the ShortMAC-I, it compares the value with the received ShortMAC-I value which the UE calculated.

An alternative solution is that the source eNB provides the security algorithms, the source PCI and source C-RNTI to the target gNB, e.g. the second radio network node 112, when the UE has sent the RRCConnectionReestablishmentRequest. The target gNB, then calculates the ShortMAC-I in the same way as the UE did by padding the LTE PCI, using the LTE C-RNTI and the NR Cell Identity, which it then compares with the ShortMAC-I, the UE calculated and transmitted to the network. By comparing the security token, e.g. the ShortMAC-I, calculated by the second radio network node 112 and the security token, e.g. the ShortMAC-I, calculated by the wireless device 120, the second radio network node 112 is able to verify the wireless device 120 as valid.

The procedures of section 5.3.7.3 in TS 36.331 and section 5.3.7.4 in TS 38.331 may be extended (changes highlighted by underlining) to e.g.

2.5.1.1. Updates of TS 36.331

TS 36.331 5.3.7.3 Actions following cell selection while T311 is running

Upon selecting a suitable E-UTRA cell, the UE shall:
1> stop timer T311;
1> start timer T301;
1> apply the timeAlignmentTimerCommon included in SystemInformationBlockType2;
1> if the UE is a NB-IoT UE supporting RRC connection re-establishment for the Control Plane CIoT EPS optimisation and AS security has not been activated; and
1> if cp-reestablishment is not included in SystemInformationBlockType2-NB:
    2> perform the actions upon leaving RRC_CONNECTED as specified in 5.3.12, with release cause 'RRC connection failure';
1> else:
    2> initiate transmission of the RRCConnectionReestablishmentRequest message in accordance with 5.3.7.4;
NOTE: This procedure applies also if the UE returns to the source PCell.

Upon selecting an inter-RAT cell, the UE shall:
1> if the target cell is an NR cell and the previously configured integrity protection algorithms are available to configure in the target system:
    2> stop timer T311;
    2> start timer T301;
    2> apply the timeAlignmentTimerCommon included in SystemInformationBlockType2;
    2> initiate transmission of the RRCReestablishmentRequest message in accordance with TS 38.331 section 5.3.7.4;
1> else:
    2> if the selected cell is a UTRA cell, and if the UE supports Radio Link Failure Report for Inter-RAT MRO, include selectedUTRA-CellId in the VarRLF-Report and set it to the physical cell identity and carrier frequency of the selected UTRA cell;
    2> perform the actions upon leaving RRC_CONNECTED as specified in 5.3.12, with release cause 'RRC connection failure';

2.5.1.2. Updates of TS 38.331

TS 38.331 5.3.7.4 Actions related to transmission of RRCReestablishmentRequest message The UE shall set the contents of RRCReestablishmentRequest message as follows:
1> set the ue-Identity as follows:
    2> set the c-RNTI to the C-RNTI used in the source PCell (reconfiguration with sync or mobility from NR failure) or used in the PCell in which the trigger for the re-establishment occurred (other cases);
    2> set the physCellId to the physical cell identity of the source PCell (reconfiguration with sync or mobility from NR failure) or of the PCell in which the trigger for the re-establishment occurred (other cases);
    2> set the shortMAC-I to the 16 least significant bits of the MAC-I calculated:
        3> over the ASN.1 encoded as per section 8 (i.e., a multiple of 8 bits) VarShortMAC-Input;
        3> with the $KRR_{Cint}$ key and integrity protection algorithm that was used in the source PCell (reconfiguration with sync or mobility from NR failure) or of the PCell in which the trigger for the re-establishment occurred (other cases); and
        3> with all input bits for COUNT, BEARER and DIRECTION set to binary ones;
NOTE: If the Source RAT was E-UTRA, use the previous E-UTRA $KRR_{Cint}$ key as NR $KRR_{Cint}$ key and use integrity protection algorithm matching the previously configured E-UTRA integrity protection algorithm.
1> set the reestablishmentCause as follows:
    2> if the re-establishment procedure was initiated due to reconfiguration failure as specified in 5.3.5.8.2:
        3> set the reestablishmentCause to the value reconfigurationFailure;
    2> else if the re-establishment procedure was initiated due to reconfiguration with sync failure as specified in 5.3.5.8.3 (intra-NR handover failure) or 5.4.3.5 (inter-RAT mobility from NR failure):
        3> set the reestablishmentCause to the value handoverFailure;
    2> else:
        3> set the reestablishmentCause to the value otherFailure;
1> restore the RRC configuration and security context from the stored UE AS context;
1> restore the PDCP state and re-establish PDCP for SRB1;

1> re-establish RLC for SRB1;
1> resume SRB1;
1> The UE shall submit the RRCReestablishmentRequest message to lower layers for transmission.
UE Variables
VarShortMAC-Input
The UE variable VarShortMAC-Input specifies the input used to generate the ShortMAC-I during RRC Connection Reestablishment procedure.

| VarShortMAC-Input variable |
| --- |
| -- ASN1START<br>-- TAG-VAR-SHORTMACINPUT-START<br>VarShortMAC-Input ::=        SEQUENCE {<br>    sourcePhysCellId            PhysCellId,<br>    targetCellIdentity          CellIdentity,<br>    source-C-RNTI               RNTI-Value<br>}<br>-- TAG-VAR- SHORTMACINPUT-STOP<br>-- ASN1STOP |

| VarShortMAC-Input field descriptions |
| --- |
| targetCellIdentity<br>Set to CellIdentity of the target cell i.e. the cell the UE is trying to reestablish the connection.<br>source-C-RNTI<br>Set to C-RNTI that the UE had in the PCell it was connected to prior to the reestablishment. If the source cell was an E-UTRA cell, this field contain the source cell E-UTRA C-RNTI<br>sourcePhysCellId<br>Set to the physical cell identity of the PCell the UE was connected to prior to the RRC connection. If the source cell was an E-UTRA cell, the 1 MSB of this field contain a binary '0' and the 9 LSB of this field contain the source cell eutra-PhysCellId |

Figure 10:
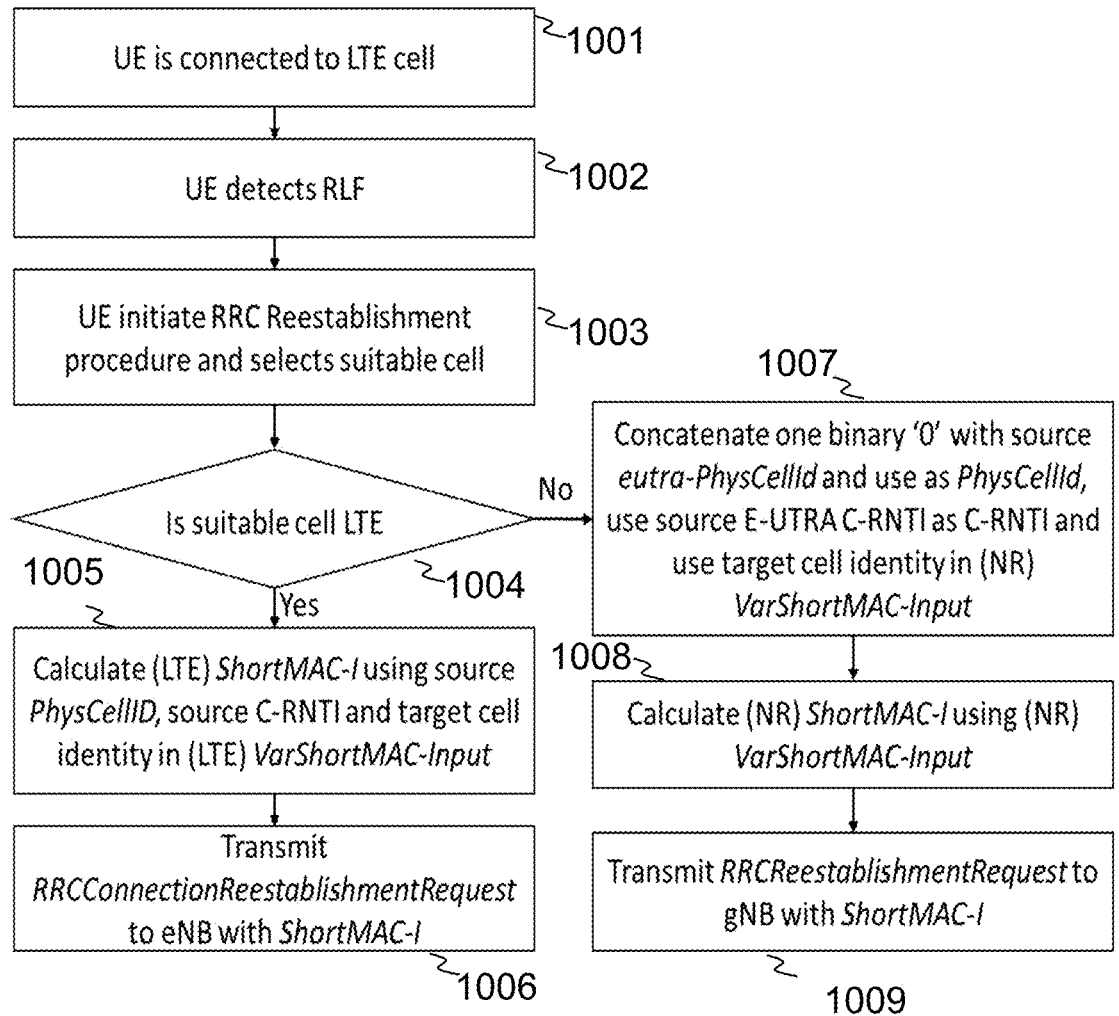
FIG. 10 is a flowchart depicting embodiments of methods in a wireless device connected in LTE that detects a failure and re-establishes in LTE or NR, and when resuming in NR calculating an inter-RAT security token using NR format and procedures.

FIG. 10 schematically illustrated an example diagram for how a UE, e.g. the wireless device 120, decides how to calculate the security checksum, i.e. the security token, during inter-RAT or intra-RAT reestablishment from LTE to LTE or NR. The diagram depicts one embodiment and should not be considered limiting to alternative solutions.

In Action 1001, the wireless device 120 is connected to a first cell 11 being an LTE cell, and in Action 1002, the wireless device 120 detects a radio link failure (RLF). In Action 1003 the wireless device 120 initiates an RRC reestablishment procedure and selects a suitable target cell, e.g. the second cell 12. In Action 1004, the wireless device 120 checks whether or not the target cell, i.e. the second cell 12, belongs to the same RAT as the source cell, i.e. the first cell 11. In other words, and in case the source cell is an LTE cell, the wireless device 120 checks whether or not the target cell is also an LTE cell.

In an intra-RAT procedure, i.e. when then the target cell is also an LTE cell, the wireless device 120 performs Actions 1005 and 1006. In Actions 1005, the wireless device 120 calculates the LTE security token, e.g. the ShortMAC-I, using the source PhysCellID, the source C-RNTI and the target cell identity in the LTE varShortMAC-Input. In Action 1006, the wireless device 120 transmits an RRCConnectionReestablishmentRequest to the network node, e.g. to the first radio network node 110 and/or to the second radio network node 112. The RRCConnectionReestablishmentRequest comprises the calculated security token.

In an inter-RAT procedure, i.e. when then the target cell is not in the same RAT as the source cell, e.g. when the source cell is an LTE cell and the target cell is a NR cell, the wireless device 120 performs Actions 1007, 1008, and 1009. In Action 1007, the wireless device 120 concatenates one binary "0" with the source E-UTRA-PhysCellID and uses that as the PhysCellID, uses source E-UTRA C-RNTI, and uses target cell identity in NR VarShortMAC-Input. In Action 1008, the wireless device 120 calculates the security token in NR, e.g. the NR ShortMAC-I, using the NR VarShortMAC-Input. Thus, the wireless device 120 calculates the security token using NR format and NR procedures. In Action 1009, the wireless device 120 transmits an RRCReestablishmentRequest to the network node, e.g. to the second radio network node 112. The RRCReestablishmentRequest comprises the calculated security token.

2.5.2. Failure in NR and Reestablishment LTE: Calculate and Use ShortMAC-I in LTE Using NR PCI and C-RNTI and LTE Cell Identity as Input If the UE, e.g. the wireless device 120, is connected to the first RAT being NR and detects failure and then reestablishes the connection in the second RAT being LTE, the UE and network would need to calculate the security token, e.g. the LTE ShortMAC-I, using the LTE VarShortMAC-Input or similar variable. The VarShortMAC-Input contain the source PCI, the source C-RNTI and the target Cell identity. The target Cell identity is obtained from the SystemInformationBlockType1 (SIB1) which is broadcast by the target cell, e.g. the second cell 12.

However, the source PCI and source C-RNTI were obtained in another RAT, i.e. the first RAT being NR, and have different characteristics compared to corresponding parameters in the second RAT being LTE.

For the source C-RNTI, the UE stores the NR C-RNTI of the last serving cell, e.g. the first cell 11, and since the LTE and NR C-RNTI have equal length, the LTE VarShortMAC-Input (or similar) may directly convert the NR C-RNTI as input.

To employ the NR PCI in the calculations of the security token, e.g. the LTE ShortMAC-I, the length of the parameter must be adjusted. The simplest way to do this is to truncate the value to either the 9 least significant bits (LSB) or the 9 most significant bits (MSB) and use this truncated value in the LTE VarShortMAC-Input (or similar variable). However, any other mapping of the 10 bit NR PCI to 9 bits to be used in the LTE PCI parameter would be equally possible.

If the UE was configured with an integrity protection algorithm in NR which is not supported in LTE (e.g. a hypothetical future NIA4, different from any algorithm in LTE), the UE could either:

Abort the reestablishment procedure and fallback to RRC_IDLE

Use a predefined fallback algorithm which is supported in both LTE and NR (e.g. any of the algorithms EIA0-EIA3)

The calculation of the security token, e.g. the ShortMAC-I, is performed by both the UE, i.e. the wireless device 120, and the network, i.e. the first and/or second radio network node 110,112. The network node performing the calculation of the ShortMAC-I could either be the target node (gNB), i.e. the second radio network node 112, which receives the RRCReestablishmentRequest message or the source node (eNB), i.e. the first radio network node 110, in which the UE was connected to prior to the failure, or another network entity.

Since the calculation of the ShortMAC-I utilizes the security keys and the integrity protection algorithms stored in the UE context, one solution would be that the source node (gNB) calculates the ShortMAC-I, when it receives a context relocation request message (e.g. the RETRIEVE UE CONTEXT REQUEST message as defined in XNAP TS 38.423). This message would contain both the ShortMAC-I calculated by the UE, as well as the target LTE Cell Identity. Since the source node (gNB) already know the PCI and C-RNTI of the UE from the UE context, it may calculate the ShortMAC-I using the format of the target cell. Since the source PCI is longer than what fits in the target VarShortMAC-Input, the PCI must be truncated. When the source gNB has calculated the ShortMAC-I it compares it with the ShortMAC-I it has received from the UE to verify the UE identity.

Below are proposed changes to section 5.3.7.3 in TS 38.331 and section 5.3.7.4 in TS 36.331 to support inter-RAT reestablishment. The text relating to the proposed updates are shown as underlined.

2.5.2.1. Updates of TS 38.331
TS 38.331 5.3.7.3 Actions following cell selection while T311 is running
Upon selecting a suitable NR cell, the UE shall:
1> stop timer T311;
1> start timer T301;
1> apply the timeAlignmentTimerCommon included in SIB1;
1> initiate transmission of the RRCReestablishmentRequest message in accordance with 5.3.7.4;
NOTE: This procedure applies also if the UE returns to the source PCell.
Upon selecting an inter-RAT cell, the UE shall:
1> if the target cell is an E-UTRA cell and the previously configured integrity protection algorithms are available to configure in the target system:
2> stop timer T311;
2> start timer T301;
2> apply the timeAlignmentTimerCommon included in SIB1;
2> initiate transmission of the RRCConnectionReestablishmentRequest message in accordance with TS 36.331 section 5.3.7.4;
1> else:
2> perform the actions upon going to RRC_IDLE as specified in 5.3.11, with release cause 'RRC connection failure';

2.5.2.2. Updates of TS 36.331
TS 36.331 5.3.7.4 Actions related to transmission of RRCConnectionReestablishmentRequest message
Except for NB-IoT, if the procedure was initiated due to radio link failure or handover failure, the UE shall:
1> set the reestablishmentCellId in the VarRLF-Report to the global cell identity of the selected cell;
The UE shall set the contents of RRCConnectionReestablishmentRequest message as follows
1> except for a NB-IoT UE for which AS security has not been activated, set the ue-Identity as follows:
2> set the c-RNTI to the C-RNTI used in the source PCell (handover and mobility from E-UTRA failure) or used in the PCell in which the trigger for the re-establishment occurred (other cases);
2> set the physCellId to the physical cell identity of the source PCell (handover and mobility from E-UTRA failure) or of the PCell in which the trigger for the re-establishment occurred (other cases);
2> set the shortMAC-I to the 16 least significant bits of the MAC-I calculated:
3> over the ASN.1 encoded as per section 8 (i.e., a multiple of 8 bits) VarShortMAC-Input (or VarShortMAC-Input-NB in NB-IoT);
3> with the $KRR_{Cint}$ key and integrity protection algorithm that was used in the source PCell (handover and mobility from E-UTRA failure) or of the PCell in which the trigger for the re-establishment occurred (other cases); and
3> with all input bits for COUNT, BEARER and DIRECTION set to binary ones;
NOTE: If the Source RAT was NR, use the previous NR $KRR_{Cint}$ key as E-UTRA $KRR_{Cint}$ key and use integrity protection algorithm matching the previously configured NR integrity protection algorithm.
1> for a NB-IoT UE for which AS security has not been activated, set the ue-Identity as follows:
2> request upper layers for calculated ul-NAS-MAC and ul-NAS-Count using the cellIdentity of the PCell in which the trigger for the re-establishment occurred;
2> set the s-TMSI to the S-TMSI provided by upper layers;
2> set the ul-NAS-MAC to the ul-NAS-MAC value provided by upper layers;
2> set the ul-NAS-Count to the ul-NAS-Count value provided by upper layers;
1> set the reestablishmentCause as follows:
2> if the re-establishment procedure was initiated due to reconfiguration failure as specified in 5.3.5.5 (the UE is unable to comply with the reconfiguration):
3> set the reestablishmentCause to the value reconfigurationFailure;
2> else if the re-establishment procedure was initiated due to handover failure as specified in 5.3.5.6 (intra-LTE handover failure) or 5.4.3.5 (inter-RAT mobility from EUTRA failure):
3> set the reestablishmentCause to the value handoverFailure;
2> else:
3> set the reestablishmentCause to the value otherFailure;
1> if the UE is a NB-IoT UE:
2> if the UE supports DL channel quality reporting and cqi-Reporting is present in SystemInformationBlockType2-NB:
3> set the cqi-NPDCCH to include the latest results of the downlink channel quality measurements of the serving cell as specified in TS 36.133 [16];
NOTE: The downlink channel quality measurements may use measurement period T1 or T2, as defined in TS 36.133 [16]. In case period T2 is used the RRC-MAC interactions are left to UE implementation.
2> set earlyContentionResolution to TRUE;
The UE shall submit the RRCConnectionReestablishmentRequest message to lower layers for transmission.
Where VarShortMAC-Input is defined as:
UE Variables
The UE variable VarShortMAC-Input specifies the input used to generate the shortMAC-I.

| VarShortMAC-Input UE variable | |
|---|---|
| -- ASN1START | |
| VarShortMAC-Input ::= | SEQUENCE { |
| cellIdentity | CellIdentity, |
| physCellId | PhysCellId, |
| c-RNTI | C-RNTI |
| } | |
| -- ASN1STOP | |

| VarShortMAC-Input field descriptions |
| --- |
| cellIdentity<br>Set to CellIdentity included in cellIdentity (without suffix) in SIB1 of the current cell.<br>c-RNTI<br>Set to C-RNTI that the UE had in the PCell it was connected to prior to the failure. If the source cell was an NR cell, this field contain the source cell NR C-RNTI<br>physCellId<br>Set to the physical cell identity of the PCell the UE was connected to prior<br>to the failure. If the source cell was an NR cell, this field contain the 9 LSB of the source cell PhysCellIdNR |

Figure 11:
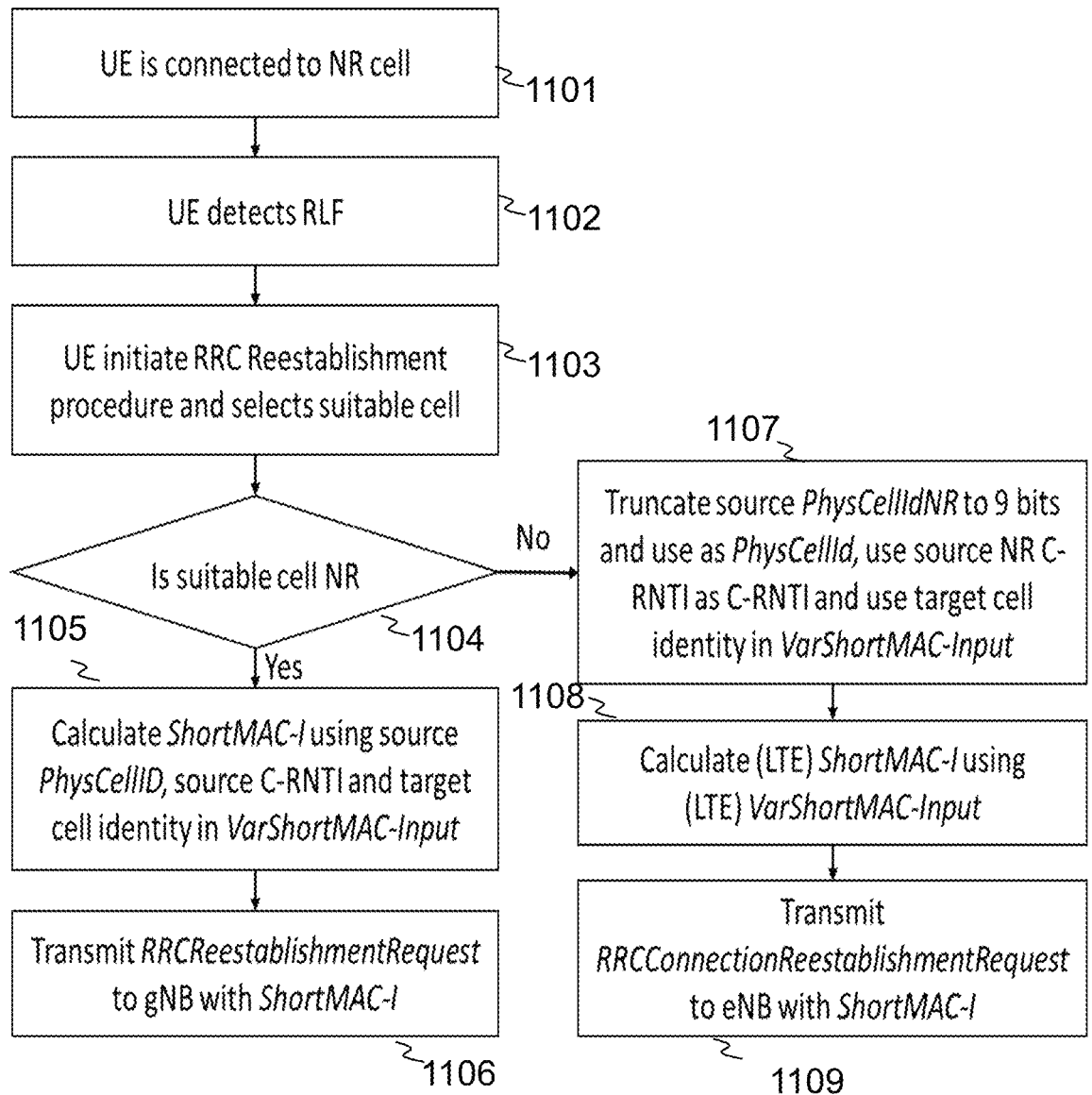
FIG. 11 is a flowchart depicting embodiments of methods in a wireless device connected in NR that detects a failure and re-establishes in NR or LTE, and when resuming in LTE calculating an inter-RAT security token using LTE format and procedures.

FIG. 11 schematically illustrates an example diagram for how a UE, e.g. the wireless device 120, decides how to calculate the security checksum, i.e. the security token, during inter-RAT or intra-RAT Reestablishment from NR to NR or LTE. The diagram depicts one embodiment and should not be considered limiting to alternative solutions.

In Action 1101, the wireless device 120 is connected to a first cell 11 being a NR cell, and in Action 1102, the wireless device 120 detects a RLF. In Action 1103 the wireless device 120 initiates an RRC reestablishment procedure and selects a suitable target cell, e.g. the second cell 12. In Action 1104, the wireless device 120 checks whether or not the target cell, i.e. the second cell 12, belongs to the same RAT as the source cell, i.e. the first cell 11. In other words, and in case the source cell is a NR cell, the wireless device 120 checks whether or not the target cell is also a NR cell.

In an intra-RAT procedure, i.e. when then the target cell is also a NR cell, the wireless device 120 performs Actions 1105 and 1106. In Action 1105, the wireless device 120 calculates the security token, e.g. the ShortMAC-I, using the source PhysCellID, the source C-RNTI and the target cell identity in the LTE varShortMAC-Input. In Action 1106, the wireless device 120 transmits an RRCReestablishmentRequest to the network node, e.g. to the first radio network node 110 and/or to the second radio network node 112. The RRCReestablishmentRequest comprises the calculated security token.

In an inter-RAT procedure, i.e. when then the target cell is not in the same RAT as the source cell, e.g. when the source cell is a NR cell and the target cell is an LTE cell, the wireless device 120 performs Actions 1107, 1108, and 1109. In Action 1107, the wireless device 120 truncates source PhysCellIdNR to 9 bits and uses that as the PhysCellID, uses source NR C-RNTI as C-RNTI, and uses target cell identity in VarShortMAC-Input. In Action 1108, the wireless device 120 calculates the security token in LTE, e.g. the LTE ShortMAC-I, using the LTE VarShortMAC-Input. Thus, the wireless device 120 calculates the security token using LTE format and LTE procedures. In Action 1109, the wireless device 120 transmits an RRCConnectionReestablishmentRequest to the network node, e.g. to the second radio network node 112. The RRCConenctionReestablishmentRequest comprises the calculated security token.

2.6 Some Second Exemplifying Embodiments: Use Input Parameter Format of the Source System and Convert Target System Parameters In some embodiments, the source RAT parameters/variable (e.g. VarShortMAC-Input in LTE or NR) are used as input to the calculations of the source RAT security token, e.g. the ShortMAC-I or similar. These parameters/variables are extended or modified to allow parameters from target RAT, e.g. from the second RAT. In this disclosure, the source RAT parameters are also referred to as the first set of parameters, and the target RAT parameters are referred to as the second set of parameters.

In either direction of the inter-RAT RRC Reestablishment, the problem lies in using parameters from the target RAT in fields/procedures of the source RAT, namely the Cell Identity.

In LTE the (target) Cell Identity is currently 28 bits while in NR it is currently 36 bits.

When the network calculates the integrity checksum, i.e. the security token, it is done in the source node (eNB or gNB), i.e. the first radio network node 110, when it receives e.g. a context relocation request message (e.g. the RETRIEVE UE CONTEXT REQUEST message as defined in XNAP TS 38.423). This message would contain both the ShortMAC-I calculated by the UE, as well as the target Cell Identity. The source node then pads or truncates the target cell identity to match the required size of the source variable.

In case of failure in NR and reestablishment in LTE, the target CellIdentity is e.g. padded from 28 bits to 36 bits, with 8 binary '0's in the beginning. Thus, the bit string is extended.

If the failure/reestablishment is from LTE to NR, the target CellIdentity is e.g. truncated to the 28 LSB. Thus, the bit string is shortened.

Since the source node, e.g. the first radio network node 110, calculates the integrity checksum, i.e. the security token, with the source format of the variables, the source integrity protection algorithms may be used.

2.6.1. Failure in LTE and Reestablishment in NR: Calculate and Use LTE Var-ShortMAC-Input Using LTE PCI and C-RNTI and NR Cell Identity as Input to Calculate NR ShortMAC-I If the UE detects failure in LTE and attempt to reestablish the connection in NR, the UE and network would calculate the NR ShortMAC-I or similar using the LTE VarShortMAC-Input or similar, i.e. even though the UE reestablishes in NR, it calculates the integrity checksum using the LTE variables. The VarShortMAC-Input contain source PCI, source RNTI and target Cell identity. The target Cell identity is obtained by the UE from the SystemInformationBlockType1 (SIB1) which is broadcast by the target cell.

Since the UE and network calculate the NR ShortMAC-I using the source RAT format (i.e. LTE) of the input variables, the source PCI and source RNTI are already in the correct format. However, the target Cell Identity will be 36 bits, whereas the VarShortMAC-I requires a Cell Identity of 28 bits.

To use the target NR Cell Identity as cell identity in the Var-ShortMAC-Input, the UE and network may truncate the NR Cell Identity to e.g. the 28 least significant bits (LSB). Naturally, any other predefined truncation or other mapping of the NR cell identity would work as well. Thus, the bit string may be shortened by truncation or mapping or by recalculation as previously described.

Since the UE calculates the integrity checksum using variables input from the source system, the source integrity protection algorithms are also used. If the target system supports the same integrity protection algorithms, the UE may also use the corresponding NR integrity protection algorithm.

2.6.1.1. Updates of TS 38.331

The procedures of section 5.3.13.3 in TS 38.331 may be extended so that if the source cell is an NR cell, the ShortMAC-I is calculated over the NR VarShortMAC-Input but if the source cell is an E-UTRA cell, the UE calculates the ShortMAC-I over the LTE VarShortMAC-Input as defined in TS 36.331 e.g.:

TS 36.331 5.3.7.4 Actions related to transmission of RRCReestablishmentRequest message
The UE shall set the contents of RRCReestablishmentRequest message as follows:
1> set the ue-Identity as follows:
   2> set the c-RNTI to the C-RNTI used in the source PCell (reconfiguration with sync or mobility from NR failure) or used in the PCell in which the trigger for the re-establishment occurred (other cases);
   2> set the physCellId to the physical cell identity of the source PCell (reconfiguration with sync or mobility from NR failure) or of the PCell in which the trigger for the re-establishment occurred (other cases);
   2> if the source cell is an NR cell:
      2> set the shortMAC-I to the 16 least significant bits of the MAC-I calculated:
         4> over the ASN.1 encoded as per section 8 (i.e., a multiple of 8 bits) VarShortMAC-Input;
         4> with the $KRR_{Cint}$ key and integrity protection algorithm that was used in the source PCell (reconfiguration with sync or mobility from NR failure) or of the PCell in which the trigger for the re-establishment occurred (other cases); and
         4> with all input bits for COUNT, BEARER and DIRECTION set to binary ones;
1> else (source cell is an E-UTRA cell):
   2> set the shortMAC-I to the 16 least significant bits of the MAC-I calculated:
      3> truncate the target cellIdentity to the 28 LSB and use as input to VarShortMAC-Input as defined in TS 36.331;
      3> over the ASN.1 encoded as per section 8 (i.e., a multiple of 8 bits) VarShortMAC-Input as defined in TS 36.331;
      3> with the E-UTRA $KRR_{Cint}$ key and NR integrity protection algorithm corresponding to the E-UTRA integrity protection algorithm that was used in the source PCell (reconfiguration with sync or mobility from NR failure) or of the PCell in which the trigger for the re-establishment occurred (other cases); and
      3> with all input bits for COUNT, BEARER and DIRECTION set to binary ones;
1> set the reestablishmentCause as follows:
   2> if the re-establishment procedure was initiated due to reconfiguration failure as specified in 5.3.5.8.2:
      3> set the reestablishmentCause to the value reconfigurationFailure;
   2> else if the re-establishment procedure was initiated due to reconfiguration with sync failure as specified in 5.3.5.8.3 (intra-NR handover failure) or 5.4.3.5 (inter-RAT mobility from NR failure):
      3> set the reestablishmentCause to the value handoverFailure;
   2> else:
      3> set the reestablishmentCause to the value otherFailure;
1> restore the RRC configuration and security context from the stored UE AS context;
1> restore the PDCP state and re-establish PDCP for SRB1;
1> re-establish RLC for SRB1;
1> resume SRB1;
1> The UE shall submit the RRCReestablishmentRequest message to lower layers for transmission.

2.6.1.2. Updates of TS 36.331

TS 36.331 5.3.7.3 Actions following cell selection while T311 is running
Upon selecting a suitable E-UTRA cell, the UE shall:
1> stop timer T311;
1> start timer T301;
1> apply the timeAlignmentTimerCommon included in SystemInformationBlockType2;
1> if the UE is a NB-IoT UE supporting RRC connection re-establishment for the Control Plane CIoT EPS optimisation and AS security has not been activated; and
1> if cp-reestablishment is not included in SystemInformationBlockType2-NB:
   2> perform the actions upon leaving RRC_CONNECTED as specified in 5.3.12, with release cause 'RRC connection failure';
1> else:
   2> initiate transmission of the RRCConnectionReestablishmentRequest message in accordance with 5.3.7.4;
NOTE: This procedure applies also if the UE returns to the source PCell.

Upon selecting an inter-RAT cell, the UE shall:
1> if the target cell is an NR cell and the previously configured integrity protection algorithms are available to configure in the target system:
   2> stop timer T311;
   2> start timer T301;
   2> apply the timeAlignmentTimerCommon included in SystemInformationBlockType2;
   2> initiate transmission of the RRCReestablishmentRequest message in accordance with TS 38.331 section 5.3.7.4;
1> else:
   2> if the selected cell is a UTRA cell, and if the UE supports Radio Link Failure Report for Inter-RAT MRO, include selectedUTRA-CellId in the VarRLF-Report and set it to the physical cell identity and carrier frequency of the selected UTRA cell;
   2> perform the actions upon leaving RRC_CONNECTED as specified in 5.3.12, with release cause 'RRC connection failure';

In addition, the VarShortMAC-Input must be updated to allow a truncated NR cellIdentity to be used as cellIdentity.

UE Variables

The UE variable VarShortMAC-Input specifies the input used to generate the security token ShortMAC-I. In case of inter-RAT RRC Reestablishment from E-UTRA to NR, the VarShortMAC-Input is used to generate the ShortMAC-I as specified in TS 38.331.

| VarShortMAC-Input UE variable | |
|---|---|
| -- ASN1START | |
| VarShortMAC-Input ::= | SEQUENCE { |
|   cellIdentity | CellIdentity, |
|   physCellId | PhysCellId, |
|   c-RNTI | C-RNTI |
| } | |
| -- ASN1STOP | |

| VarShortMAC-Input field descriptions |
| --- |
| cellIdentity<br>Set to CellIdentity included in cellIdentity (without suffix) in SIB1 of the current cell. If the source cell was an E-UTRA cell and the target cell is an NR cell, this field contain the 28 LSB of the target NR cell identity.<br>c-RNTI<br>Set to C-RNTI that the UE had in the PCell it was connected to prior to the failure.<br>physCellId<br>Set to the physical cell identity of the PCell the UE was connected to prior to the failure. |

Figure 12:
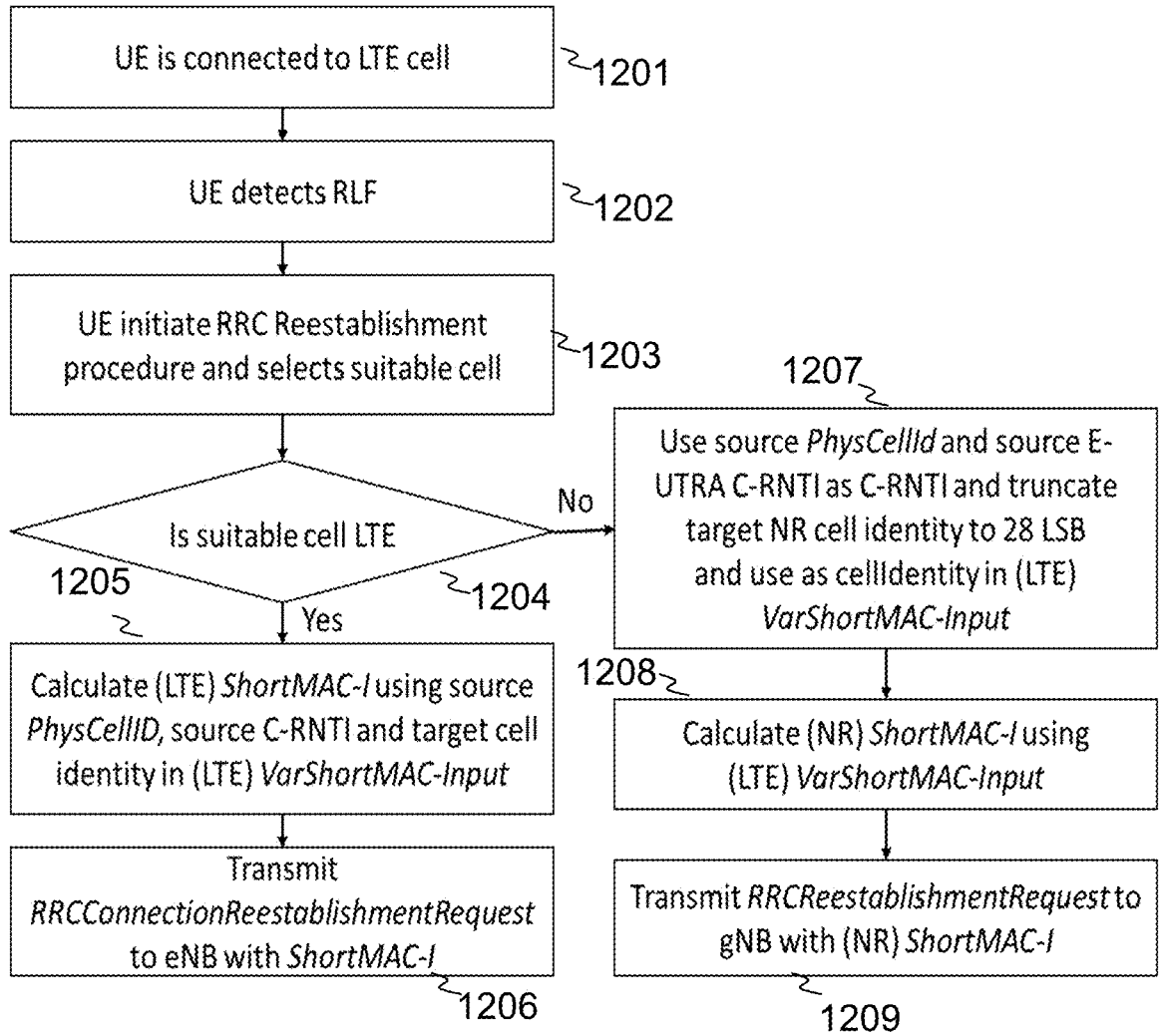
FIG. 12 is a flowchart depicting embodiments of methods in a wireless device connected in LTE detects a failure and re-establishes in LTE or NR, and when resuming in NR calculating an inter-RAT security token using LTE format and NR procedures.

FIG. 12 schematically illustrates an example diagram for how a UE, e.g. the wireless device 120, decides how to calculate the security checksum during inter-RAT or intra-RAT Reestablishment from LTE to LTE or NR. The diagram depicts one embodiment and should not be considered limiting to alternative solutions.

In Action 1201, the wireless device 120 is connected to a first cell 11 being an LTE cell, and in Action 1202, the wireless device 120 detects a RLF. In Action 1203 the wireless device 120 initiates an RRC reestablishment procedure and selects a suitable target cell, e.g. the second cell 12. In Action 1204, the wireless device 120 checks whether or not the target cell, i.e. the second cell 12, belongs to the same RAT as the source cell, i.e. the first cell 11. In other words, and in case the source cell is an LTE cell, the wireless device 120 checks whether or not the target cell is also an LTE cell.

In an intra-RAT procedure, i.e. when then the target cell is also an LTE cell, the wireless device 120 performs Actions 1205 and 1206. In Actions 1205, the wireless device 120 calculates the LTE security token, e.g. the ShortMAC-I, using the source PhysCellID, the source C-RNTI and the target cell identity in the LTE varShortMAC-Input. In Action 1206, the wireless device 120 transmits an RRCConnectionReestablishmentRequest to the network node, e.g. to the first radio network node 110 and/or to the second radio network node 112. The RRCConnectionReestablishmentRequest comprises the calculated security token.

In an inter-RAT procedure, i.e. when then the target cell is not in the same RAT as the source cell, e.g. when the source cell is an LTE cell and the target cell is a NR cell, the wireless device 120 performs Actions 1207, 1208, and 1209. In Action 1207, the wireless device 120 uses source PhysCellID, uses source E-UTRA C-RNTI as C-RNTI and truncates target NR cell identity to 28 LSB and use it as cellIdentity in LTE VarShortMAC-Input. In Action 1208, the wireless device 120 calculates the security token in NR, e.g. the NR ShortMAC-I, using the LTE VarShortMAC-Input. Thus, the wireless device 120 calculates the security token using LTE format and NR procedures. In Action 1209, the wireless device 120 transmits an RRCReestablishmentRequest to the network node, e.g. to the second radio network node 112. The RRCReestablishmentRequest comprises the calculated security token.

2.6.2. Failure in NR and Reestablishment in LTE: Calculate and Use NR ShortMAC-Input Using NR PCI and C-RNTI and LTE Cell Identity as Input to Calculate LTE ShortMAC-I If the UE is connected to an NR cell and detects failure and the attempts to reestablish the connection in an LTE cell, the UE and network would calculate the LTE ShortMAC-I (or similar) using the (NR) VarShortMAC-Input (or similar). The NR VarShortMAC-Input contain source PCI, source C-RNTI and target Cell identity'. The target Cell identity is obtained from the SystemInformationBlockType1 (SIB1) which is broadcast by the target cell.

Since the UE and network calculate the LTE ShortMAC-I using the source RAT format (i.e. NR) of the input variables, the source PCI and source RNTI are already in the correct format. However, the target Cell Identity will be 28 bits, whereas the VarShortMAC-Input requires a Cell Identity of 36 bits.

To use the target LTE Cell Identity as cell identity in the VarShortMAC-Input, the UE and network may e.g. concatenate the LTE Cell Identity with 8 leading binary '0's. Naturally, any other predefined 8 bit constant may be added to the 28 bit LTE cell identity. Alternatively, the added bits may be calculated based on some parameter (e.g. the 28 bit LTE cell identity).

Since the UE calculates the integrity checksum using inputs from the source system, the source integrity protection algorithms are also used. If the target system supports the same integrity protection algorithms, the UE may also use the corresponding LTE integrity protection algorithm.

2.6.2.1 Updates of TS 36.331

The procedures of section 5.3.7.4 in TS 36.331 may be extended to e.g.:

TS 36.331 5.3.7.4 Actions related to transmission of RRCConnectionReestablishmentRequest message Except for NB-IoT, if the procedure was initiated due to radio link failure or handover failure, the UE shall:

1> set the reestablishmentCellId in the VarRLF-Report to the global cell identity of the selected cell;

The UE shall set the contents of RRCConnectionReestablishmentRequest message as follows:

1> except for a NB-IoT UE for which AS security has not been activated, set the ue-Identity as follows:
2> set the c-RNTI to the C-RNTI used in the source PCell (handover and mobility from E-UTRA failure) or used in the PCell in which the trigger for the re-establishment occurred (other cases);
2> set the physCellId to the physical cell identity of the source PCell (handover and mobility from E-UTRA failure) or of the PCell in which the trigger for the re-establishment occurred (other cases);
2> if source cell is an E-UTRA cell:
3> set the shortMAC-I to the 16 least significant bits of the MAC-I calculated:
4> over the ASN.1 encoded as per section 8 (i.e., a multiple of 8 bits) VarShortMAC-Input (or VarShortMAC-Input-NB in NB-IoT);
4> with the $KRR_{Cint}$ key and integrity protection algorithm that was used in the source PCell (handover and mobility from E-UTRA failure) or of the PCell in which the trigger for the re-establishment occurred (other cases); and
4> with all input bits for COUNT, BEARER and DIRECTION set to binary ones;
2> else:
3> set the shortMAC-I to the 16 least significant bits of the MAC-I calculated:
4> prepend the target cellIdentity with 8 binary '0's and use as input to targetCellIdentity in the VarShortMAC-Input as defined in TS 38.331;
4> over the ASN.1 encoded as per section 8 (i.e., a multiple of 8 bits) VarShortMAC-Input as defined in TS 38.331;
4> with the NR $KRR_{Cint}$ key and E-UTRA integrity protection algorithm corresponding to the integrity protection algorithm that was used in the source PCell (handover and mobility from E-UTRA failure) or of the PCell in which the trigger for the re-establishment occurred (other cases); and 4> with all input bits for COUNT, BEARER and DIRECTION set to binary ones;

1> for a NB-IoT UE for which AS security has not been activated, set the ue-Identity as follows:

2> request upper layers for calculated ul-NAS-MAC and ul-NAS-Count using the cellIdentity of the PCell in which the trigger for the re-establishment occurred;

2> set the s-TMSI to the S-TMSI provided by upper layers;

2> set the ul-NAS-MAC to the ul-NAS-MAC value provided by upper layers;

2> set the ul-NAS-Count to the ul-NAS-Count value provided by upper layers;

1> set the reestablishmentCause as follows:

2> if the re-establishment procedure was initiated due to reconfiguration failure as specified in 5.3.5.5 (the UE is unable to comply with the reconfiguration):

3> set the reestablishmentCause to the value reconfigurationFailure;

2> else if the re-establishment procedure was initiated due to handover failure as specified in 5.3.5.6 (intra-LTE handover failure) or 5.4.3.5 (inter-RAT mobility from EUTRA failure):

3> set the reestablishmentCause to the value handoverFailure;

2> else:

3> set the reestablishmentCause to the value otherFailure;

1> if the UE is a NB-IoT UE:

2> if the UE supports DL channel quality reporting and cqi-Reporting is present in SystemInformationBlockType2-NB:

3> set the cqi-NPDCCH to include the latest results of the downlink channel quality measurements of the serving cell as specified in TS 36.133 [16];

NOTE: The downlink channel quality measurements may use measurement period T1 or T2, as defined in TS 36.133 [16]. In case period T2 is used the RRC-MAC interactions are left to UE implementation.

2> set earlyContentionResolution to TRUE;

The UE shall submit the RRCConnectionReestablishmentRequest message to lower layers for transmission.

2.6.2.2 Updates of TS 38.331

The procedures in TS 38.33 section 5.3.7.3 need to be updated to handle the case of inter-RAT reestablishment.

TS 38.331 5.3.7.3 Actions following cell selection while T311 is running

Upon selecting a suitable NR cell, the UE shall:

1> stop timer T311;
1> start timer T301;
1> apply the timeAlignmentTimerCommon included in SIB1;
1> initiate transmission of the RRCReestablishmentRequest message in accordance with 5.3.7.4;

NOTE: This procedure applies also if the UE returns to the source PCell.

Upon selecting an inter-RAT cell, the UE shall:

1> if the target cell is an E-UTRA cell and the previously configured integrity protection algorithms are available to configure in the target system:

2> stop timer T311;
2> start timer T301;
2> apply the timeAlignmentTimerCommon included in SIB1;
2> initiate transmission of the RRCConnectionReestablishmentRequest message in accordance with TS 36.331 section 5.3.7.4;

1> else:

2> perform the actions upon going to RRC_IDLE as specified in 5.3.11, with release cause 'RRC connection failure';

The definition of VarShortMAC-Input need to be updated to allow using a padded LTE CellIdentity as targetCellIdentity in NR VarShortMAC-Input The UE variable VarShortMAC-Input specifies the input used to generate the shortMAC-I.

| VarShortMAC-Input UE variable |
| --- |
| -- ASN1START |
| VarShortMAC-Input ::=         SEQUENCE { |
|    cellIdentity                        CellIdentity, |
|    physCellId                          PhysCellId, |
|    c-RNTI                              C-RNTI |
| } |
| -- ASN1STOP |

| VarShortMAC-Input field descriptions |
| --- |
| cellIdentity |
| Set to CellIdentity included in cellIdentity (without suffix) in SIB1 of the current cell. If the source cell was an NR cell and the target cell is an E-UTRA cell, the 8 MSB of this field are set to '0' and the 28 LSB contain the target E-UTRA cell identity. |
| c-RNTI |
| Set to C-RNTI that the UE had in the PCell it was connected to prior to the failure. |
| physCellId |
| Set to the physical cell identity of the PCell the UE was connected to prior to the failure. |

Figure 13:
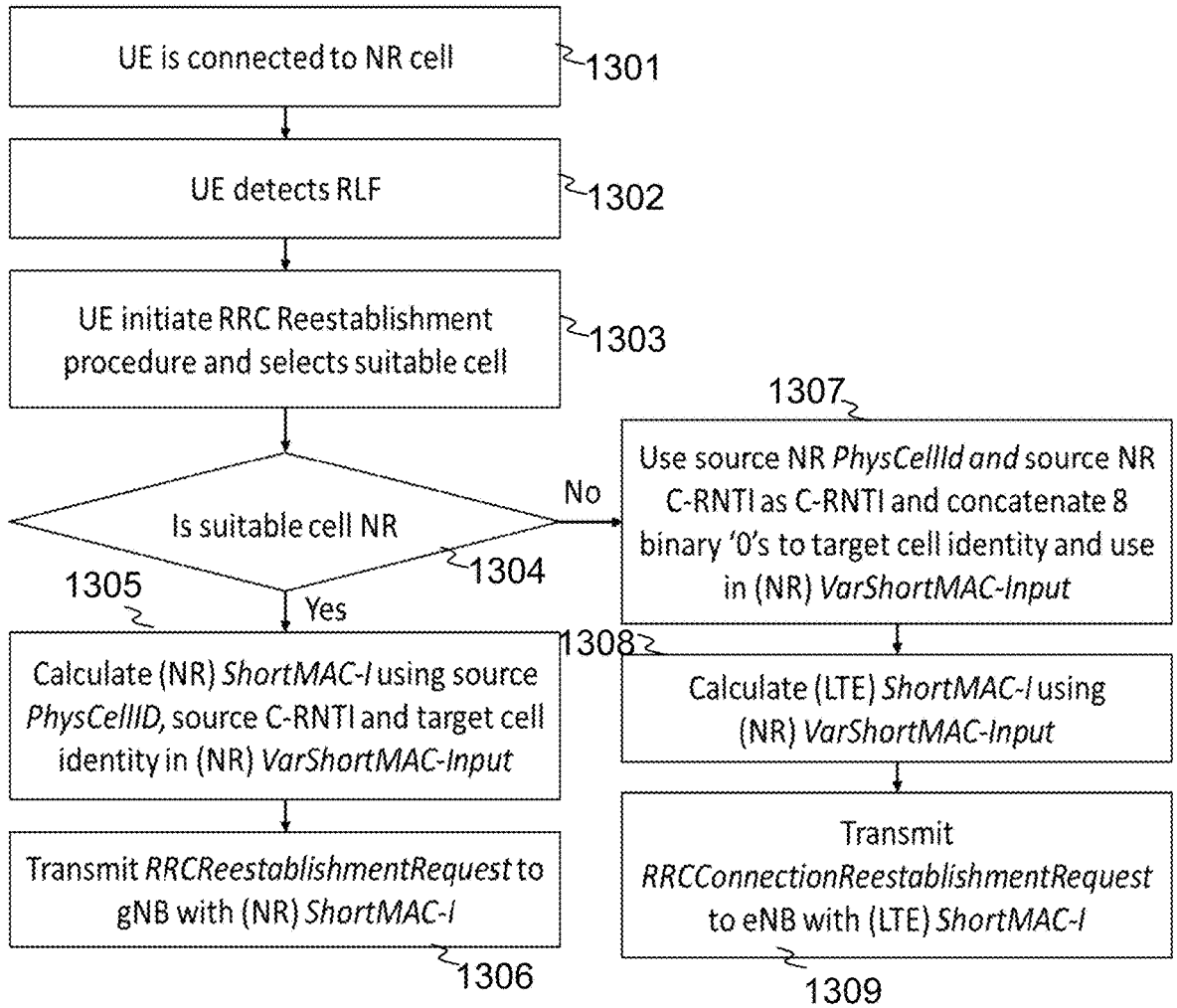
FIG. 13 is a flowchart depicting embodiments of methods in a wireless device connected in NR that detects a failure and re-establishes in LTE or NR, and when resuming in LTE calculating an inter-RAT security token using NR format and LTE procedures.

FIG. 13 schematically illustrates an example diagram for how a UE, e.g. the wireless device 120, decides how to calculate the security checksum during inter-RAT or intra-RAT Reestablishment from NR to NR or LTE. The diagram depicts one embodiment and should not be considered limiting to alternative solutions.

In Action 1301, the wireless device 120 is connected to a first cell 11 being a NR cell, and in Action 1302, the wireless device 120 detects a RLF. In Action 1303 the wireless device 120 initiates an RRC reestablishment procedure and selects a suitable target cell, e.g. the second cell 12. In Action 1304, the wireless device 120 checks whether or not the target cell, i.e. the second cell 12, belongs to the same RAT as the source cell, i.e. the first cell 11. In other words, and in case the source cell is a NR cell, the wireless device 120 checks whether or not the target cell is also a NR cell.

In an intra-RAT procedure, i.e. when then the target cell is also a NR cell, the wireless device 120 performs Actions 1305 and 1306. In Action 1305, the wireless device 120 calculates the NR security token, e.g. the ShortMAC-I, using the source PhysCellID, the source C-RNTI and the target cell identity in the NR varShortMAC-Input. In Action 1306, the wireless device 120 transmits an RRCReestablishmentRequest to the network node, e.g. to the first radio network node 110 and/or to the second radio network node 112. The RRCReestablishmentRequest comprises the calculated security token.

In an inter-RAT procedure, i.e. when then the target cell is not in the same RAT as the source cell, e.g. when the source cell is a NR cell and the target cell is an LTE cell, the wireless device 120 performs Actions 1307, 1308, and 1309. In Action 1307, the wireless device 120 uses NR PhysCellID and source C-RNTI, and concatenates 8 binary '0's to target cell identity and use in NR VarShortMAC-Input. In Action 1308, the wireless device 120 calculates the security token in LTE, e.g. the LTE ShortMAC-I, using the NR VarShortMAC-Input. Thus, the wireless device 120 calculates the security token using NR format and LTE procedures. In Action 1309, the wireless device 120 transmits an RRCConnectionReestablishmentRequest to the network node, e.g. to the second radio network node 112. The RRCConnectionReestablishmentRequest comprises the calculated security token.

2.7. Some Third Exemplifying Embodiments: Create New IE and Update Procedures for RRC Reestablishment In some embodiments, the LTE and NR specifications are extended to introduce new IEs used to calculate the security token ShortMAC-I and update the procedures accordingly. In all of these embodiments, the same principle as in some first and second exemplifying embodiments may be applied, i.e. the procedures and ASN.1 definition are defined in the target RAT specification (as in some first exemplifying embodiments), or the procedures are defined in the target RAT specification and the ASN.1 definition is defined in the source RAT specification (as some second exemplifying embodiments).

2.7.1. Solution 3.1: Define New IE (e.g. VarinterRAT-ShortMAC-Input) in Target RAT and Define Procedures to Calculate Security Token in Target RAT 2.7.1.1. Failure in LTE and Reestablishment in NR:

If the UE is connected to an LTE cell and detects failure and attempts to reestablish in an NR cell, the UE and network could calculate the Reestablishment ShortMAC-I using the source C-RNTI and source PCI (i.e. LTE) along with the target Cell identity (i.e. NR) in a newly defined IE.

The embodiments described here use the IE name VarInterRAT-ShortMAC-Input as an example, but the solution would work equally well with another parameter name.

2.7.1.1.1. Updates of TS 36.331

TS 36.331 5.3.7.3 Actions following cell selection while T311 is running

Upon selecting a suitable E-UTRA cell, the UE shall:
1> stop timer T311;
1> start timer T301;
1> apply the timeAlignmentTimerCommon included in SystemInformationBlockType2;
1> if the UE is a NB-IoT UE supporting RRC connection re-establishment for the Control Plane CIoT EPS optimisation and AS security has not been activated; and
1> if cp-reestablishment is not included in SystemInformationBlockType2-NB:
  2> perform the actions upon leaving RRC_CONNECTED as specified in 5.3.12, with release cause 'RRC connection failure';
1> else:
  2> initiate transmission of the RRCConnectionReestablishmentRequest message in accordance with 5.3.7.4;
NOTE: This procedure applies also if the UE returns to the source PCell.

Upon selecting an inter-RAT cell, the UE shall:
1> if the target cell is an NR cell and the previously configured integrity protection algorithms are available to configure in the target system:
  2> stop timer T311;
  2> start timer T301;
  2> apply the timeAlignmentTimerCommon included in SystemInformationBlockType2;
  2> initiate transmission of the RRCReestablishmentRequest message in accordance with TS 38.331 section 5.3.7.4;
1> else:
  2> if the selected cell is a UTRA cell, and if the UE supports Radio Link Failure Report for Inter-RAT MRO, include selectedUTRA-CellId in the VarRLF-Report and set it to the physical cell identity and carrier frequency of the selected UTRA cell;
  2> perform the actions upon leaving RRC_CONNECTED as specified in 5.3.12, with release cause 'RRC connection failure';

2.7.1.1.2. Updates of TS 38.331

VarinterRAT-ShortMAC-Input

The UE variable VarinterRAT-ShortMAC-Input specifies the input used to generate the ShortMAC-I during inter-RAT RRC Connection Reestablishment procedure when the UE was experienced failure in E-UTRA.

```
-- ASN1START
-- TAG-VAR-INTER-RAT-SHORT-MAC-INPUT-START
VarInterRAT-ShortMAC-Input ::=     SEQUENCE {
    sourcePhysCellId               EUTRA-PhysCellId,
    targetCellIdentity             CellIdentity,
    source-C-RNTI                  BIT STRING (SIZE (16))
}
-- TAG-VAR-INTER-RAT-SHORT-MAC-INPUT-STOP
-- ASN1STOP
```

| VarInterRAT-ShortMAC-Input field descriptions |
| --- |
| targetCellIdentity |
| Set to CellIdentity of the target cell i.e. the cell the UE is trying to reestablish the connection. |
| source-C-RNTI |
| Set to E-UTRA C-RNTI that the UE had in the PCell it was connected to prior to suspension of the RRC connection. |
| sourcePhysCellId |
| Set to the E-UTRA physical cell identity of the PCell the UE was connected to prior to suspension of the RRC connection. |

The procedures in TS 38.331 may be updated to e.g.:
TS 38.331 5.3.7.4 Actions related to transmission of RRCReestablishmentRequest message
The UE shall set the contents of RRCReestablishmentRequest message as follows:
1> set the ue-Identity as follows:
  2> set the c-RNTI to the C-RNTI used in the source PCell (reconfiguration with sync or mobility from NR failure) or used in the PCell in which the trigger for the re-establishment occurred (other cases);
  2> set the physCellId to the physical cell identity of the source PCell (reconfiguration with sync or mobility from NR failure) or of the PCell in which the trigger for the re-establishment occurred (other cases);
  2> if the source cell is an NR cell:
    2> set the shortMAC-I to the 16 least significant bits of the MAC-I calculated:
      4> over the ASN.1 encoded as per section 8 (i.e., a multiple of 8 bits) VarShortMAC-Input;

4> with the KRR$_{Cint}$ key and integrity protection algorithm that was used in the source PCell (reconfiguration with sync or mobility from NR failure) or of the PCell in which the trigger for the re-establishment occurred (other cases); and 4> with all input bits for COUNT, BEARER and DIRECTION set to binary ones;

1> else (source cell is an E-UTRA cell):

2> set the shortMAC-I to the 16 least significant bits of the MAC-I calculated:

3> over the ASN.1 encoded as per section 8 (i.e., a multiple of 8 bits) VarInterRAT-ShortMAC-Input;

3> with the previously configured E-UTRA KRR$_{Cint}$ key and the NR integrity protection algorithms corresponding to the previously configured integrity protection algorithm; and 3> with all input bits for COUNT, BEARER and DIRECTION set to binary ones;

1> set the reestablishmentCause as follows:

2> if the re-establishment procedure was initiated due to reconfiguration failure as specified in 5.3.5.8.2:

3> set the reestablishmentCause to the value reconfigurationFailure;

2> else if the re-establishment procedure was initiated due to reconfiguration with sync failure as specified in 5.3.5.8.3 (intra-NR handover failure) or 5.4.3.5 (inter-RAT mobility from NR failure):

3> set the reestablishmentCause to the value handoverFailure;

2> else:

3> set the reestablishmentCause to the value otherFailure;

1> restore the RRC configuration and security context from the stored UE AS context;

1> restore the PDCP state and re-establish PDCP for SRB1;

1> re-establish RLC for SRB1;

1> resume SRB1;

1> The UE shall submit the RRCReestablishmentRequest message to lower layers for transmission.

Figure 14:
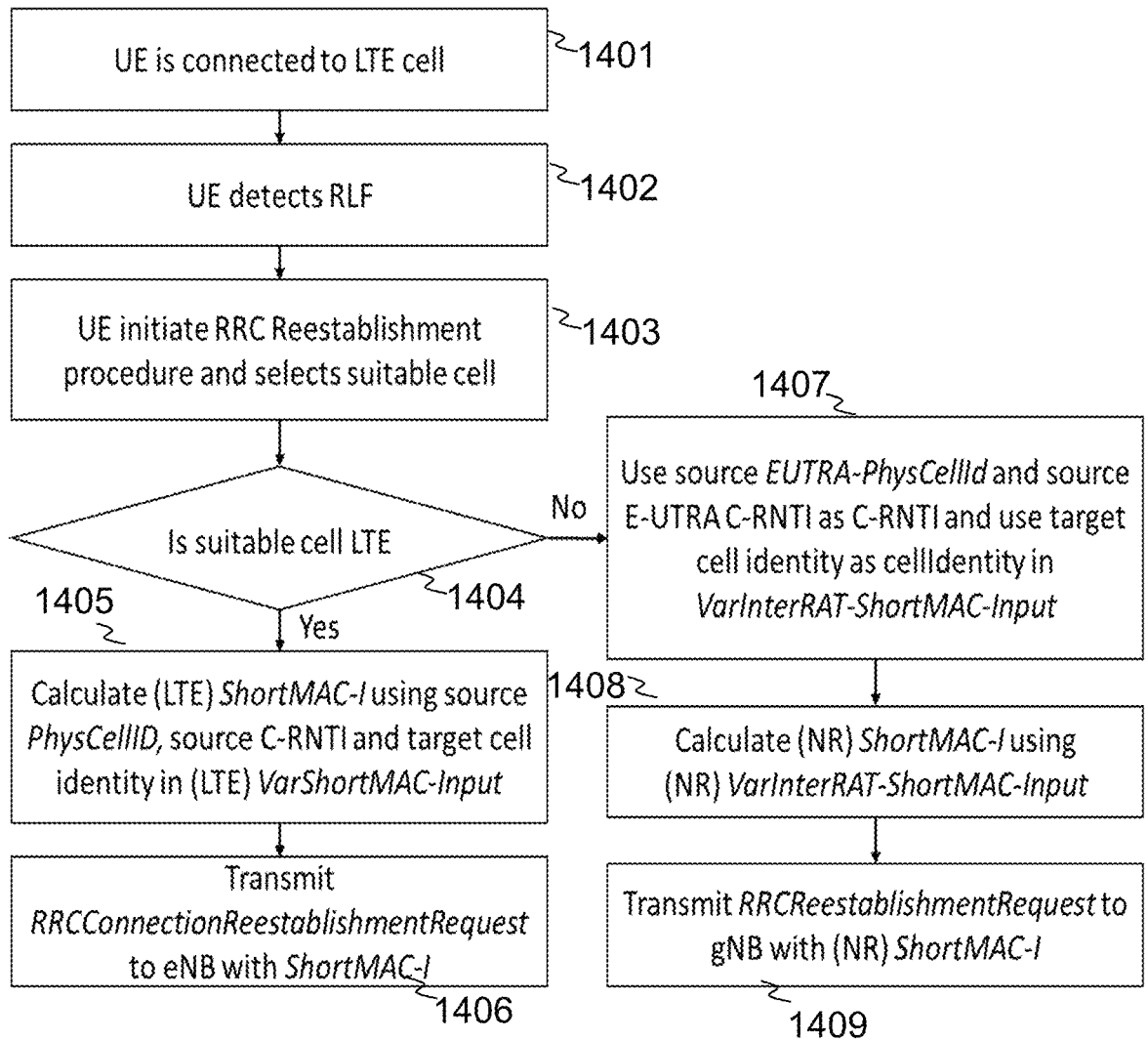
FIG. 14 is a flowchart depicting embodiments of methods in a wireless device connected in LTE that detects a failure and re-establishes LTE or NR, and when resuming in NR calculating an inter-RAT security token using a new Information Element (IE) defined in NR format and using NR procedures.

FIG. 14 schematically illustrates an example diagram of how the procedure may be done. In FIG. 14 actions performed by the wireless device 120 being connected to an LTE cell and when detecting failure are shown. In this example, the wireless device 120 initiates RRC Reestablishment towards LTE or NR. Further, the wireless device 120 calculates the inter-RAT integrity checksum using a new IE defined in NR format and use NR procedures.

In Action 1401, the wireless device 120 is connected to a first cell 11 being an LTE cell, and in Action 1402, the wireless device 120 detects an RLF. In Action 1403 the wireless device 120 initiates an RRC reestablishment procedure and selects a suitable target cell, e.g. the second cell 12. In Action 1404, the wireless device 120 checks whether or not the target cell, i.e. the second cell 12, belongs to the same RAT as the source cell, i.e. the first cell 11. In other words, and in case the source cell is an LTE cell, the wireless device 120 checks whether or not the target cell is also an LTE cell.

In an intra-RAT procedure, i.e. when then the target cell is also an LTE cell, the wireless device 120 performs Actions 1405 and 1406. In Actions 1405, the wireless device 120 calculates the LTE security token, e.g. the ShortMAC-I, using the source PhysCellID, the source C-RNTI and the target cell identity in the LTE varShortMAC-Input. In Action 1406, the wireless device 120 transmits an RRCConnectionReestablishmentRequest to the network node, e.g. to the first radio network node 110 and/or to the second radio network node 112. The RRCConnectionReestablishmentRequest comprises the calculated security token.

In an inter-RAT procedure, i.e. when then the target cell is not in the same RAT as the source cell, e.g. when the source cell is an LTE cell and the target cell is a NR cell, the wireless device 120 performs Actions 1407, 1408, and 1409. In Action 1407, the wireless device 120 uses source E-UTRA-PhysCellID, source E-UTRA C-RNTI, and target cell identity in NR VarInter-RAT-ShortMAC-Input. In Action 1408, the wireless device 120 calculates the security token in NR, e.g. the NR ShortMAC-I, using the NR VarInter-RAT-ShortMAC-Input. Thus, the wireless device 120 calculates the security token using NR format and NR procedures. In Action 1409, the wireless device 120 transmits an RRCReestablishmentRequest to the network node, e.g. to the second radio network node 112. The RRCReestablishmentRequest comprises the calculated security token.

2.7.1.2. Failure in NR and Reestablishment in LTE

If the UE is connected to an NR cell and detects failure and attempts to reestablish in LTE, the UE and network could calculate the Reestablishment ShortMAC-I using the source C-RNTI and source PCI along with the target Cell identity.

2.7.1.2.1. Updates of TS 38.331

The procedures in section 5.3.7.3 need to be updated to handle the case of inter-RAT reestablishment.

TS 38.331 5.3.7.3 Actions following cell selection while T311 is running

Upon selecting a suitable NR cell, the UE shall:

1> stop timer T311;

1> start timer T301;

1> apply the timeAlignmentTimerCommon included in SIB1;

1> initiate transmission of the RRCReestablishmentRequest message in accordance with 5.3.7.4; NOTE: This procedure applies also if the UE returns to the source PCell.

Upon selecting an inter-RAT cell, the UE shall:

1> if the target cell is an E-UTRA cell and the previously configured integrity protection algorithms are available to configure in the target system:

2> stop timer T311;

2> start timer T301;

2> apply the timeAlignmentTimerCommon included in SIB1;

2> initiate transmission of the RRCConnectionReestablishmentRequest message in accordance with TS 36.331 section 5.3.7.4;

1> else:

2> perform the actions upon going to RRC_IDLE as specified in 5.3.11, with release cause 'RRC connection failure';

2.7.1.2.1. Updates of TS 36.331

VarInterRAT-ShortMAC-Input

The UE variable VarinterRAT-ShortMAC-Input specifies the input used to generate the ShortMAC-I during inter-RAT RRC Connection Reestablishment procedure when the UE experienced failure in NR.

```
-- ASN1START
-- TAG-VAR-INTER-RAT-SHORT-MAC-INPUT-START
VarInterRAT-ShortMAC-Input ::=    SEQUENCE {
    sourcePhysCellId              EUTRA-PhysCellId,
    targetCellIdentity            CellIdentity,
    source-C-RNTI                 BIT STRING (SIZE (16))
```

-continued

```
}
-- TAG-VAR-INTER-RAT-SHORT-MAC-INPUT-STOP
-- ASN1STOP
```

| VarInterRAT-ShortMAC-Input field descriptions |
| --- |
| targetCellIdentity<br>Set to CellIdentity of the target cell i.e. the cell the UE is trying to reestablish the connection.<br>source-C-RNTI<br>Set to NR C-RNTI that the UE had in the PCell it was connected to prior to suspension of the RRC connection.<br>sourcePhysCellId<br>Set to the NR physical cell identity of the PCell the UE was connected to prior to suspension of the RRC connection. |

The procedures of section 5.3.7.4 in TS 36.331 may be extended to e.g.:
TS 36.331 5.3.7.4 Actions related to transmission of RRCConnectionReestablishmentRequest message
Except for NB-IoT, if the procedure was initiated due to radio link failure or handover failure, the UE shall:
1> set the reestablishmentCellId in the VarRLF-Report to the global cell identity of the selected cell;
The UE shall set the contents of RRCConnectionReestablishmentRequest message as follows:
1> except for a NB-IoT UE for which AS security has not been activated, set the ue-Identity as follows:
2> set the c-RNTI to the C-RNTI used in the source PCell (handover and mobility from E-UTRA failure) or used in the PCell in which the trigger for the re-establishment occurred (other cases);
2> set the physCellId to the physical cell identity of the source PCell (handover and mobility from E-UTRA failure) or of the PCell in which the trigger for the re-establishment occurred (other cases);
2> if source cell is an E-UTRA cell:
3> set the shortMAC-I to the 16 least significant bits of the MAC-I calculated:
4> over the ASN.1 encoded as per section 8 (i.e., a multiple of 8 bits) VarShortMAC-Input (or VarShortMAC-Input-NB in NB-IoT);
4> with the $KRR_{Cint}$ key and integrity protection algorithm that was used in the source PCell (handover and mobility from E-UTRA failure) or of the PCell in which the trigger for the re-establishment occurred (other cases); and
4> with all input bits for COUNT, BEARER and DIRECTION set to binary ones;
2> else:
3> set the shortMAC-I to the 16 least significant bits of the MAC-I calculated:
4> over the ASN.1 encoded as per section 8 (i.e., a multiple of 8 bits) VarinterRAT-ShortMAC-Input;
4> with the previously configured $KRR_{Cint}$ key and the E-UTRA integrity protection algorithms corresponding to the previously configured integrity protection algorithm; and
4> with all input bits for COUNT, BEARER and DIRECTION set to binary ones;
1> for a NB-IoT UE for which AS security has not been activated, set the ue-Identity as follows:
2> request upper layers for calculated ul-NAS-MAC and ul-NAS-Count using the cellIdentity of the PCell in which the trigger for the re-establishment occurred;
2> set the s-TMSI to the S-TMSI provided by upper layers;
2> set the ul-NAS-MAC to the ul-NAS-MAC value provided by upper layers;
2> set the ul-NAS-Count to the ul-NAS-Count value provided by upper layers;
1> set the reestablishmentCause as follows:
2> if the re-establishment procedure was initiated due to reconfiguration failure as specified in 5.3.5.5 (the UE is unable to comply with the reconfiguration):
3> set the reestablishmentCause to the value reconfigurationFailure;
2> else if the re-establishment procedure was initiated due to handover failure as specified in 5.3.5.6 (intra-LTE handover failure) or 5.4.3.5 (inter-RAT mobility from EUTRA failure):
3> set the reestablishmentCause to the value handoverFailure;
2> else:
3> set the reestablishmentCause to the value otherFailure;
1> if the UE is a NB-IoT UE:
2> if the UE supports DL channel quality reporting and cqi-Reporting is present in SystemInformationBlockType2-NB:
3> set the cqi-NPDCCH to include the latest results of the downlink channel quality measurements of the serving cell as specified in TS 36.133 [16];
NOTE: The downlink channel quality measurements may use measurement period T1 or T2, as defined in TS 36.133 [16]. In case period T2 is used the RRC-MAC interactions are left to UE implementation.
2> set earlyContentionResolution to TRUE;
The UE shall submit the RRCConnectionReestablishmentRequest message to lower layers for transmission.

Figure 15:
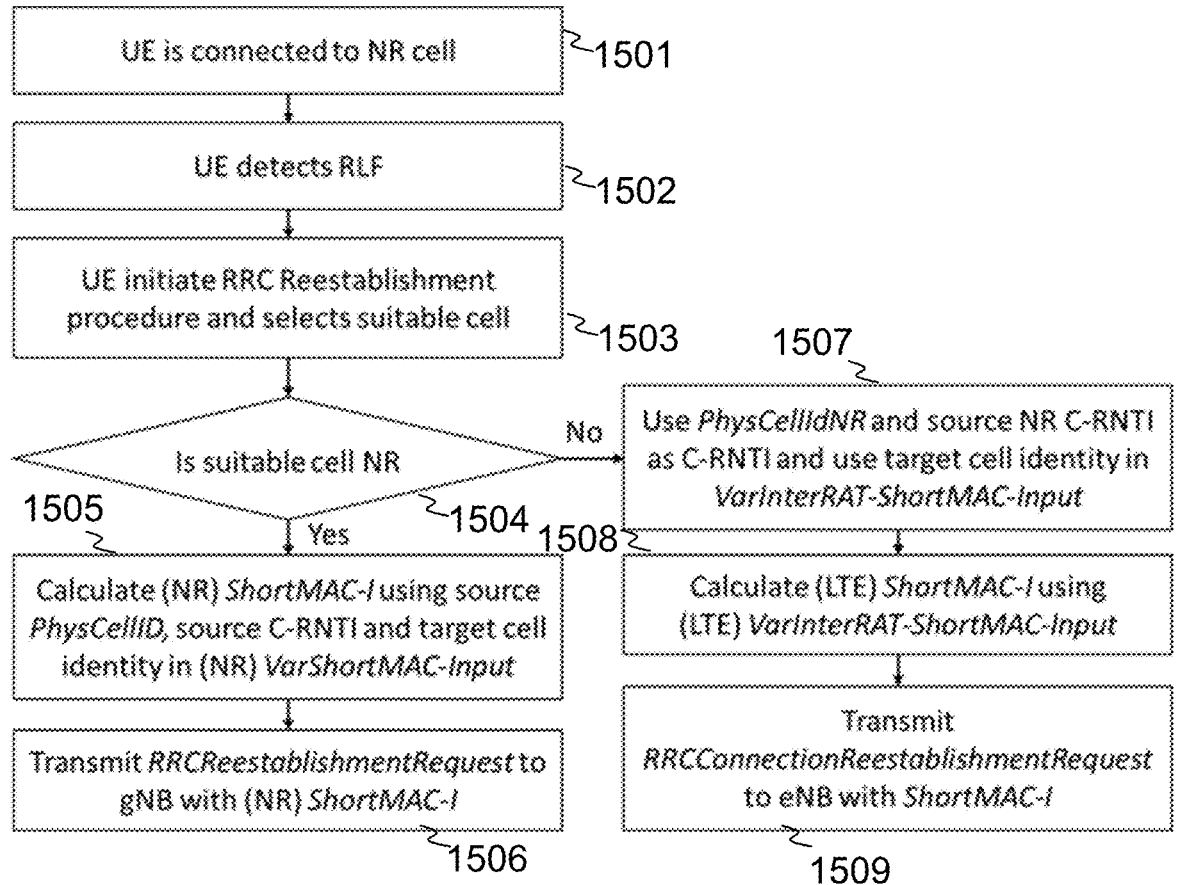
FIG. 15 is a flowchart depicting embodiments of methods in a wireless device connected in NR that detects a failure and re-establishes NR or LTE, and when resuming in LTE calculating an inter-RAT security token using a new Information Element (IE) defined in LTE format and using LTE procedures.

FIG. 15 schematically illustrates an example diagram of how the procedure may be done. In FIG. 15 actions performed by the wireless device 120 being connected to a NR cell and when detecting failure are shown. In this example, the wireless device 120 initiates RRC Reestablishment towards LTE or NR. Further, the wireless device 120 calculates the inter-RAT integrity checksum using a new IE defined in LTE format and use LTE procedures.

In Action 1501, the wireless device 120 is connected to a first cell 11 being a NR cell, and in Action 1502, the wireless device 120 detects an RLF. In Action 1503 the wireless device 120 initiates an RRC reestablishment procedure and selects a suitable target cell, e.g. the second cell 12. In Action 1504, the wireless device 120 checks whether or not the target cell, i.e. the second cell 12, belongs to the same RAT as the source cell, i.e. the first cell 11. In other words, and in case the source cell is a NR cell, the wireless device 120 checks whether or not the target cell is also a NR cell.

In an intra-RAT procedure, i.e. when then the target cell is also a NR cell, the wireless device 120 performs Actions 1505 and 1506. In Actions 1505, the wireless device 120 calculates the NR security token, e.g. the ShortMAC-I, using the source PhysCellID, the source C-RNTI and the target cell identity in the NR varShortMAC-Input.

In Action 1506, the wireless device 120 transmits an RRCReestablishmentRequest to the network node, e.g. to the first radio network node 110 and/or to the second radio network node 112. The RRCReestablishmentRequest comprises the calculated security token.

In an inter-RAT procedure, i.e. when then the target cell is not in the same RAT as the source cell, e.g. when the source cell is a NR cell and the target cell is an LTE cell, the wireless device 120 performs Actions 1507, 1508, and 1509. In Action 1507, the wireless device 120 uses PhysCellID, uses source NR C-RNTI as C-RNTI, and uses target cell identity in LTE VarInter-RAT-ShortMAC-Input. In Action 1508, the wireless device 120 calculates the security token in LTE, e.g. the LTE ShortMAC-I, using the LTE VarInter-RAT-ShortMAC-Input. Thus, the wireless device 120 calculates the security token using LTE format and LTE procedures. In Action 1509, the wireless device 120 transmits an RRCConnectionReestablishmentRequest to the network node, e.g. to the second radio network node 112. The RRCConnectionReestablishmentRequest comprises the calculated security token.

2.7.2 Solution 3.2: Define New IE (e.g. VarinterRAT-ShortMAC-Input) in Source RAT and Define Procedures to Calculate Security Token in Target RAT 2.7.2.1. Failure in LTE and Reestablishment in NR:

If the UE is connected to an LTE cell and detects failure and attempts to reestablish to an NR cell, the UE and network could calculate the Reestablishment ShortMAC-I using the source (LTE) C-RNTI and source (LTE) PCI along with the target (NR) Cell identity in a newly defined IE. The IE would be defined in LTE, but the procedures would be defined in NR.

Note: the parameter names are suffixed with an "-rxx" to indicate which release of the specification they are introduced. Whatever the suffix may be, this will not change the solutions described.

2.7.2.1.1. Updates of TS 36.331

TS 36.331 5.3.7.3 Actions following cell selection while T311 is running

Upon selecting a suitable E-UTRA cell, the UE shall:
1> stop timer T311;
1> start timer T301;
1> apply the timeAlignmentTimerCommon included in SystemInformationBlockType2;
1> if the UE is a NB-IoT UE supporting RRC connection re-establishment for the Control Plane CIoT EPS optimisation and AS security has not been activated; and
1> if cp-reestablishment is not included in SystemInformationBlockType2-NB:
  2> perform the actions upon leaving RRC_CONNECTED as specified in 5.3.12, with release cause 'RRC connection failure';
1> else:
  2> initiate transmission of the RRCConnectionReestablishmentRequest message in accordance with 5.3.7.4;
NOTE: This procedure applies also if the UE returns to the source PCell.
Upon selecting an inter-RAT cell, the UE shall:
1> if the target cell is an NR cell and the previously configured integrity protection algorithms are available to configure in the target system:
  2> stop timer T311;
  2> start timer T301;
  2> apply the timeAlignmentTimerCommon included in SystemInformationBlockType2;
  2> initiate transmission of the RRCReestablishmentRequest message in accordance with TS 38.331 section 5.3.7.4;
1> else:
  2> if the selected cell is a UTRA cell, and if the UE supports Radio Link Failure Report for Inter-RAT MRO, include selectedUTRA-CellId in the VarRLF-Report and set it to the physical cell identity and carrier frequency of the selected UTRA cell;
  2> perform the actions upon leaving RRC_CONNECTED as specified in 5.3.12, with release cause 'RRC connection failure';

VarinterRAT-ShortMAC-Input

The UE variable VarinterRAT-ShortMAC-Input specifies the input used to generate the ShortMAC-I in NR during inter-RAT RRC Connection Reestablishment procedure when the UE experienced failure in E-UTRA and reestablishes in NR.

```
-- ASN1START
-- TAG-VAR-INTER-RAT-SHORT-MAC-INPUT-START
VarInterRAT-ShortMAC-Input ::=    SEQUENCE 1
    eutra-phys-CellId-rxx         PhysCellId,
    nr-CellIdentity-rxx           BIT STRING (SIZE (36)),
    nr-C-RNTI-rxx                 C-RNTI
}
-- TAG-VAR-INTER-RAT-SHORT-MAC-INPUT-STOP
-- ASN1STOP
```

VarInterRAT-ShortMAC-Input field descriptions nr-CellIdentity
This field contain the NR CellIdentity of the target NR cell i.e. the cell to which the UE is trying to reestablish the connection.
nr-C-RNTI
Set to E-UTRA C-RNTI that the UE had in the PCell it was connected to prior to the failure.
eutra-PhysCellId
Set to the E-UTRA physical cell identity of the PCell the UE was connected to prior to the failure.

2.7.2.1.2. Updates of TS 38.331

TS 38.331 5.3.7.4 Actions related to transmission of RRCReestablishmentRequest message The UE shall set the contents of RRCReestablishmentRequest message as follows:
1> set the ue-Identity as follows:
  2> set the c-RNTI to the C-RNTI used in the source PCell (reconfiguration with sync or mobility from NR failure) or used in the PCell in which the trigger for the re-establishment occurred (other cases);
  2> set the physCellId to the physical cell identity of the source PCell (reconfiguration with sync or mobility from NR failure) or of the PCell in which the trigger for the re-establishment occurred (other cases);
  2> if the source cell is an NR cell:
    2> set the shortMAC-I to the 16 least significant bits of the MAC-I calculated:
      4> over the ASN.1 encoded as per section 8 (i.e., a multiple of 8 bits) VarShortMAC-Input;
      4> with the $KRR_{Cint}$ key and integrity protection algorithm that was used in the source PCell (reconfiguration with sync or mobility from NR failure) or of the PCell in which the trigger for the re-establishment occurred (other cases); and
      4> with all input bits for COUNT, BEARER and DIRECTION set to binary ones;
  1> else (source cell is an E-UTRA cell):
    2> set the shortMAC-I to the 16 least significant bits of the MAC-I calculated:
      3> over the ASN.1 encoded as per section 8 (i.e., a multiple of 8 bits) VarinterRAT-ShortMAC-Input as defined in TS 36.331;
      3> with the previously configured E-UTRA $KRR_{Cint}$ key and the NR integrity protection algorithms corresponding to the previously configured integrity protection algorithm; and
 3> with all input bits for COUNT, BEARER and DIRECTION set to binary ones;
1> set the reestablishmentCause as follows:
 2> if the re-establishment procedure was initiated due to reconfiguration failure as specified in 5.3.5.8.2:
  3> set the reestablishmentCause to the value reconfigurationFailure;
 2> else if the re-establishment procedure was initiated due to reconfiguration with sync failure as specified in 5.3.5.8.3 (intra-NR handover failure) or 5.4.3.5 (inter-RAT mobility from NR failure):
  3> set the reestablishmentCause to the value handoverFailure;
 2> else:
  3> set the reestablishmentCause to the value otherFailure;
1> restore the RRC configuration and security context from the stored UE AS context;
1> restore the PDCP state and re-establish PDCP for SRB1;
1> re-establish RLC for SRB1;
1> resume SRB1;
1> The UE shall submit the RRCReestablishmentRequest message to lower layers for transmission.

Figure 16:
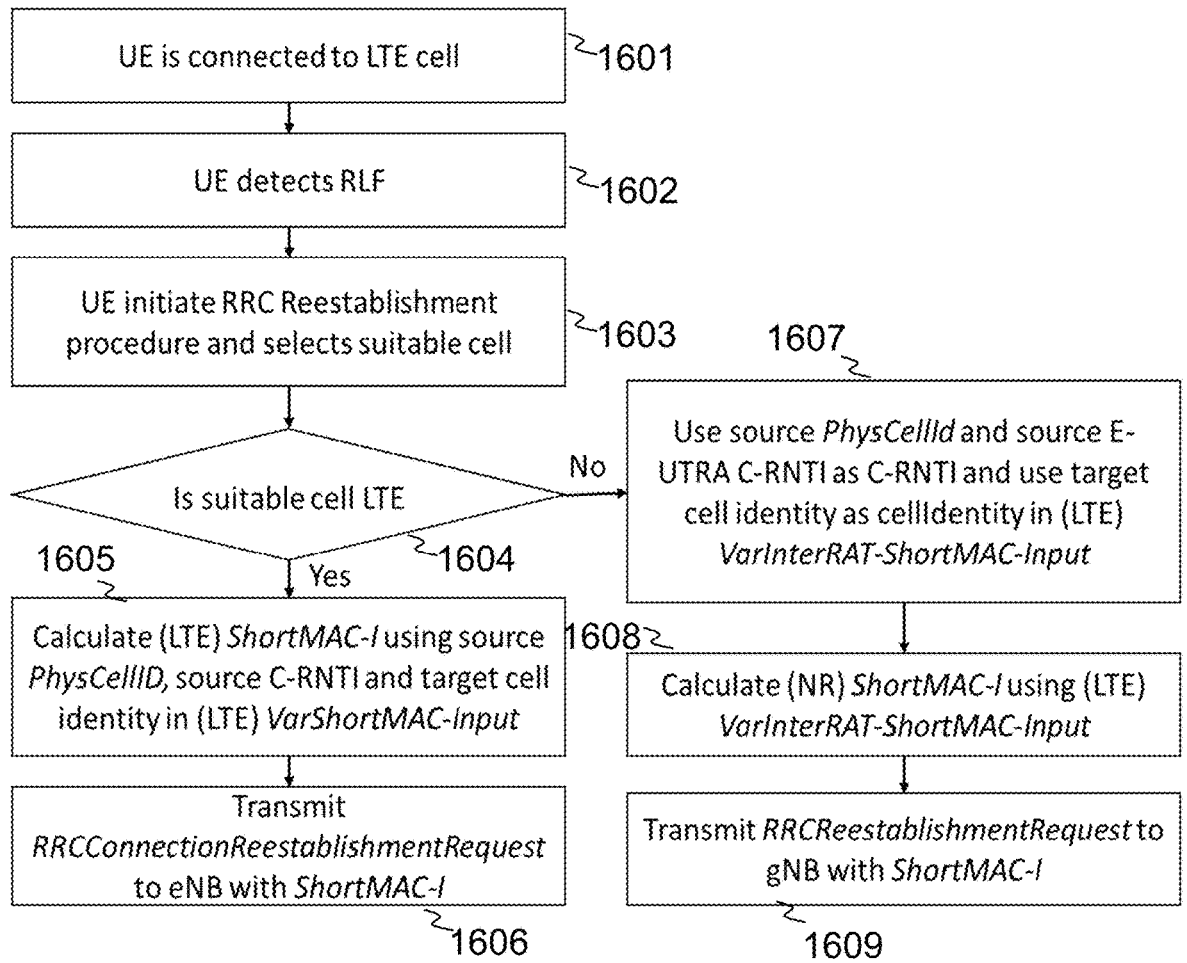
FIG. 16 is a flowchart depicting embodiments of methods in a wireless device connected in LTE that detects a failure and re-establishes in LTE or NR, and when resuming in NR calculating an inter-RAT security token using a new Information Element (IE) defined in LTE format and using NR procedures.

FIG. 16 schematically illustrates an example diagram of how the procedure may be done. In FIG. 16 actions performed by the wireless device 120 being connected to an LTE cell and when detecting a failure are shown. In this example, the wireless device 120 initiates RRC Reestablishment towards LTE or NR. Further, the wireless device 120 calculates the inter-RAT integrity checksum using a new IE defined in LTE format and use NR procedures.

In Action 1601, the wireless device 120 is connected to a first cell 11 being an LTE cell, and in Action 1602, the wireless device 120 detects an RLF. In Action 1603 the wireless device 120 initiates an RRC reestablishment procedure and selects a suitable target cell, e.g. the second cell 12. In Action 1604, the wireless device 120 checks whether or not the target cell, i.e. the second cell 12, belongs to the same RAT as the source cell, i.e. the first cell 11. In other words, and in case the source cell is an LTE cell, the wireless device 120 checks whether or not the target cell is also an LTE cell.

In an intra-RAT procedure, i.e. when then the target cell is also an LTE cell, the wireless device 120 performs Actions 1605 and 1606. In Actions 1605, the wireless device 120 calculates the LTE security token, e.g. the ShortMAC-I, using the source PhysCellID, the source C-RNTI and the target cell identity in the LTE varShortMAC-Input. In Action 1606, the wireless device 120 transmits an RRCConnectionReestablishmentRequest to the network node, e.g. to the first radio network node 110 and/or to the second radio network node 112. The RRCConnectionReestablishmentRequest comprises the calculated security token.

In an inter-RAT procedure, i.e. when then the target cell is not in the same RAT as the source cell, e.g. when the source cell is an LTE cell and the target cell is a NR cell, the wireless device 120 performs Actions 1607, 1608, and 1609. In Action 1607, the wireless device 120 uses source PhysCellID, uses source E-UTRA C-RNTI as C-RNTI, and uses target cell identity as cellIdentity in LTE VarInter-RAT-ShortMAC-Input. In Action 1608, the wireless device 120 calculates the security token in NR, e.g. the NR ShortMAC-I, using the LTE VarInter-RAT-ShortMAC-Input. Thus, the wireless device 120 calculates the security token using LTE format and NR procedures. In Action 1609, the wireless device 120 transmits an RRCReestablishmentRequest to the network node, e.g. to the second radio network node 112. The RRCReestablishmentRequest comprises the calculated security token.

2.7.2.2. Failure in NR and Reestablishment in LTE

If the UE is connected to a cell in the first RAT being NR and detects failure and attempts to reestablish the connection in the second RAT being LTE, the UE and network could calculate the Reestablishment ShortMAC-I using the source (NR) C-RNTI and source (NR) PCI along with the target (LTE) Cell identity. in a newly defined IE. The IE would be defined in NR, but the procedures would be defined in LTE.

2.7.2.2.1. Updates of TS 38.331

TS 38.331 5.3.7.3 Actions following cell selection while T311 is running

Upon selecting a suitable NR cell, the UE shall:
 1> stop timer T311;
 1> start timer T301;
 1> apply the timeAlignmentTimerCommon included in SIB1;
 1> initiate transmission of the RRCReestablishmentRequest message in accordance with 5.3.7.4;
 NOTE: This procedure applies also if the UE returns to the source PCell.
Upon selecting an inter-RAT cell, the UE shall:
 1> if the target cell is an E-UTRA cell and the previously configured integrity protection algorithms are available to configure in the target system:
  2> stop timer T311;
  2> start timer T301;
  2> apply the timeAlignmentTimerCommon included in SIB1;
  2> initiate transmission of the RRCConnectionReestablishmentRequest message in accordance with TS 36.331 section 5.3.7.4;
 1> else:
  2> perform the actions upon going to RRC_IDLE as specified in 5.3.11, with release cause
'RRC connection failure';
VarInterRAT-ShortMAC-Input
The UE variable VarinterRAT-ShortMAC-Input specifies the input used to generate the ShortMAC-I during inter-RAT RRC Connection Reestablishment procedure when the UE detected failure in NR and reestablishes the connection in E-UTRA.

```
-- ASN1START
-- TAG-VAR-INTER-SHORT-RAT-MAC-INPUT-START
VarInterRAT-ShortMAC-Input ::=    SEQUENCE {
    nr-Source-PhysCellId-rxx      PhysCellId,
    eutra-TargetCellIdentity-rxx  BIT STRING (SIZE (28)),
    nr-Source-C-RNTI-rxx          RNTI-Value
}
-- TAG-VAR-INTER-RAT-SHORT-MAC-INPUT-STOP
-- ASN1STOP
```

VarInterRAT-ShortMAC-Input field descriptors eutra-TargetCellIdentity
This field contain the E-UTRA CellIdentity of the target E-UTRA cell i.e. the cell to which the UE is trying to reestablish the connection.
nr-Source-C-RNTI
Set to NR C-RNTI that the UE had in the PCell it was connected to prior to the failure.
nr-Source-PhysCellId

| VarInterRAT-ShortMAC-Input field descriptors |
| --- |
| Set to the NR physical cell identity of the PCell the UE was connected to prior the failure. |

2.7.2.2.1. Updates of TS 36.331

The procedures of section 5.3.7.4 in TS 36.331 may be extended to e.g.:

TS 36.331 5.3.7.4 Actions related to transmission of RRCConnectionReestablishmentRequest message Except for NB-IoT, if the procedure was initiated due to radio link failure or handover failure, the UE shall:

1> set the reestablishmentCellId in the VarRLF-Report to the global cell identity of the selected cell;

The UE shall set the contents of RRCConnectionReestablishmentRequest message as follows:

1> except for a NB-IoT UE for which AS security has not been activated, set the ue-Identity as follows:
  2> set the c-RNTI to the C-RNTI used in the source PCell (handover and mobility from E-UTRA failure) or used in the PCell in which the trigger for the re-establishment occurred (other cases);
  2> set the physCellId to the physical cell identity of the source PCell (handover and mobility from E-UTRA failure) or of the PCell in which the trigger for the re-establishment occurred (other cases);
  2> if source cell is an E-UTRA cell:
    3> set the shortMAC-I to the 16 least significant bits of the MAC-I calculated:
      4> over the ASN.1 encoded as per section 8 (i.e., a multiple of 8 bits) VarShortMAC-Input (or VarShortMAC-Input-NB in NB-IoT);
      4> with the $KRR_{Cint}$ key and integrity protection algorithm that was used in the source PCell (handover and mobility from E-UTRA failure) or of the PCell in which the trigger for the re-establishment occurred (other cases); and
      4> with all input bits for COUNT, BEARER and DIRECTION set to binary ones;
  2> else:
    3> set the shortMAC-I to the 16 least significant bits of the MAC-I calculated:
      4> over the ASN.1 encoded as per section 8 (i.e., a multiple of 8 bits) VarInterRAT-ShortMAC-Input as defined in TS 38.331;
      4> with the previously configured $K_{RRCint}$ key and the E-UTRA integrity protection algorithms corresponding to the previously configured integrity protection algorithm; and
      4> with all input bits for COUNT, BEARER and DIRECTION set to binary ones;
1> for a NB-IoT UE for which AS security has not been activated, set the ue-Identity as follows:
  2> request upper layers for calculated ul-NAS-MAC and ul-NAS-Count using the cellIdentity of the PCell in which the trigger for the re-establishment occurred;
  2> set the s-TMSI to the S-TMSI provided by upper layers;
  2> set the ul-NAS-MAC to the ul-NAS-MAC value provided by upper layers;
  2> set the ul-NAS-Count to the ul-NAS-Count value provided by upper layers;
1> set the reestablishmentCause as follows:
  2> if the re-establishment procedure was initiated due to reconfiguration failure as specified in 5.3.5.5 (the UE is unable to comply with the reconfiguration):
    3> set the reestablishmentCause to the value reconfigurationFailure;
  2> else if the re-establishment procedure was initiated due to handover failure as specified in 5.3.5.6 (intra-LTE handover failure) or 5.4.3.5 (inter-RAT mobility from EUTRA failure):
    3> set the reestablishmentCause to the value handoverFailure;
  2> else:
    3> set the reestablishmentCause to the value otherFailure;
1> if the UE is a NB-IoT UE:
  2> if the UE supports DL channel quality reporting and cqi-Reporting is present in SystemInformationBlockType2-NB:
    3> set the cqi-NPDCCH to include the latest results of the downlink channel quality measurements of the serving cell as specified in TS 36.133 [16];
  NOTE: The downlink channel quality measurements may use measurement period T1 or T2, as defined in TS 36.133 [16]. In case period T2 is used the RRC-MAC interactions are left to UE implementation.
  2> set earlyContentionResolution to TRUE;

The UE shall submit the RRCConnectionReestablishmentRequest message to lower layers for transmission.

Figure 17:
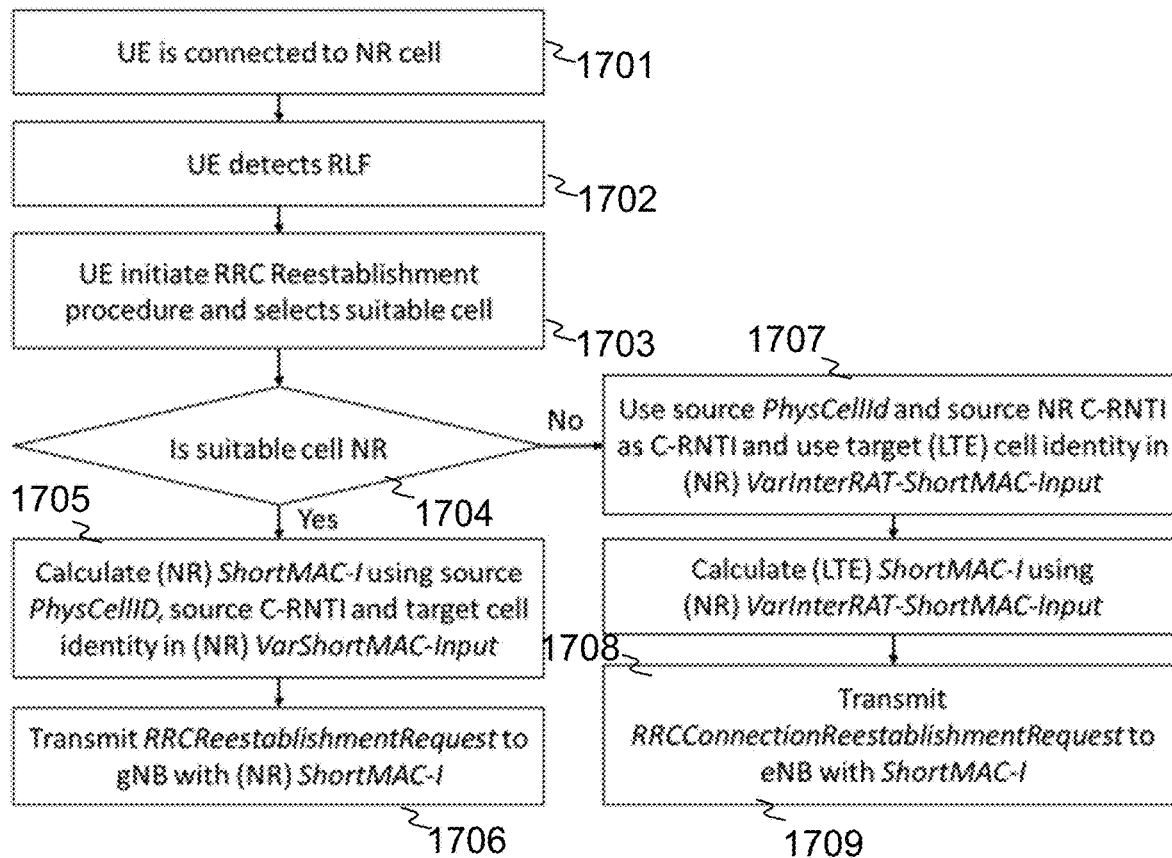
FIG. 17 is a flowchart depicting embodiments of methods in a wireless device connected in NR that detects a failure and re-establishes NR or LTE, and when resuming in LTE calculating an inter-RAT security token using a new Information Element (IE) defined in NR format and using LTE procedures.

FIG. 17 schematically illustrates an example diagram of how the procedure may be done. In FIG. 17 actions performed by the wireless device 120 being connected to a NR cell and when detecting failure are shown. In this example, the wireless device 120 initiates RRC Reestablishment towards LTE or NR. Further, the wireless device 120 calculates the inter-RAT integrity checksum using a new IE defined in NR format and use LTE procedures.

In Action 1601, the wireless device 120 is connected to a first cell 11 being a NR cell, and in Action 1602, the wireless device 120 detects an RLF. In Action 1603 the wireless device 120 initiates an RRC reestablishment procedure and selects a suitable target cell, e.g. the second cell 12. In Action 1604, the wireless device 120 checks whether or not the target cell, i.e. the second cell 12, belongs to the same RAT as the source cell, i.e. the first cell 11. In other words, and in case the source cell is a NR cell, the wireless device 120 checks whether or not the target cell is also a NR cell.

In an intra-RAT procedure, i.e. when then the target cell is also a NR cell, the wireless device 120 performs Actions 1605 and 1606. In Actions 1605, the wireless device 120 calculates the NR security token, e.g. the NR ShortMAC-I, using the source PhysCellID, the source C-RNTI and the target cell identity in the NR varShortMAC-Input.

In Action 1606, the wireless device 120 transmits an RRCReestablishmentRequest to the network node, e.g. to the first radio network node 110 and/or to the second radio network node 112. The RRCReestablishmentRequest comprises the calculated security token.

In an inter-RAT procedure, i.e. when then the target cell is not in the same RAT as the source cell, e.g. when the source cell is a NR cell and the target cell is an LTE cell, the wireless device 120 performs Actions 1607, 1608, and 1609. In Action 1607, the wireless device 120 uses PhysCellID, uses source NR C-RNTI as C-RNTI, and uses target cell identity in NR VarInterRAT-ShortMAC-Input. In Action 1608, the wireless device 120 calculates the security token in LTE, e.g. the LTE ShortMAC-I, using the NR VarInterRAT-ShortMAC-Input. Thus, the wireless device 120 calculates the security token using NR format and LTE procedures. In Action 1609, the wireless device 120 transmits an RRCConnectionReestablishmentRequest to the network node, e.g. to the second radio network node 112. The RRCConnectionReestablishmentRequest comprises the calculated security token.

2.8. Some Fourth Exemplifying Embodiments.
Update Current Definition of Variables to Include Both Intra-RAT and Inter-RAT Parameters and Define Procedures in Target RAT 2.8.1. Solution 4.1: Update Definition of VarShortMAC-Input in LTE and NR to Also Include Inter-RAT Parameters and Define Procedures in the Target RAT, Another solution to the problem is to introduce a new parameters (or extend the VarShortMAC-Input in LTE and NR) to include both LTE and NR variables, and used in both intra-RAT and inter-RAT failure/reestablishment. This variable could for instance be defined using a choice structure, where depending on the type of source and target
RAT, the appropriate choice were made.
2.8.1.1. Failure in NR and Reestablishment in LTE
If the UE is connected to an NR cell and detects failure and reestablishes the connection in LTE, the UE and network would use the variables and procedures in the target RAT (i.e. LTE).
2.8.1.1.1. Updates of TS 38.331
TS 38.331 5.3.7.3 Actions following cell selection while T311 is running
Upon selecting a suitable NR cell, the UE shall:
1> stop timer T311;
1> start timer T301;
1> apply the timeAlignmentTimerCommon included in SIB1;
1> initiate transmission of the RRCReestablishmentRequest message in accordance with 5.3.7.4;
NOTE: This procedure applies also if the UE returns to the source PCell.
Upon selecting an inter-RAT cell, the UE shall:
1> if the target cell is an E-UTRA cell and the previously configured integrity protection algorithms are available to configure in the target system:
2> stop timer T311;
2> start timer T301;
2> apply the timeAlignmentTimerCommon included in SIB1;
2> initiate transmission of the RRCConnectionReestablishmentRequest message in accordance with TS 36.331 section 5.3.7.4;
1> else:
2> perform the actions upon going to RRC_IDLE as specified in 5.3.11, with release cause 'RRC connection failure';
2.8.1.1.2. Updates of TS 36.331
The updated IE may be defined in LTE only as e.g.:

```
-- ASN1START
-- TAG-VAR-SHORT-MAC-INPUT-START
VarShortMAC-Input-rxx ::=    SEQUENCE {
    sourcePhysCellId         CHOICE {
        eutra-PhysCellId         PhysCellId,
        nr-PhysCellId            PhysCellIdNR
    }
    targetCellIdentity       CHOICE {
        eutra-CellIdentity       CellIdentity,
        nr-CellIdentity          BIT STRING (SIZE (28))
```

```
    }
    source-C-RNTI            BIT STRING (SIZE (16))
}
-- TAG-VAR-SHORT-MAC-INPUT-STOP
-- ASN1STOP
```

| VarShort-Input field descriptions |
|---|
| targetCellIdentity<br>Set to CellIdentity of the target cell i.e. the cell the UE is trying to reestablish. In case of inter-RAT reestablishment from E-UTRA to NR, this field contain the NR target cell identity.<br>source-C-RNTI<br>Set to C-RNTI that the UE had in the PCell it was connected to prior to the failure. In case of inter-RAT reestablishment from NR to E-UTRA, this field contain the NR source C-RNTI of the PCell the UE was connected to in NR prior to the failure.<br>sourcePhysCellId<br>Set to the physical cell identity of the PCell the UE was connected to prior to the failure. In case of inter-RAT reestablishment from NR to E-UTRA, this field contain the NR source physical cell identity of the PCell the UE was connected to in NR prior to the failure. |

And the procedures may be updated as:
TS 36.331 5.3.7.4 Actions related to transmission of RRCConnectionReestablishmentRequest message
Except for NB-IoT, if the procedure was initiated due to radio link failure or handover failure, the UE shall:
1> set the reestablishmentCellId in the VarRLF-Report to the global cell identity of the selected cell;
The UE shall set the contents of RRCConnectionReestablishmentRequest message as follows:
1> except for a NB-IoT UE for which AS security has not been activated, set the ue-Identity as follows:
2> set the c-RNTI to the C-RNTI used in the source PCell (handover and mobility from E-UTRA failure) or used in the PCell in which the trigger for the re-establishment occurred (other cases);
2> set the physCellId to the physical cell identity of the source PCell (handover and mobility from E-UTRA failure) or of the PCell in which the trigger for the re-establishment occurred (other cases);
2> set the shortMAC-I to the 16 least significant bits of the MAC-I calculated:
3> over the ASN.1 encoded as per section 8 (i.e., a multiple of 8 bits) VarShortMAC-Input (or VarShortMAC-Input-NB in NB-IoT);
3> with the $KRR_{Cint}$ key and integrity protection algorithm that was used in the source PCell (handover and mobility from E-UTRA failure) or of the PCell in which the trigger for the re-establishment occurred (other cases); and
3> with all input bits for COUNT, BEARER and DIRECTION set to binary ones;
NOTE: If the Source RAT was NR, use the previous NR $K_{RRCint}$ key as E-UTRA $KRR_{Cint}$ key and use integrity protection algorithm matching the previously configured NR integrity protection algorithm.
2.8.1.2. Failure in LTE and Reestablishment in NR
If the UE is connected to a cell in LTE and detects failure and attempts to reestablish in NR, the UE would use the variables and procedures of the target RAT (i.e. NR). This could either be an extension of the existing VarShortMAC-Input, or a new parameter 2.8.1.2. Updates of TS 36.331
TS 36.331 5.3.7.3 Actions following cell selection while T311 is running
Upon selecting a suitable E-UTRA cell, the UE shall:
   1> stop timer T311;
   1> start timer T301;
   1> apply the timeAlignmentTimerCommon included in SystemInformationBlockType2;
   1> if the UE is a NB-IoT UE supporting RRC connection re-establishment for the Control Plane CIoT EPS optimisation and AS security has not been activated; and
   1> if cp-reestablishment is not included in SystemInformationBlockType2-NB:
      2> perform the actions upon leaving RRC_CONNECTED as specified in 5.3.12, with release cause 'RRC connection failure';
   1> else:
      2> initiate transmission of the RRCConnectionReestablishmentRequest message in accordance with 5.3.7.4;
NOTE: This procedure applies also if the UE returns to the source PCell.
Upon selecting an inter-RAT cell, the UE shall:
   1> if the target cell is an NR cell and the previously configured integrity protection algorithms are available to configure in the target system:
      2> stop timer T311;
      2> start timer T301;
      2> apply the timeAlignmentTimerCommon included in SystemInformationBlockType2;
      2> initiate transmission of the RRCReestablishmentRequest message in accordance with TS 38.331 section 5.3.7.4;
   1> else:
      2> if the selected cell is a UTRA cell, and if the UE supports Radio Link Failure Report for Inter-RAT MRO, include selectedUTRA-CellId in the VarRLF-Report and set it to the physical cell identity and carrier frequency of the selected UTRA cell;
      2> perform the actions upon leaving RRC_CONNECTED as specified in 5.3.12, with release cause 'RRC connection failure';
2.8.1.2.1. Updates of TS 38.331
The updates to 38.331 may be:

```
-- ASN1START
-- TAG-VAR-SHORT-MAC-INPUT-START
VarShortMAC-Input-rxx ::=       SEQUENCE {
    sourcePhysCellId            CHOICE {
        eutra-PhysCellId            EUTRA-PhysCellId,
        nr-PhysCellId               PhysCellId
    }
    targetCellIdentity          CHOICE {
        eutra-CellIdentity          BIT STRING (SIZE (28))
        nr-CellIdentity             CellIdentity,
    source-C-RNTI               BIT STRING (SIZE (16))
}
-- TAG-VAR-SHORT-MAC-INPUT-STOP
-- ASN1STOP
```

VarShort-MAC-Input field descriptions targetCellIdentity
Set to CellIdentity of the target cell i.e. the cell the UE is trying to reestablish. In case of inter-RAT reestablishment from NR to E-UTRA, this field contain the E-UTRA target cell identity.

VarShort-MAC-Input field descriptions source-C-RNTI
Set to C-RNTI that the UE had in the PCell it was connected to prior to the failure. In case of inter-RAT reestablishment from E-UTRA to NR, this field contain the E-UTRA source C-RNTI.
sourcePhysCellId
Set to the physical cell identity of the PCell the UE was connected to prior to the failure. In case of inter-RAT handover from E-UTRA to NR, this field contain the E-UTRA source physical cell identity of the PCell the UE was connected to in E-UTRA prior to the failure.

As the procedures already calculate the ShortMAC-I based on the VarShortMAC-Input for both intra-RAT and inter-RAT reestablishment, the required updates to the procedures would be small:
TS 38.331 5.3.7.4 Actions related to transmission of RRCReestablishmentRequest message
The UE shall set the contents of RRCReestablishmentRequest message as follows:
   1> set the ue-Identity as follows:
      2> set the c-RNTI to the C-RNTI used in the source PCell (reconfiguration with sync or mobility from NR failure) or used in the PCell in which the trigger for the re-establishment occurred (other cases);
      2> set the physCellId to the physical cell identity of the source PCell (reconfiguration with sync or mobility from NR failure) or of the PCell in which the trigger for the re-establishment occurred (other cases);
      2> set the shortMAC-I to the 16 least significant bits of the MAC-I calculated:
         3> over the ASN.1 encoded as per section 8 (i.e., a multiple of 8 bits) VarShortMAC-Input;
         3> with the $KRR_{Cint}$ key and integrity protection algorithm that was used in the source PCell (reconfiguration with sync or mobility from NR failure) or of the PCell in which the trigger for the re-establishment occurred (other cases); and
         3> with all input bits for COUNT, BEARER and DIRECTION set to binary ones;
NOTE: If the Source RAT was E-UTRA, use the previous E-UTRA $KRR_{Cint}$ key as NR $K_{RRCint}$ key and use integrity protection algorithm matching the previously configured E-UTRA integrity protection algorithm.

2.8.2 Solution 4.2: Update Only Definition of VarShortMAC-Input in LTE to Also Include Inter-RAT Parameters and Define Procedures in the Target RAT, Another solution to the problem is to introduce a new IE (or extend the VarShortMAC-I) in only LTE specification (as described in solution 4.1) which to be used for calculating the security token for reestablishment in either direction of inter-RAT RRC reestablishment.

If the UE is connected to an LTE cell and experiences a failure and attempts to reestablish to an NR cell, the UE and network could calculate the Short MAC-I using the source C-RNTI and source PCI along with the target Cell identity. However, if the IE VarShortMAC-Input is extended to also include inter-RAT handover, the same IE would be used both in intra-LTE and inter-RAT handover.

If the UE is connected to an NR cell experiences a failure and attempts to reestablish in a cell in LTE, the UE and network could calculate the shortMAC-I using the source C-RNTI and source PCI along with the target Cell Identity in the VarShort-MAC-Input (or similar) in LTE.

The changes to the message would be similar to that in solution 4.1 but in the procedures the changes would be that in NR it would refer to the VarShortMAC-Input in TS 36.331.

2.8.3 Solution 4.3: Update Definition of VarShortMAC-Input in NR to Also Include Inter-RAT Parameters and Define Procedures in the Target RAT, Another solution to the problem is to introduce a new IE (or extend the VarShortMAC-I) in only NR specification which to be used for calculating the security token for reestablishment in either direction of inter-RAT RRC reestablishment. This message could for instance be defined using a choice structure, where depending on the type of source and target RAT, the appropriate choice were made.

If the UE is connected to a cell in NR and detects a failure and attempts to reestablish in a cell in LTE, the UE and network could calculate the Short MAC-I using the source C-RNTI and source PCI along with the target Cell identity. However, if the IE VarShortMAC-Input is extended to also include inter-RAT handover, the same IE would be used both in intra-LTE and inter-RAT handover.

If the UE is connected to a cell in LTE and experiences a failure and attempts to reestablish in NR, the UE and network could calculate the ShortMAC-I using the source C-RNTI and source PCI along with the target Cell Identity in the VarShortMAC-Input (or similar) in NR.

The changes to the message would be similar to that in solution 4.1, but only in NR, but in the procedures the changes would be that in LTE it would refer to the VarShortMAC-Input in TS 38.331.

2.9 Some Fifth Exemplifying Embodiments: Use Input Parameter Format of the Target System and Use Dummy Values in Place of Source System Parameters In some embodiments, the definitions of the LTE VarShortMAC-Input, or similar parameter is used when target is LTE and the NR VarShortMAC-Input or similar parameter used when the target is NR. For the variables requiring parameters from the source RAT, e.g. the source C-RNTI and source PCI. The UE and network uses a constant dummy value in the format of the target RAT, e.g. a bit string of 0's.

This solution may be combined with e.g. solution 1, where e.g. the source C-RNTI is used in the target RAT, and only the source PCI is replaced with dummy values, or the other way around, where the source PCI is adopted to the target RAT format using e.g. padding or truncation, while the source C-RNTI is replaced with dummy values.

2.9.1 Failure in LTE and Reestablishment NR: Calculate and Use NR ShortMAC-I Using Dummy Values for Source PCI and C-RNTI and NR Cell Identity as Input If the UE is connected to a cell in LTE and experiences failure and attempts to reestablish in a cell in NR, the UE and network would need to calculate the NR ShortMAC-I using the NR VarShortMAC-Input. The VarShortMAC-Input contain source PCI, source RNTI and target Cell identity. The target Cell identity is obtained from the SystemInformationBlockType1 (SIB1) which is broadcast by the target cell.

However, the source PCI and source RNTI were obtained in another RAT (i.e. LTE) and have different characteristics compared to corresponding parameters in NR.

For the parameter C-RNTI, the VarShortMAC-Input uses a constant bit string (e.g. 16 bits set to '0') as input.

Similarly for the PCI, the VarShortMAC-Input uses a constant bit string (e.g. 10 bits set to '0') as input 2.9.1.1. Updates of TS 38.331

UE variable

VarShortMAC-Input

The UE variable VarShortMAC-Input specifies the input used to generate the shortMAC-I during RRC Connection Reestablishment procedure.

| VarShortMAC-Input variable |
|---|
| -- ASN1START |
| -- TAG-VAR-SHORTMACINPUT-START |
| VarShortMAC-Input :: =         SEQUENCE { |
|    sourcePhysCellId            PhysCellId, |
|    targetCellIdentity          CellIdentity, |
|    source-c-RNTI               RNTI-Value |
| } |
| -- TAG-VAR- SHORTMACINPUT-STOP |
| -- ASN1STOP |

| VarShortMAC-Input field descriptions |
|---|
| targetCellIdentity |
| Set to CellIdentity of the target cell i.e. the cell the UE is trying to reestablish the connection. |
| source-c-RNTI |
| Set to C-RNTI that the UE had in the PCell it was connected to prior to the reestablishment. If the source RAT was E-UTRA, the content of this field is set to 16 binary 0's. |
| sourcePhysCellId |
| Set to the physical cell identity of the PCell the UE was connected to prior to the reestablishment. If the source RAT was E-UTRA, the content of this field is set to 10 binary 0's. |

2.9.2. Failure in from NR and Reestablishment in LTE: Calculate and Use ShortMAC-I in LTE Using Dummy Values for Source PCI and C-RNTI and LTE Cell Identity as Input If the UE is connected to a cell in NR and experiences failure and attempts to reestablish in a cell in LTE, the UE and network would need to calculate the LTE ShortMAC-I using the LTE VarShortMAC-Input (or similar variable). The VarShortMAC-Input contain the source PCI, source C-RNTI and target Cell identity. The target Cell identity is obtained from the SystemInformationBlockType1 (SIB1) which is broadcast by the target cell.

However, the source PCI and source RNTI were obtained in another RAT (i.e. NR) and have different characteristics compared to corresponding parameters in LTE.

For the parameter C-RNTI, the VarShortMAC-Input uses a constant bit string (e.g. 16 bits set to '0') as input.

Similarly for the PCI, the VarShortMAC-Input uses a constant bit string (e.g. 9 bits set to '0') as input.

If the UE was configured with an integrity protection algorithm in NR which is not supported in LTE (e.g. a hypothetical future NIA4, different from any algorithm in LTE), the UE could either:

Abort the reestablishment procedure and fallback to RRC Setup

Use a predefined fallback algorithm which is supported in both LTE and NR (e.g. any of the algorithms EIA0-EIA3)

2.9.2.1. Updates of TS 36.331
UE Variables
VarShortMAC-Input
The UE variable VarShortMAC-Input specifies the input used to generate the shortMAC-I.

| VarShortMAC-Input UE variable |
| --- |
| -- ASN1START<br>VarShortMAC-Input ::=         SEQUENCE {<br>  cellIdentity                 CellIdentity,<br>  physCellId                   PhysCellId,<br>  c-RNTI                       C-RNTI<br>}<br>-- ASN1STOP |

| VarShortMAC-Input field descriptions |
| --- |
| cellIdentity<br>Set to CellIdentity included in CellIdentity (without suffix) in SIB1 of the current cell.<br>c-RNTI<br>Set to C-RNTI that the UE had in the PCell it was connected to prior to the failure. If the source cell was an NR cell, the content of this field is set to 16 binary 0's.<br>physCellId<br>Set to the physical cell identity of the PCell the UE was connected to prior to the failure. If the source cell was an NR cell, the content of this field is set to 9 binary '0's. |

2.10 Calculating Inter-RAT ShortMAC-I for Handover Preparation

When the network decides that a UE should perform a handover from one node to another, the source node may provide the target node with handover preparation information.

In LTE, this message contain (among other things) the AS Context:

| HandoverPreparationinformation message |
| --- |
| -- ASN1START<br>HandoverPreparationInformation ::=      SEQUENCE {<br>  criticalExtensions                     CHOICE {<br>    c1                                   CHOICE {<br>      handoverPreparationInformation-r8   HandoverPreparationInformation-r8-IEs,<br>      spare7 NULL,<br>      spare6 NULL, spare5 NULL, spare4 NULL,<br>      spare3 NULL, spare2 NULL, spare1 NULL<br>    },<br>    criticalExtensionsFuture               SEQUENCE {}<br>  }<br>}<br>HandoverPreparationInformation-r8-IEs    ::=    SEQUENCE 1<br>  ue-RadioAccessCapabilityInfo           UE-CapabilityRAT-ContainerList,<br>  as-Config                              AS-Config       OPTIONAL,     -- Cond HO<br>  rrm-Contig                             RRM-Contig      OPTIONAL,<br>  as-Context                             AS-Context      OPTIONAL,     -- Cond HO<br>  nonCriticalExtension                   HandoverPreparationInformation-v920-IEs OPTIONAL<br>} |

Where the AS-context contain the reestablishment info.

| |
| --- |
| -- ASN1START<br>AS-Context ::=                SEQUENCE {<br>  reestablishmentInfo         ReestablishmentInfo OPTIONAL    -- Cond HO<br>} |

The reestablishmentInfo contain information required to perform reestablishment in both the target cell, but also any other cell the source node considers should be possible to reestablish to.

| ReestablishmentInfo information element |
| --- |
| -- ASN1START<br>ReestablishmentInfo ::=          SEQUENCE {<br>  sourcePhysCellId               PhysCellId,<br>  targetCellShortMAC-I           ShortMAC-I,<br>  additionalReestabInfoList      AdditionalReestabInfoList OPTIONAL,<br>  ...<br>}<br>AdditionalReestabInfoList ::=    SEQUENCE ( SIZE (1..maxReestabInfo) ) OF |

-continued

| ReestablishmentInfo information element |
|---|

```
AdditionalReestabInfo
AdditionalReestabInfo ::=    SEQUENCE{
    cellIdentity                CellIdentity,
    key-eNodeB-Star             Key-eNodeB-Star,
    shortMAC-I                  ShortMAC-I
}
Key-eNodeB-Star ::=          BIT STRING (SIZE (256))
-- ASN1STOP
```

In NR, a similar message is introduced, although structured a little bit different:

| HandoverPreparationInformation message |
|---|

```
-- ASN1START
-- TAG-HANDOVER-PREPARATION-INFORMATION-START
HandoverPreparationInformation ::=    SEQUENCE {
    criticalExtensions              CHOICE {
      c1                              CHOICE{
        handoverPreparationInformation    HandoverPreparationInformation-IEs,
        spare3 NULL, spare2 NULL, spare1 NULL
      },
      criticalExtensionsFuture        SEQUENCE {}
    }
}
HandoverPreparationInformation-IEs      ::=SEQUENCE {
    ue-CapabilityRAT-List           UE-CapabilityRAT-ContainerList,
    sourceConfig                    AS-Config           OPTIONAL,     -- Cond HO
    rrm-Config                      RPM-Contig          OPTIONAL,
    as-Context                      AS-Context          OPTIONAL,
    nonCriticalExtension            SEQUENCE {}         OPTIONAL
}
AS-Config ::=    SEQUENCE {
    rrcReconfiguration              OCTET STRING (CONTAINING RRCReconfiguration),
    ...
}
AS-Context ::=                   SEQUENCE {
    reestablishmentInfo             ReestablishmentInfo               OPTIONAL,
    configRestrictInfo              ConfigRestrictInfoSCG             OPTIONAL,
    [[ ran-NotificationAreaInfo        RAN-NotificationAreaInfo   OPTIONAL
    ]]
}
ReestablishmentInfo ::=          SEQUENCE {
    sourcePhysCellId                PhysCellId,
    targetCellShortMAC-I            ShortMAC-I,
    additionalReestabInfoList       ReestabNCellInfoList
    OPTIONAL
}
ReestabNCellInfoList ::=        SEQUENCE ( SIZE (1..maxCellPrep) ) OF ReestabNCellInfo
ReestabNCellInfo::= SEQUENCE{
    cellIdentity                    CellIdentity,
    key-gNodeB-Star                 BIT STRING (SIZE (256)),
    shortMAC-I                      ShortMAC-I
}
RRM-Contig ::=                   SEQUENCE {
    ue-InactiveTime                 ENUMERATED {
                                        s1, s2, s3, s5, s7, s10, s15, s20,
                                        s25, s30, s40, s50, min1, min1s20, min1s40,
                                        min2, min2s30, min3, min3s30, min4, min5, min6,
                                        min7, min8, min9, min10, min12, min14, min17, min20,
                                        min24, min28, min33, min38, min44, min50, hr1,
                                        hr1min30, hr2, hr2min30, hr3, hr3min30, hr4, hr5, hr6,
                                        hr8, hr10, hr13, hr16, hr20, day1, day1hr12, day2,
                                        day2hr12, day3, day4, day5, day7, day10, day14, day19,
                                        day24, day30, dayMoreThan30}            OPTIONAL,
    candidateCellInfoList           MeasResultList2NR        OPTIONAL,
    ...
}
-- TAG-HANDOVER-PREPARATION-INFORMATION-STOP
-- ASN1STOP
```

As may be noted, both the LTE and NR HandoverPreparationInfo message contain the ShortMAC-I of the target cell and possibly of any other cells. If the handover is inter-RAT (i.e. from NR to LTE or vice versa), the target-CellShortMAC-I would need to be calculated using any parameters from two different RATs. Likewise, if the source node decides that the UE should be prepared to perform reestablishment to another RAT, the ShortMAC-I in the AdditionalReestabInfo (in LTE) or the ReestabNCellInfo (in NR) would need to be calculated using parameters from two different RATs.

The method to calculate this inter-RAT ShortMAC-I would be the same as the solutions presented for the other embodiments.

Further Extensions and Variations

Figure 18:
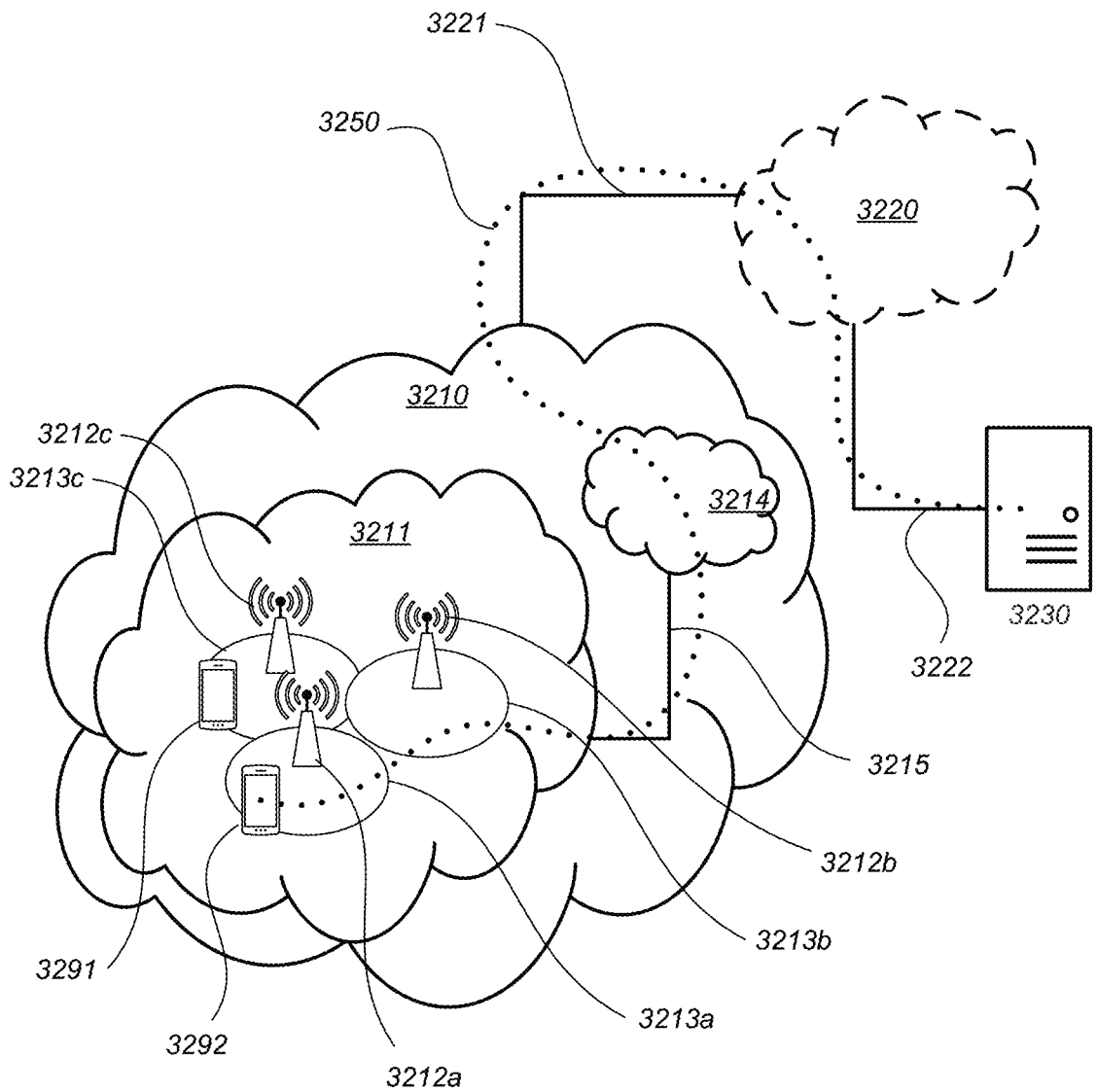
FIG. 18 schematically illustrates a telecommunication network connected via an intermediate network to a host computer.

With reference to FIG. 18, in accordance with an embodiment, a communication system includes a telecommunication network 3210 such as the wireless communications network 100, e.g. a WLAN, such as a 3GPP-type cellular network, which comprises an access network 3211, such as a radio access network, and a core network 3214. The access network 3211 comprises a plurality of base stations 3212a, 3212b, 3212c, such as the network node 110, 112, 130, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the wireless device 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

Figures 20, 21:
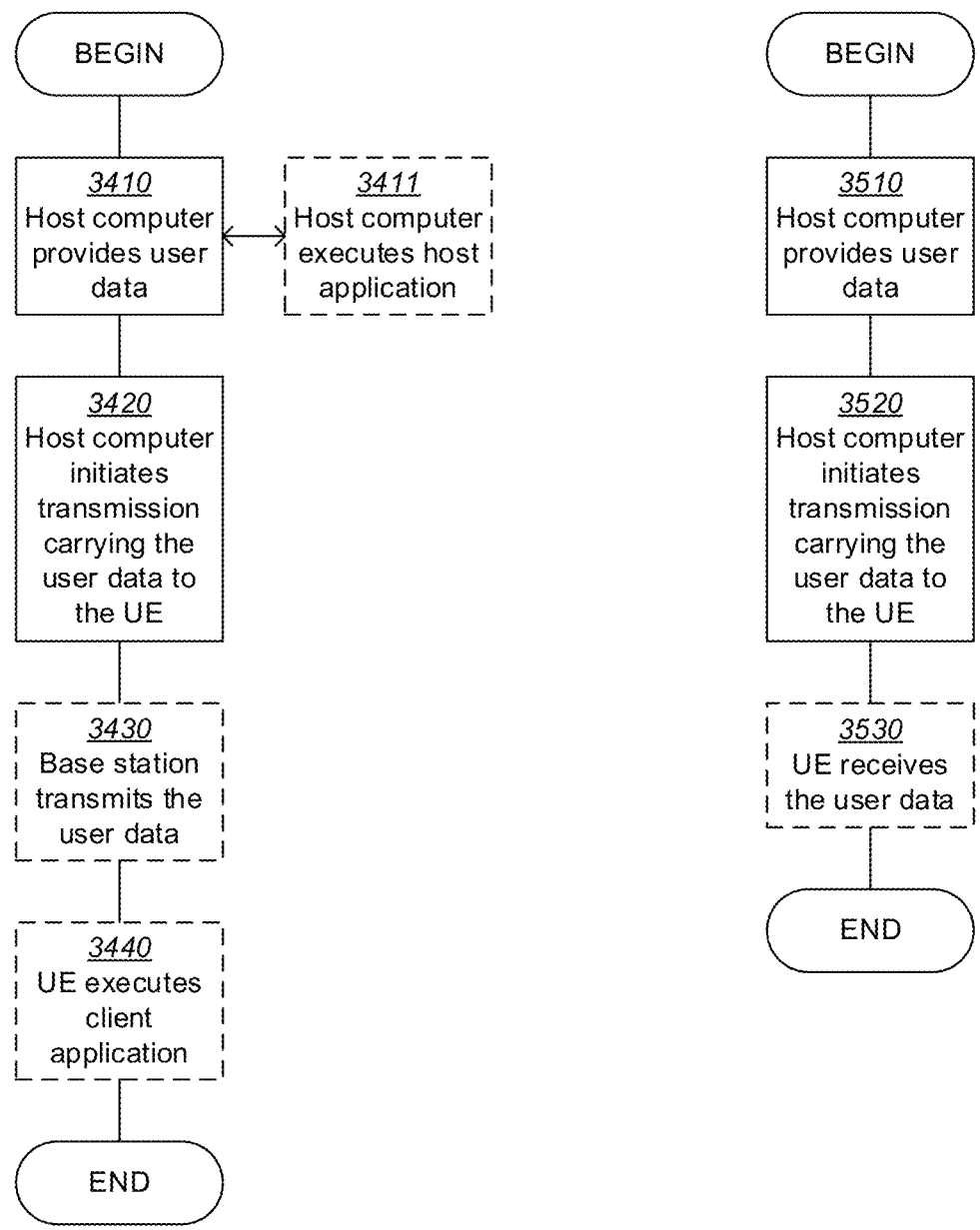
FIGS. 20-23 are flowcharts illustrating methods implemented in a communication system including a host computer, a base station and a user equipment.

The communication system of FIG. 20 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 19. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 21) served by the base station 3320. The communication interface 3326 may be configured to facilitate a connection 3360 to the host computer 3310. The connection 3360 may be direct or it may pass through a core network (not shown in FIG. 21) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 19 may be identical to the host computer 3230, one of the base stations 3212*a*, 3212*b*, 3212*c* and one of the UEs 3291, 3292 of FIG. 18, respectively. This is to say, the inner workings of these entities may be as shown in FIG. 19 and independently, the surrounding network topology may be that of FIG. 18.

Figure 19:
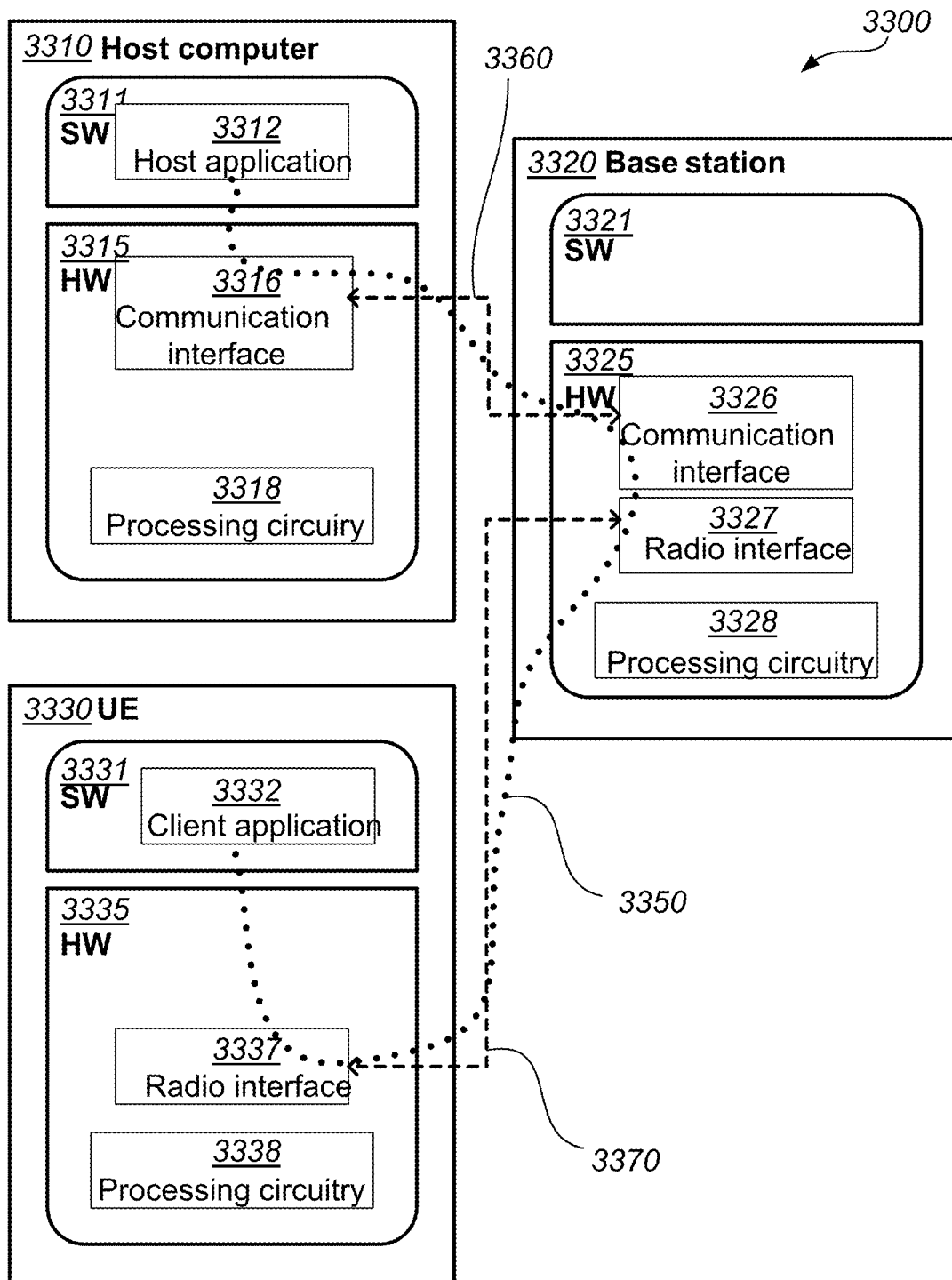
FIG. 19 is a generalized block diagram of a host computer communicating via a base station with a user equipment over a partially wireless connection.

In FIG. 19, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure.

One or more of the various embodiments improve the performance of OTT services provided to the UE 3330 using the OTT connection 3350, in which the wireless connection 3370 forms the last segment. More precisely, the teachings of these embodiments may improve the pSIM scheduling allowing more positioning assistance data to be broadcasted.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIGS. 18 and 19 and the corresponding text are about a downstream aspect of the radio-related invention, while FIGS. 20 and 21 and the corresponding text discuss an upstream aspect.

FIG. 20 is a flowchart illustrating a method implemented in a communication system, in accordance with one embodiment. The communication system includes a host computer, a base station such as a AP STA, and a UE such as a Non-AP STA which may be those described with reference to FIGS. 18 and 19. For simplicity of the present disclosure, only drawing references to FIG. 18 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 21 is a flowchart illustrating a method implemented in a communication system, in accordance with one embodiment. The communication system includes a host computer, a base station such as a AP STA, and a UE such as a Non-AP STA which may be those described with reference to FIGS. 18 and 19. For simplicity of the present disclosure, only drawing references to FIG. 21 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figure 22:
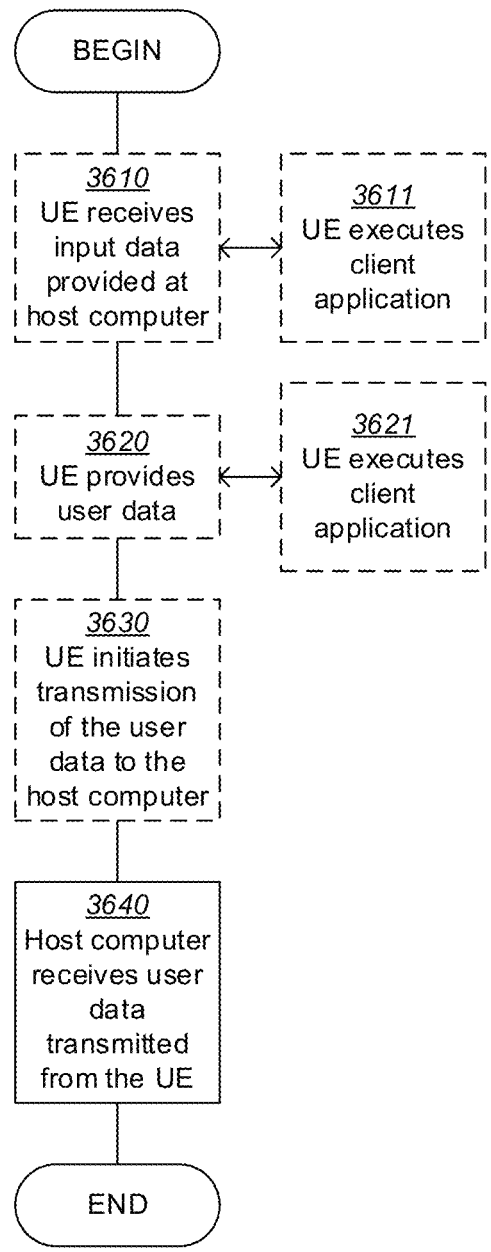

FIG. 22 is a flowchart illustrating a method implemented in a communication system, in accordance with one embodiment. The communication system includes a host computer, a base station such as a AP STA, and a UE such as a Non-AP STA which may be those described with reference to FIGS. 18 and 19. For simplicity of the present disclosure, only drawing references to FIG. 22 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

Figure 23:
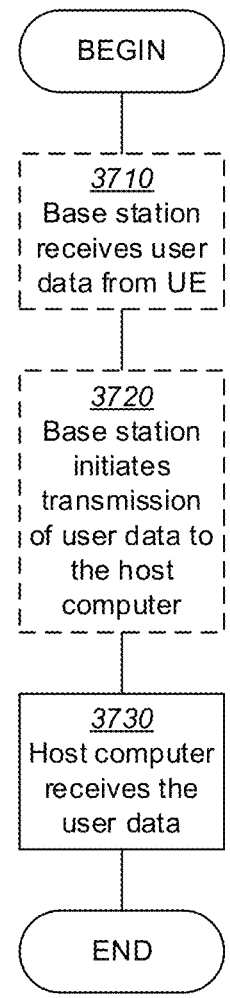

FIG. 23 is a flowchart illustrating a method implemented in a communication system, in accordance with one embodiment. The communication system includes a host computer, a base station such as a AP STA, and a UE such as a Non-AP STA which may be those described with reference to FIGS. 18 and 19. For simplicity of the present disclosure, only drawing references to FIG. 23 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

| Abbreviation | Explanation |
| --- | --- |
| MAC-I | Message Authentication Code - Integrity |
| RRC | Radio Resource Control |
| NG-RAN | Next Generation Radio Access Network |
| RNTI | Radio Network Temporary Identifier |
| C-RNTI | Cell RNTI |
| I-RNTI | Inactive RNTI |
| NR | New Radio (5G) |
| LTE | Long Term Evolution (4G) |
| MAC-I | Message Authentication Code - Integrity |
| RRC | Radio Resource Control |
| NG-RAN | Next Generation Radio Access Network |
| RNTI | Radio Network Temporary Identifier |
| C-RNTI | Cell RNTI |
| I-RNTI | Inactive RNTI |
| NR | New Radio (5G) |
| LTE | Long Term Evolution (4G) |
| EPC | Evolved Packet Core |
| EPS | Evolved Packet System |
| 5GC | 5G Core |
| 5GS | 5G System |
| PDCP | Packet Data Convergence Protocol |
| PCI | Physical Cell Identity |
| NAS | Non Access Stratum |
| NIA | NR Integrity Protection Algorithm |
| EIA | E-UTRA Integrity Protection Algorithm |
| E-UTRA | Evolved Universal Terrestrial Radio Access |
| RAT | Radio Access Technology |

The invention claimed is:

1. A method performed by a wireless device for re-establishing a radio connection in a wireless communications network comprising a first Radio Access Technology, RAT, and a second RAT being different from the first RAT, wherein the wireless device is operating in a first cell served by a first radio network node operating in the first RAT, and wherein the method comprises:
when a connection failure with the first cell served by the first radio network node is detected:
performing a cell selection;
selecting a second cell served by a second radio network node operating in the second RAT, wherein the second cell is known by the wireless device to be a candidate for re-establishment;
determining a first set of parameters associated with the first cell, wherein the first set of parameters comprises at least one parameter identifying the wireless device or the first cell;
receiving a second set of parameters associated with the second cell, wherein the second set of parameters comprises at least one parameter identifying the wireless device or the second cell;
determining an updated version of one or more parameters of the first set of parameters or an updated version of one or more parameters of the second set of parameters;
determining a security token based on at least one out of: the first set of parameters and the updated version of the one or more parameters of the first set of parameters, and based on at least one out of: the second set of parameters and the updated version of the one or more parameters of the second set of parameters; and
transmitting to the second cell, a re-establishment request message comprising the determined security token.

2. The method of claim 1, wherein the first set of parameters comprises one or more out of: a Cell Radio Network Temporary Identifier, C-RNTI or an Inactive Radio Network Temporary Identifier, I-RNTI identifying the wireless device and a Physical Cell Identifier, PCI, identifying the first cell, and wherein the second set of parameters comprises a Cell ID or a PCI identifying the second cell.

3. The method of claim 1, wherein the determining of the updated version of the one or more parameters of the first set of parameters comprises:
converting the one or more parameters of the first set of parameters to a format corresponding to the format of the one or more parameters of the second RAT by performing one or more out of:
mapping, recalculating, or truncating the one or more parameters of the first set of parameters to a shortened bit string when the first RAT is 5G New Radio, NR, technology and the second RAT is Long Term Evolution, LTE, technology, and
mapping, recalculating, or padding the one or more parameters of the first set of parameters to an extended bit string when the first RAT is LTE and the second RAT is NR, and
using the converted one or more parameters of the first set of parameters in one or more variables defined in the second RAT as input in calculation of the security token for the second RAT.

4. The method of claim 3, wherein the determining of the updated version of the one or more parameters of the second set of parameters comprises:
converting the one or more parameters of the second set of parameters to a format corresponding to the format of the one or more parameters of the first set of parameters by performing one or more out of:
mapping, recalculating, or truncating the one or more parameters of the second set of parameters to a shortened bit string when the first RAT is LTE technology and the second RAT is NR technology, and
mapping, recalculating, or padding the one or more parameters of the second set of parameters to an extended bit string when the first RAT NR technology and the second RAT is LTE, and using the converted one or more parameters of the second set of parameters in one or more variables defined in the first RAT as input in calculation of the security token for the first RAT.

5. The method of claim 1, further comprising:
creating a new variable comprising the one or more parameters of the first set of parameters in the format of the first RAT and comprising the one or more parameters of the second set of parameters in the format of the second RAT, and
wherein the determining of the security token comprises:
using the new variable as input in calculation of the security token for the second RAT.

6. The method of claim 5, wherein the new variable is an extension of an existing variable.

7. The method of claim 1, wherein the determining of the updated version of the one or more parameters of the first set of parameters or the updated version of the one or more parameters of the second set of parameters comprises:
extending definition of existing variables to use one or more values in the second RAT format in place of the one or more parameters of the first set of parameters.

8. The method of claim 1, wherein the determining of the updated version of the one or more parameters of the first set of parameters or the updated version of the one or more parameters of the second set of parameters comprises:
receiving, from the first radio network node or the second radio network node-, an instruction of how to convert the one or more parameters of the first set of parameters into a format corresponding to the format of the one or more parameters of the second RAT or how to convert the one or more parameters of the second set of parameters into a format corresponding to the format of the one or more parameters of the first RAT.

9. A wireless device for re-establishing a radio connection in a wireless communications network comprising a first Radio Access Technology, RAT, and a second RAT being different from the first RAT, wherein the wireless device is configured to operate in a first cell served by a first radio network node configured to operate in the first RAT, and wherein the wireless device is configured to:
when a connection failure with the first cell served by the first radio network node is detected:
perform a cell selection;
select a second cell served by a second radio network node operating in the second RAT, wherein the second cell is known by the wireless device to be a candidate for re-establishment;
determine a first set of parameters associated with the first cell, wherein the first set of parameters comprises at least one parameter identifying the wireless device or the first cell;
receive a second set of parameters associated with the second cell, wherein the second set of parameters comprises at least one parameter identifying the wireless device or the second cell;
determine an updated version of one or more parameters of the first set of parameters or an updated version of one or more parameters of the second set of parameters;
determine a security token based on at least one out of: the first set of parameters and the updated version of the one or more parameters of the first set of parameters, and based on at least one out of: the second set of parameters and the updated version of the one or more parameters of the second set of parameters; and
transmit to the second cell, a re-establishment request message comprising the determined security token.

10. The wireless device of claim 9, wherein the first set of parameters comprises one or more out of: a Cell Radio Network Temporary Identifier, C-RNTI, or an Inactive Radio Network Temporary Identifier, I-RNTI, identifying the wireless device and a Physical Cell Identifier, PCI, identifying the first cell, and wherein the second set of parameters comprises a Cell ID or a PCI identifying the second cell.

11. The wireless device of claim 9, wherein the wireless device is configured to determine of the updated version of the one or more parameters of the first set of parameters by converting the one or more parameters of the first set of parameters to a format corresponding to the format of the one or more parameters of the second RAT by performing one or more out of:
mapping, recalculating or truncating the one or more parameters of the first set of parameters to a shortened bit string when the first RAT is 5G New Radio, NR, technology and the second RAT is Long Term Evolution, LTE, technology, and
mapping, recalculating or padding the one or more parameters of the first set of parameters to an extended bit string when the first RAT is LTE and the second RAT is NR; and
wherein the wireless device is configured to determine the security token by using the converted one or more parameters of the first set of parameters in one or more variables defined in the second RAT as input in calculation of the security token for the second RAT.

12. The wireless device of claim 11, wherein the wireless device is configured to determine the updated version of the one or more parameters of the second set of parameters by converting the one or more parameters of the second set of parameters to a format corresponding to the format of the one or more parameters of the first set of parameters by performing one or more out of:
mapping, recalculating or truncating the one or more parameters of the second set of parameters to a shortened bit string when the first RAT is LTE technology and the second RAT is NR technology, and
mapping, recalculating or padding the one or more parameters of the second set of parameters to an extended bit string when the first RAT NR technology and the second RAT is LTE; and
wherein the wireless device is configured to determine the security token by using the converted one or more parameters of the second set of parameters in one or more variables defined in the first RAT as input in calculation of the security token for the first RAT.

* * * * *